US009299461B2

(12) United States Patent
Burke et al.

(10) Patent No.: US 9,299,461 B2
(45) Date of Patent: Mar. 29, 2016

(54) SINGLE PASS, HEAVY ION SYSTEMS FOR LARGE-SCALE NEUTRON SOURCE APPLICATIONS

(75) Inventors: Robert J. Burke, Santa Cruz, CA (US); Alexander Thomas Burke, Palo Alto, CA (US)

(73) Assignee: ARCATA SYSTEMS, Santa Cruz, CA (US)

( * ) Notice: Subject to any disclaimer, the term of this patent is extended or adjusted under 35 U.S.C. 154(b) by 719 days.

(21) Appl. No.: 13/482,922

(22) Filed: May 29, 2012

(65) Prior Publication Data
US 2012/0328066 A1 Dec. 27, 2012

Related U.S. Application Data

(63) Continuation-in-part of application No. 12/484,004, filed on Jun. 12, 2009, now abandoned.

(60) Provisional application No. 61/061,593, filed on Jun. 13, 2008.

(51) Int. Cl.
*H05H 3/06* (2006.01)
*G21B 1/03* (2006.01)
*G21B 1/15* (2006.01)
(Continued)

(52) U.S. Cl.
CPC .. *G21B 1/03* (2013.01); *G21B 1/01* (2013.01); *G21B 1/15* (2013.01); *H05H 1/22* (2013.01); *Y02E 30/14* (2013.01); *Y02E 30/16* (2013.01)

(58) Field of Classification Search
CPC ............. G21G 1/00; G21B 1/00; G03B 1/03; F03H 1/00; F03H 1/0006; F03H 1/0093; H05H 15/00; H05H 2277/13

USPC .................................................. 376/100–108
See application file for complete search history.

(56) References Cited

U.S. PATENT DOCUMENTS 3,624,239 A 11/1971 Fraas et al.
3,664,920 A 5/1972 Hirsch
(Continued)

OTHER PUBLICATIONS

Friedman, et al., "Toward a physics designfor NDCX-II, and ion accelerator for warm dense matter and HIF target physics studies", Nucl. Instr. and Mthods in Phys. Res. A 606(200), 6-10.*
(Continued)

*Primary Examiner* — Marshall O'Connor
(74) *Attorney, Agent, or Firm* — Michael A. Glenn; Perkins Coie LLP

(57) ABSTRACT

A single-pass heavy-ion fusion system for power production from fusion reactions alone, power production that uses additional energy of fission reactions obtained by driving a subcritical fission pile with the neutrons from fusion reactions, destroying high-level and/or long-lived radioactive waste by intense bombardment with fusion neutrons, or for the production of neutron beams for various applications includes a new arrangement of current multiplying processes that employs a multiplicity of isotopes to achieve the desired effect of distributing the task of amplifying the current among all the various processes, to relieve stress on any one process, and to increase the design margin for assured ICF (inertial confinement fusion) ignition for applications including but not restricted to the above list. The energy content and power of the ignition-driver pulses are greatly increased, thus increasing intensity of target heating and rendering reliable ignition readily attainable.

9 Claims, 37 Drawing Sheets

(51) Int. Cl.
*H05H 1/22* (2006.01)
*G21B 1/01* (2006.01)

(56) References Cited

U.S. PATENT DOCUMENTS

| | | | |
|---|---|---|---|
| 3,665,508 | A | 5/1972 | Gawler |
| 3,668,065 | A | 6/1972 | Moir |
| 3,762,992 | A | 10/1973 | Hedstrom |
| 4,182,650 | A | 1/1980 | Fischer |
| 4,189,346 | A | 2/1980 | Jarnagin |
| 4,202,725 | A | 5/1980 | Jarnagin |
| 4,344,911 | A | 8/1982 | Maniscalco et al. |
| 4,392,080 | A | 7/1983 | Maschke |
| 4,639,348 | A | 1/1987 | Jarnagin |
| 4,735,762 | A | 4/1988 | Lasche |
| 5,160,694 | A | 11/1992 | Steudtner |
| 5,160,695 | A | 11/1992 | Bussard |
| 5,321,327 | A | 6/1994 | Jensen |
| 5,818,891 | A | 10/1998 | Rayburn et al. |
| 6,411,666 | B1 | 6/2002 | Woolley |
| 6,628,740 | B2 | 9/2003 | Monkhorst et al. |
| 6,654,433 | B1 | 11/2003 | Boscoli |
| 6,852,942 | B2 | 2/2005 | Monkhorst et al. |
| 6,888,907 | B2 | 5/2005 | Monkhorst et al. |
| 6,894,446 | B2 | 5/2005 | Monkhorst et al. |
| 7,079,001 | B2 | 7/2006 | Nordberg |
| 7,232,985 | B2 | 6/2007 | Monkhorst et al. |
| 7,391,160 | B2 | 6/2008 | Monkhorst et al. |
| 7,459,654 | B2 | 12/2008 | Monkhorst et al. |
| 7,550,741 | B2 | 6/2009 | Sanns, Jr. |
| 7,719,199 | B2 | 5/2010 | Monkhorst et al. |
| 8,031,824 | B2 | 10/2011 | Bystriskii et al. |
| 8,090,071 | B2 | 1/2012 | DeLuze |
| 2002/0025256 | A1 | 2/2002 | Caren |
| 2005/0135532 | A1 | 6/2005 | Taleyarkhan |
| 2008/0226010 | A1 | 9/2008 | Sesselmann et al. |
| 2009/0310731 | A1 | 12/2009 | Burke et al. |
| 2011/0091004 | A1 | 4/2011 | Farmer et al. |
| 2012/0114088 | A1 | 5/2012 | Amendt et al. |

OTHER PUBLICATIONS

Lawson, J D., "Some Criteria for a Power Producing Thermodynamic Reactor;", received Nov. 1956, Prot. Phys. Soc. (UK) B70;, 1957, 6-10.*

Ch. Seife. "Sun in a Bottle", Chapter 5, published by Viking Penguin, member of the Peguin Group, ISBN 978-0-670-02033-1; USA (2008).*

Ch. Seife. "Sun in a Bottle", Chapter 6, published by Viking Penguin, member of the Peguin Group, ISBN 978-0-670-02033-1; USA (2008).*

Ch. Seife. "Sun in a Bottle", Chapter 8, published by Viking Penguin, member of the Peguin Group, ISBN 978-0-670-02033-1; USA (2008).*

Rider, T H., "Fundamental limitations on plasma fusion systems not in thermodynamic equilibrium", Phys. Plasmas 4(4), Apr. 1997, 1039-1046.*

L.A. Artsimovich, "Controlled Thermonuclear Reactions", Gordon and Breach (first English edition) 1964, pp. 1-9.*

Artsimovich, L A., "Controlled Thermonuclear Reactions", Gordon and Breach Science Publishers, New York (first English Edition) Library of Congress Cat. Card No. 64-23922, 1964, 1-9.

Burke, ,"Argonne National Laboratory (ANL) Design Activities", Argonne National Laboratory, Proceedings of the Heavy Ion Fusion Workshop; Illinois, USA., Sep. 1978, 6 pages.

Spiller, P., "App1: HIDIF Tables of Parameters", pp. 193-203.

Teng, L.C. et al., "Report of the Reference Design Committee", 1979, pp. 159-170.

Watson, J.M. et al., "A High Intensity 1/ Megavolt Heavy Ion Preaccelerator for Ion Beam Fusion", IEEE Transactions on Nuclear Science, vol. NS-26, No. 3, Jun. 1979, pp. 3098-3100.

Watson, J.M., "ANL Experimental Program: Herthfire Injector", Argonne National Laboratory, Sep. 1978, 1 page.

Basko, et al., "ITEP conception of a heavy ion fusion facility", Fusion Engineering and Design 32-33, XP055244534, Jan. 1, 1996, pp. 73-85.

Hofmann, I., "HIDIF—an approach to high repetition rate inertial fusion with heavy ions", Nuclear Instruments & Methods in Physics Research, Section A.; vol. 415, Sep. 21, 1998, pp. 11-19.

Koshkarev, et al., "New concept of a charge-symmetric driver for HIF", Nuclear Instruments & Methods in Physics Research. Section A: Accelerators, Spectrometers, Detectors, and Associated Equipment; vol. 415, No. 1-2, Sep. 21, 1998, pp. 263-267.

Piriz, et al., "First estimates of the rotation frequency of an ion beam enerating an annular focal spot", Retrieved online on Jan. 26, 2015 from url: http://ww.uclm.es.area/amf/annrep/2001arp1gsi.pdf, Jan. 1, 2002, p. 26.

Schempp, et al., "The injector for the HIDIF driver linac", Nuclear Instruments & Methods in Physics Research. Section A: Accelerators, Spectrometers, Detectors, and Associated Equipment; vol. 415, No. 1-2, Sep. 21, 1998, pp. 209-217.

* cited by examiner

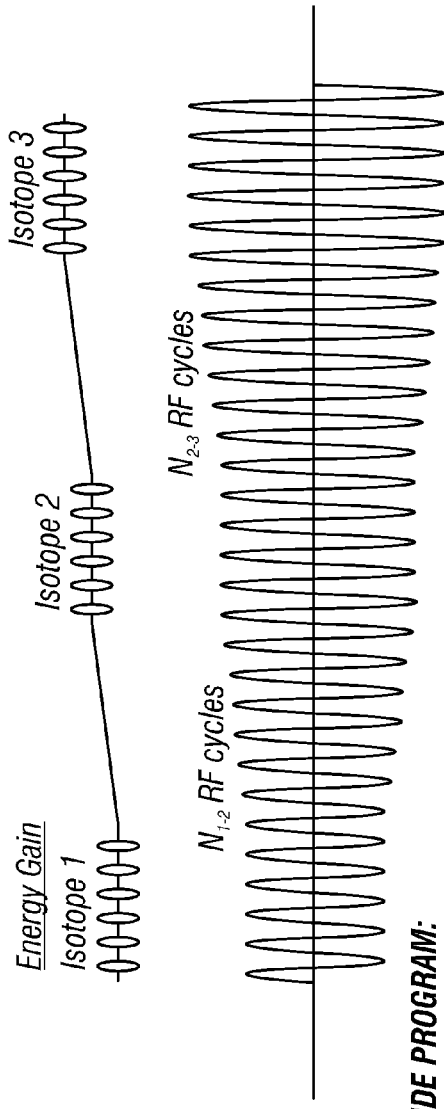

FIG. 13

Between Isotopes: RF amplitude change ~1% / N RF cycles

Energy Gain
Isotope 1    Isotope 2    Isotope 3

$N_{1-2}$ RF cycles   $N_{2-3}$ RF cycles

RF AMPLITUDE PROGRAM:
10MHz = 100nsec / cycle; 100 cycles = 10μsec.
for 10 isotopes, 9 transitions = 100μsec.
Time between isotopes is cut out in the HDL. Longer time is good on that score.
10 cycles = 10μsec - okay to add 10μsec to 200μsec of beam. PUSH THIS.
100μsec slows some things down in a positive way - magnet switching
Length of HDL increases from 20μsec to 40μsec - costly.

MIDDLE GROUND:
Push the 10MHz; overdrive; low Q. But even 10 cycles of 10MHz = 1μsec.
Stress importance of Cost.
Progress to frequency where 100 cycles is not a long time.

HIGHER FREQUENCY:
100MHz = 10nsec; 100 cycles = 1μsec.
1GHz = 1nsec; 100 cycles = 100nsec.
RF Field time constants important / key overall: Linac, RF deflectors, Snugger, Teletron, Maintain, Slick, and Wobble

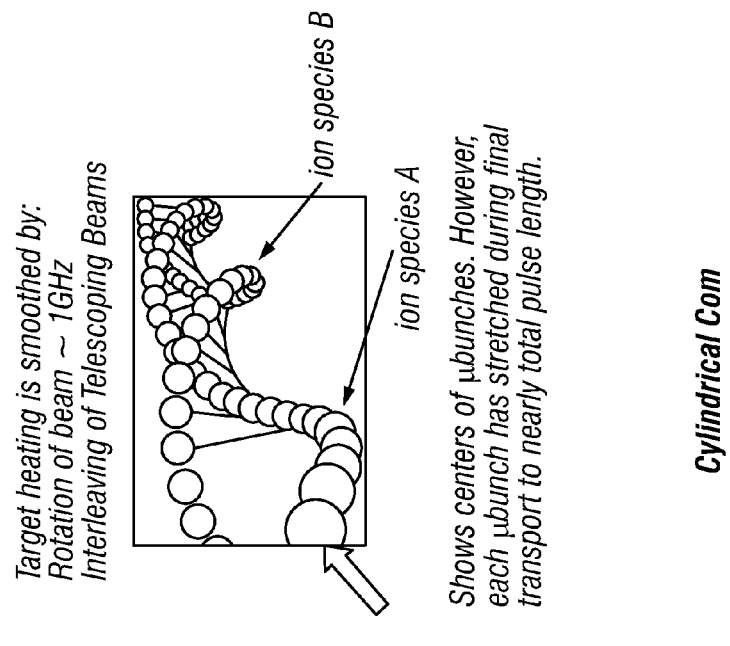
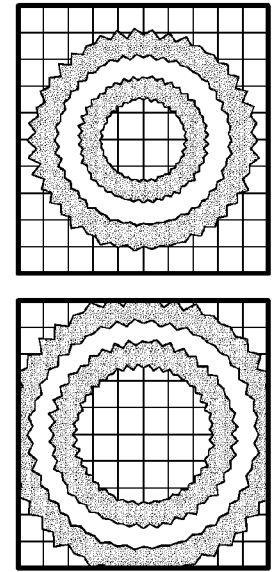
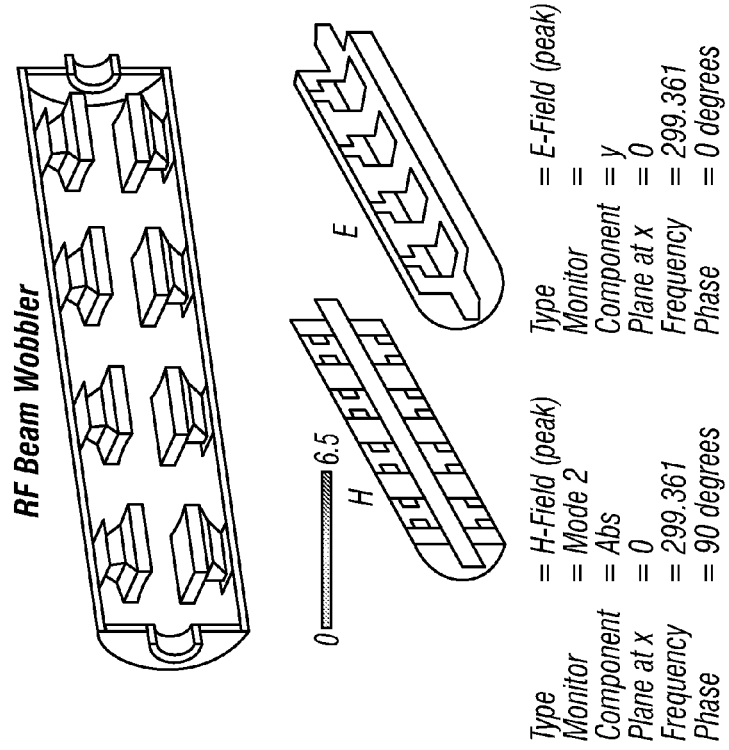
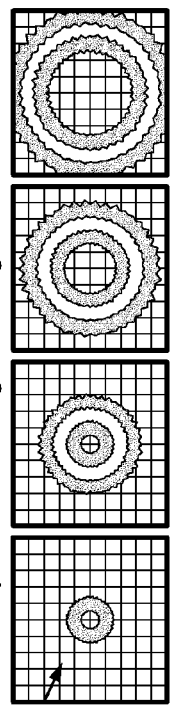
FIG. 16

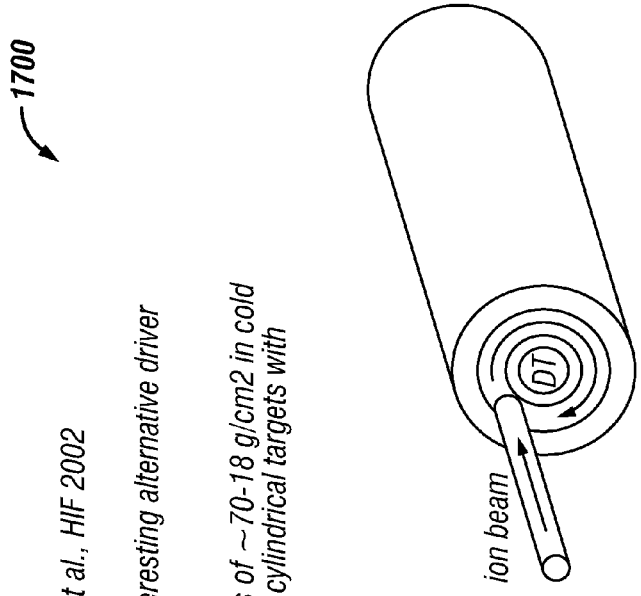
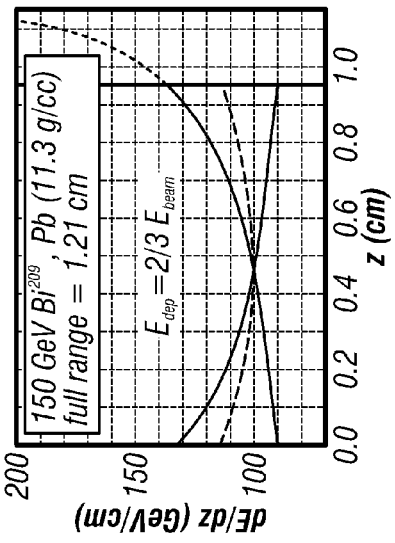

Principal motivation for cylindrical targets   M.Basko et al., HIF 2002

Near-relativistic heavy ions with energies ≥ 0.5 become an interesting alternative driver option for heavy ion inertial fusion (D.G. Koshkarev).

Bi ions with energies 100-200 GeV have relatively long ranges of ~70-18 g/cm2 in cold heavy metals. Such ranges can be naturally accommodated in cylindrical targets with axial beam propagation.

Axial profile of the beam energy deposition rate

Direct drive may become a competitive target option when

- azimuthal symmetry is ensured by fast beam rotation around the target axis,
- axial uniformity is controlled by discarding the Bragg peak, and (possibly) by two-sided beam irradiation,
- a heavy-metal shell (liner) is used to compress the DT fuel.

M.Basko et al., HIF 2002

FIG. 17

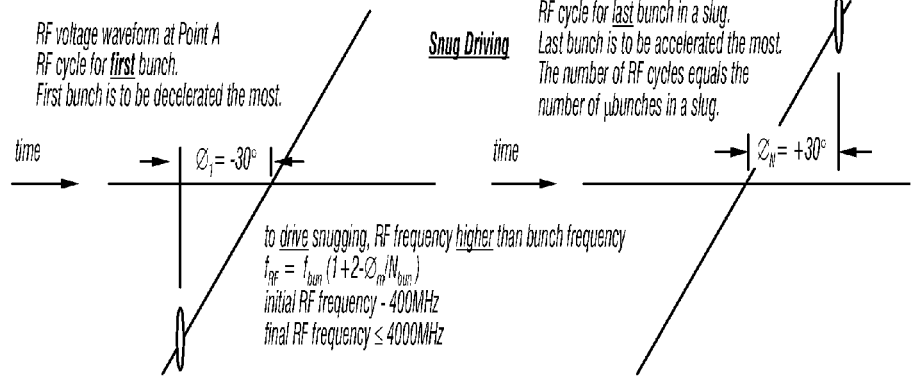
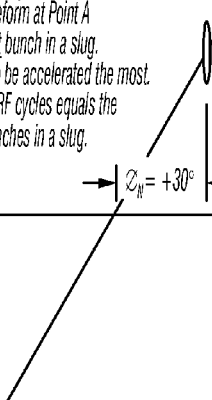
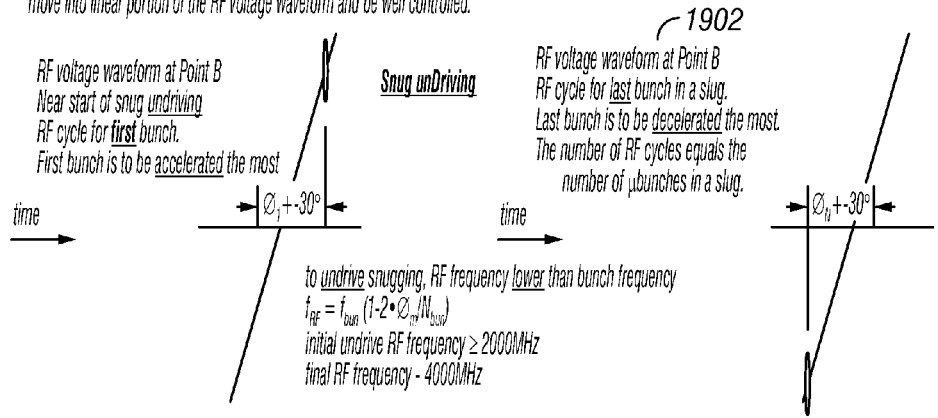
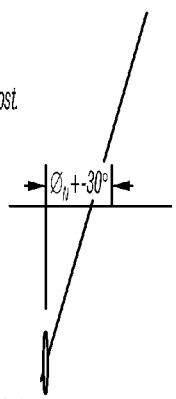
FIG. 24

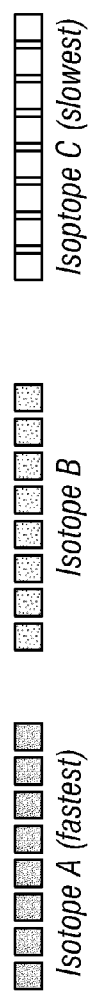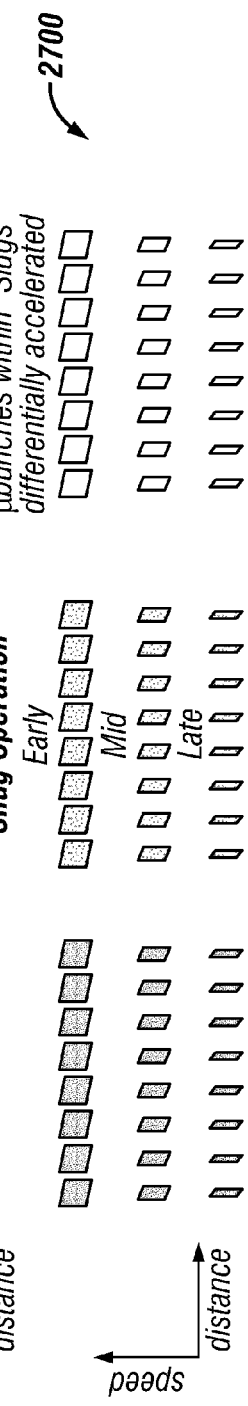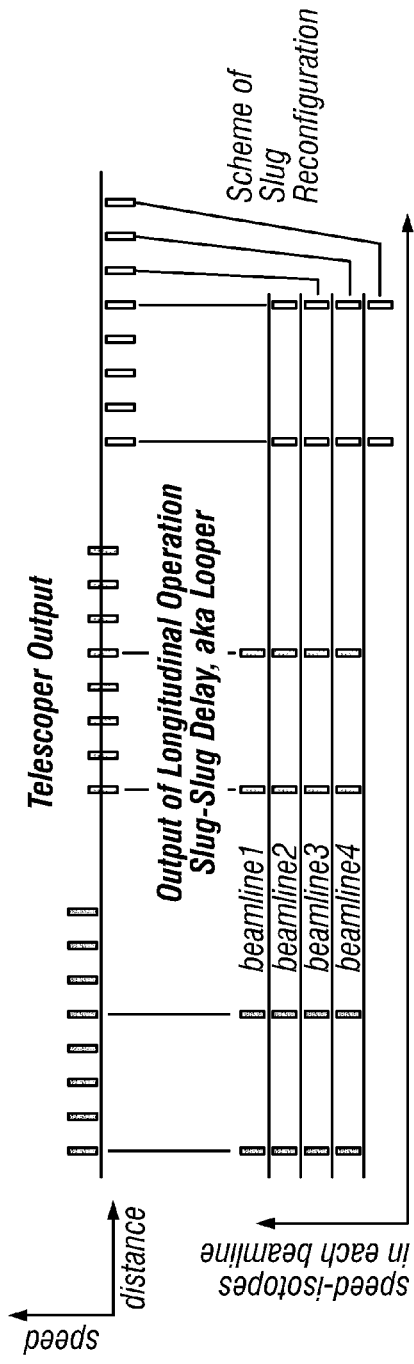
FIG. 27

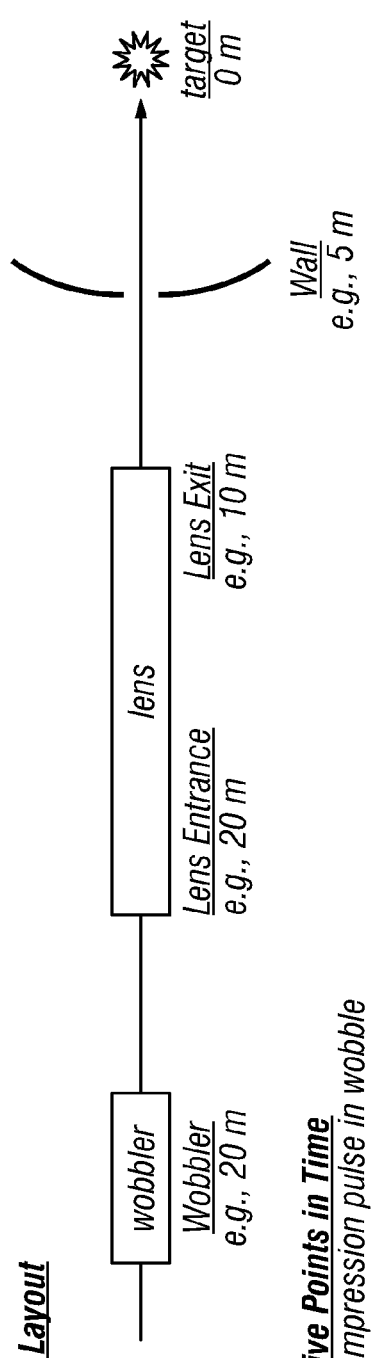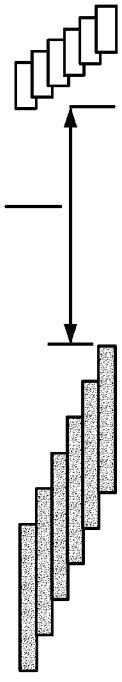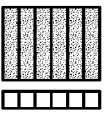
FIG. 33

SINGLE PASS, HEAVY ION SYSTEMS FOR LARGE-SCALE NEUTRON SOURCE APPLICATIONS

CROSS-REFERENCE TO RELATED APPLICATIONS

This application is a continuation-in-part of U.S. patent application Ser. No. 12/484,004, filed Jun. 12, 2009, now abandoned the entirety of which is herein incorporated by this reference thereto.

U.S. patent application Ser. No. 12/484,004 claims benefit of U.S. provisional patent application Ser. No. 61/061,593, filed Jun. 13, 2008, the entirety of which is also incorporated herein by this reference thereto.

BACKGROUND OF THE INVENTION

1. Field of the Invention

In a general sense, the invention is related to systems achieving nuclear fusion reactions at large-scale for economical generation of power by fusion reactions only, generation of power by driving sub-critical fission piles with neutrons from fusion reactions, and production of neutrons for other applications including but not limited to pulsed neutron beams for research, medical applications, etc. In addition, the techniques for generating ion beams needed to ignite fusion may be used together or singly to increase the intensity of ion beams for various applications.

2. Background Information

The heavy ion driver defined in 1975-1976 by R. L. Martin and A. W. Maschke used the known abilities of high-energy RF (radiofrequency) accelerator systems to store megaJoule quantities of ion beam energy and to focus this stored energy on very small spots. They saw that the short stopping distance of beam nuclei with high atomic number (Z) at approximately one-half the speed of light meant being able to create the energy density in small targets containing fusion fuel that is needed to ignite small clean-fusion explosions. And they showed that the continuous stored beams could be rearranged into multiple bunches, compressed in length, and delivered to the targets in short duration pulses as required by the dynamics of the fusion ignition and burn processes.

Beams of protons can be accumulated—and stored—over a long period of time, as the protons resist processes that cause them to wander from their controlled paths, such as knock-on or multiple scattering, and have low probability of changing their charge to 0 (neutral) or negative (H−). On the other hand, the probability of the charge state of a heavy ion changing by collision with an atom remaining even in a very high vacuum requires ignition pulses be generated in a fraction of a second. This is consistent with the need for an ICF (inertial confinement fusion) power plant reactor to pulse frequently, and pulsing many times per second is routine for accelerator systems. However, the need to generate an ignition pulse within a limited time places a constraint on the accelerator technology that eliminates slow pulsing machines like synchrotrons.

Thus, at the inception of heavy ion fusion (HIF), a few principles were established:

GeVs of energy in each ion provided means to generate beam pulses to ignite ICF burn with: much more total beam energy than competing technologies, the tight focusing required by the dimensions of fusion fuel pellets, the beam power required for ignition with beam currents obtainable with confirmed processes;

Rearrangement of the total beam for an ignitor pulse into the short time duration required for the fuel compression and ignition processes is the technical issue;

The question for economics is the cost of large particle accelerators, which does not fit conventional ideas of electric power generation or the motivations for research neutron sources;

One accelerator has the ability to produce many times the output of a conventional power plant, which results in low cost per unit of energy;

Favorable economics is obtained by capitalizing on this by using the high-grade heat at high temperatures to produce hydrogen and synthesize liquid fuels and lower the cost of other energy-intensive industries such as steel and aluminum;

These economics apply to using the neutrons from the fusion reactions to drive fission reactions in sub-critical fission piles, and Portions of the neutrons from the fusion and/or fission reactions can be provided for research, production of isotopes for applications in medicine and other purposes.

Current Amplification Processes Used to Generate Heavy Ion Fusion Ignition Pulses Accelerating heavy ions solved the problem of depositing the megaJoules of beam energy in small targets containing fusion fuel. The beam energy also must be delivered to the fuel targets in pulses with the short durations, e.g. of the order of 10 nanoseconds, consistent with the timescale of igniting small fusion explosions by rapidly compressing and heating to ignition so that fusion burn is effected before the compressed and heated fuel is able to fly apart. Using processes verifiable by the same analytical tools at the root of the design of all successful accelerators, Martin, Maschke, and others defined examples of systems to reconfigure the beams and deliver them to the target on this time scale.

The physics of particle beams employs mathematical methods that characterize the motion of the particles that make up a beam; "a collection of particles confined in space", in the terms of statistical physics. Pertinent to the present matter is the concept of beam emittance, a property that is conserved and thus a "constant of the motion", reference being to the progress of the beam through the accelerator and beam transport system. The emittance of a beam determines the diameter of the focal spot, to the $0^{th}$ order, i.e., before accounting for such spot-size increasing effects as aberrations. By the statistical physics, the physical beams obey theorems holding that the emittance of a beam of identical particles cannot be decreased by any conservative, i.e., reversible, operation on them through external forces. That is, the emittance when a beam is born is the best (lowest) it can be. The emittance can and does grow in real machines, the design of which takes care to minimize the causes of such deleterious effects.

In slightly more general terms, the 6-dimensional phase space of a beam is conserved. The six dimensions are the positions of the particles in the three conventional physical dimensions and the particles' relative momentum components. Planes are defined in the phase space with the position and momentum components for coordinates, with time used in the place of the position coordinate in the direction of the beam's motion. The area occupied by the beam particles in each of these planes is the beam's emittance in that plane.

The physics teaches that the sums of the emittances in the three planes remains constant, under the action of purely conservative external forces, and some of the area of the emittance in one plane may be traded to one of the others, or shared with both.

"Ballistic" focusing of charged particle beams is analogous to focusing beams of light: the spot size depends on the emittance, of the particle's paths coming into the electromagnetic lens, aberrations from beam parameters (such as the momentum spread) inherent in the ideal optics, and imperfections in the magnetic fields of the lens. For example, the effect of focusing a particle beam that has a range of momentum per particle is similar to the "chromatic" aberration of focusing light with a variety of wavelengths (or photon energies, or "colors"), shown visibly in the spectrum from a prism, and the term chromatic aberration also is used in "particle beam optics".

The term "brightness" characterizes the intensity of the number of beam particles contained in the beam's 6-dimensional phase space. As the phase space volume occupied by the beam particles cannot shrink, the beam brightness cannot be increased by conservative forces, during the "motion". The brightness can and does decrease in real machines as a result of any loss of beam particles in addition to distortions of the beam that increase its effective emittance.

Ignition of inertially confined fusion reactions requires a beam that is extremely powerful, contains a substantial quantity of kinetic energy to be deposited in the target to generate the high pressure required to drive the fuel to densities a hundred times the fuel's normal solid density. The ability to provide the unimprovable beam brightness at the source and preserve enough of it during subsequent acceleration and beam manipulations to meet the demands of compressing the fuel (a.k.a. implosion) is the bedrock of heavy ion fusion driver technology.

The goal of the design of HIF drivers is to manipulate the beams so that the relatively low beam current at beam inception, at the source, which is limited by the electro-magneto dynamics of the particles whose like electrical charge creates mutually repulsion forces tending to enlarge the beam in physical space. Expert evaluation of the first HIF system concepts to be proposed confirmed the judgment that HIF driver systems could be built and operated to deposit energy in the required target volume and mass and in the short allowable time to achieve ignition.

This judgment, however, assumed an adequate concentration of expert effort would be applied to arrive at designs that would accomplish the mission. Resources adequate for this effort have not been provided, and the most vital HIF efforts continue the struggle via dual-purpose application of resources provided to continue the advance of particle accelerator systems for research. This has placed the development of the capable HIF drivers at risk of overlooking machine design approaches that necessitate concentration on only beams comprised of heavy ions in a low charge state (lightly ionized), preferably with q=1, where q is the number of electrons removed from the neutral atoms. This kind of concentration has yielded the novel features of the single pass RF driver concept.

A review of the existing state of the art will preface description of the SPRFD's new features. A shorthand means to summarize the net effect of the several individual current amplification processes proposed during the intense vetting of HIF "point" designs in 1975-80, was the following equation:

$$I_{target} = I_{source} \times N_{sources} \times N_{injection} \times N_{compression} \times N_{beams\_on\_target}. \quad (1)$$

The total beam power on the target is the product of the total current of particles (the same as the electric current for q=1, etc.) and the kinetic energy per particle. Ignitor pulse power of ca. 1 PW (1 petaWatt is 1 billion megaWatts) is needed for ignition. This can be provided, for example, by some number of beams of 20 GeV ions with an aggregate current of 50 kA (kiloAmperes). Early HIF driver concepts using mainstream RF accelerator technology were judged capable of meeting the requirements promulgated by leading implosion experts. A problematic factor related to the use of storage rings (which contribute the factor $N_{injection}$ in Equation 1.) is described below. This problematic situation is resolved in the SPRFD by the absence of storage rings, also as described below.

Another means of amplifying the eventual current (introduced in 1978 by Burke) accelerates ions of multiple isotopes. This method effectively multiplies the 6-dimensional phase space available to the designer, since each isotope is a different particle species, and thus not subject to the constraint of Liouville's theorem. The advantageous effect of multiple isotopes is that a given set of parameters for energy deposition in the fusion target can be accomplished with 1. a set of beams that are each comprised of a different isotope (which are different species (kinds) of particles whether these are isotopes of the same atomic element, e.g. xenon, or different atomic elements, e.g., xenon and lead), to allow each isotopic beam to have lower brightness than would be required if the energy deposition requirements were to be met by a number (the factor $N_{beams}$ in Equation 1.) of beams all comprised of the same particle species. The motivation for the multiple isotope technique was to gain design margin by raising the capabilities of the beam, to drive implosion of fusion fuel "pellets", beyond the marginal implosion abilities that were the targets of the early designs. In the arena of the energy supply industry where capital costs are large, reducing risks of unacceptable performance is mandatory at the conceptual level. The power of multiple beams may be regarded as relieving pressure on other techniques for beam amplification/compression/compaction. However, the potential ways to use this additional design factor to best advantage were not aggressively explored, and only formally adopted in the internationally vetted "point" design called Heavy Ion Driven Inertial Fusion (HIDIF) in 1995-97.

The means of compacting beams that have been devised to meet the ignition requirements for inertial confinement fusion also may be used singly or in various combinations to increase the intensity of ion beams for beneficial applications.

Power production using only fusion reactions can be shown to be the most desirable of any baseload energy source, using inclusive metrics including abundance, safety, environmental impact, and cost. It is widely recognized, however, that a shortfall in fusion energy produced from a given amount of energy used to drive the reactions may be compensated by causing the neutrons produced in the fusion reactions to induce fission reactions in a suitable mass of fissionable fuel. This construct is called the fusion-fission hybrid. This construct has potential advantages including the safety aspect in that the fission pile would be sub-critical, since the need to emit slightly more than one neutron per fission reaction is not needed. This feature plus the high energy of the fusion neutrons and their high fluxes enables this construct to be devised to destroy high level radioactive waste in the process of generating power. If desired, in a limiting case of this application, a HIF hybrid system could be totally dedicated to destroying radioactive waste.

To use neutrons from fusion reactions for applications such as research and production of special isotopes, beams of neutrons in collimation channels provided for the purpose may be directed into moderators to achieve the neutron spectra desired for these applications. The beams also may be directed into a neutron multiplying material or a sub-critical mass of fission material to: 1. Increase the total number of neutrons available that that point for the intended applications, 2. Exchange lower energy neutrons for the high energy fusion neutrons, and 3. Be integrated with the moderator as previously said.

SUMMARY

A single-pass heavy-ion fusion system for power production from fusion reactions alone, power production that uses additional energy of fission reactions obtained by driving a sub-critical fission pile with the neutrons from fusion reactions, destroying high-level and/or long-lived radioactive waste by intense bombardment with fusion neutrons, or for the production of neutron beams for various applications includes a new arrangement of current multiplying processes that employs a multiplicity of isotopes to achieve the desired effect of distributing the task of amplifying the current among all the various processes, to relieve stress on any one process, and to increase the design margin for assured ICF (inertial confinement fusion) ignition for applications including but not restricted to the above list. The energy content and power of the ignition-driver pulses are greatly increased, thus increasing intensity of target heating and rendering reliable ignition readily attainable.

BRIEF DESCRIPTION OF THE DRAWINGS

FIG. 13 provides a diagram of pulse structure in an RF accelerator

FIG. 16 provides, a diagram of an RF beam wobbler

FIG. 17 provides a diagram of a cylindrical target;

FIG. 24 provides a diagram illustrating snugging and snug-stopping;

FIG. 33 provides an illustration of the last sections of the beam line, which shows: a. Culmination of the telescoping of multiple isotopic species slugs, b. Culmination of the slicking of microbunches within slugs, and c. The ample timescales at the wobbler to allow modulation of the wobbler RF fields to realize: i. Beneficial target illumination symmetries and patterns, and ii. Adequate RF field rise time compared to a time gap between slugs having a large difference in speed.

DETAILED DESCRIPTION

Figure 1:
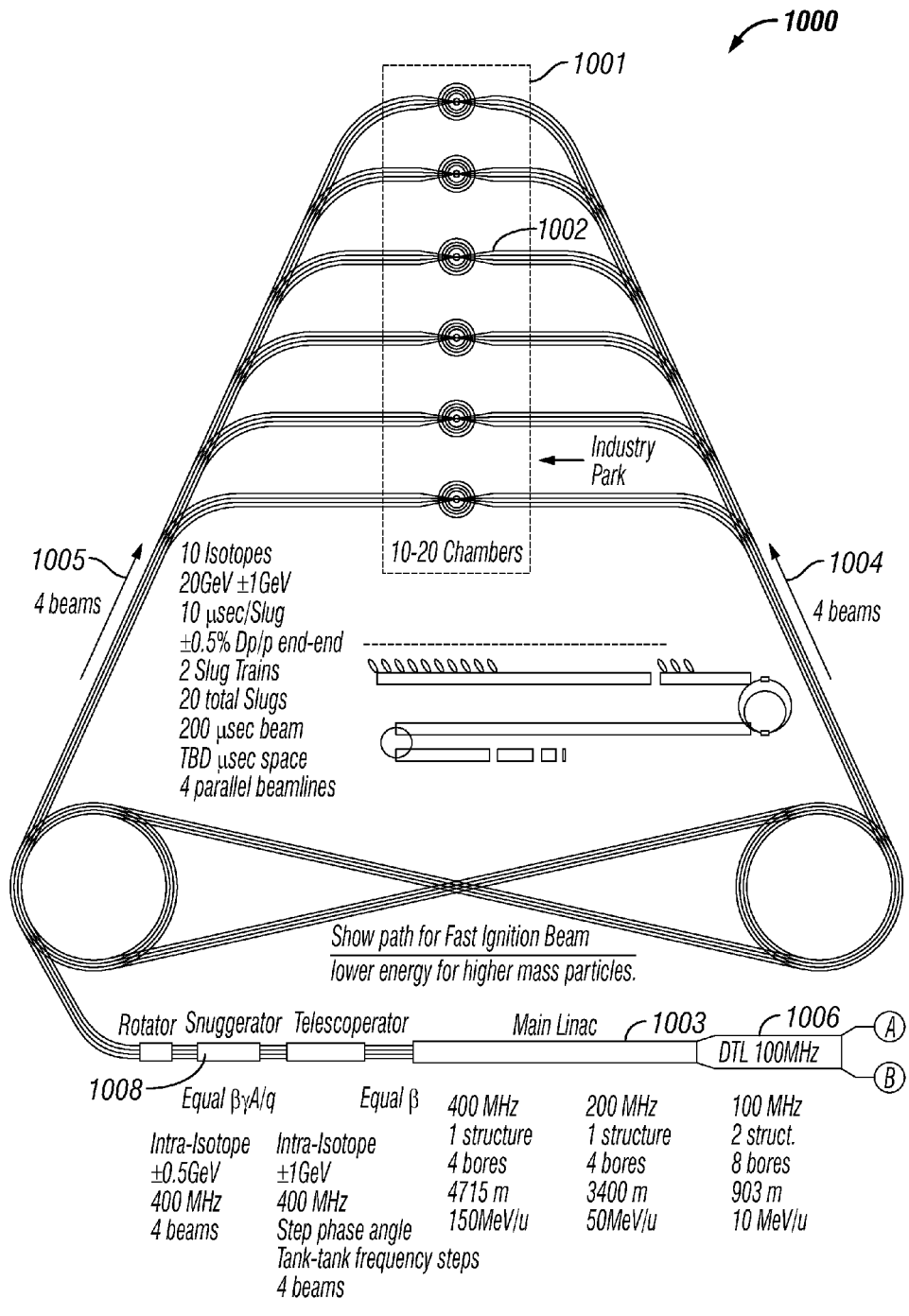
FIG. 1 provides a diagram of a single-pass HIF driver and a HIF system for power production and/or neutron source applications.
Figure 1:
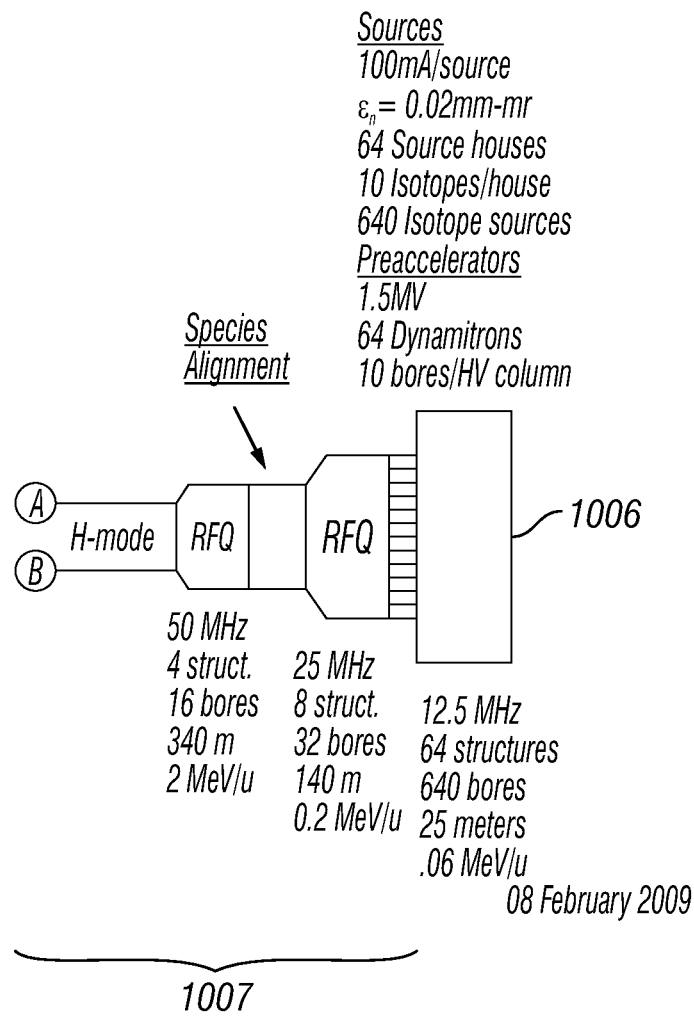

A single-pass heavy-ion fusion system for power production from fusion reactions alone, power production that uses additional energy of fission reactions obtained by driving a sub-critical fission pile with the neutrons from fusion reactions, destroying high-level and/or long-lived radioactive waste by intense bombardment with fusion neutrons, or for the production of neutron beams for various applications includes a new arrangement of current multiplying processes that employs a multiplicity of isotopes to achieve the desired effect of distributing the task of amplifying the current among all the various processes, to relieve stress on any one process, and to increase the design margin for assured ICF (inertial confinement fusion) ignition for applications including but not restricted to the above list. The energy content and power of the ignition-driver pulses are greatly increased, thus increasing intensity of target heating and rendering reliable ignition readily attainable.

The present design does not use storage rings, thus eliminating issues that previously were judged by the community of experts to be problematic. Elimination of storage rings in turn eliminates the emittance growth that attends multi-turn injection of the beam into a storage ring. This results in the beam emittance being 1/10 or less at the fusion target than beams in HIF driver configurations that use storage rings. This new low emittance makes it feasible to focus the beam to a beam spot-on-target radius of ca. 50 μm, which in turn makes the concept of "fast ignition" feasible, and gains the powerful advantages of fast ignition for high-gain from fusion pellet ignition. Further innovations are to give the Heavy-ion Driver flexibility to drive multiple chambers in the most general case of different total distances between the linac output and each of the various chambers. Using multiple chambers steeply decreases the pro-rata capital investment and operating costs per power production unit, in turn decreasing the cost of power or neutrons to users. The innovative means to increase the peak beam current also may be used singly or in various combinations for applications where beam current higher than otherwise obtainable is desired.

LEXICON OF NOVEL AND KEY TERMS

New terms are coined where indicated to facilitate description by removing the ambiguity that is unavoidable as a result of using existing terms for new purposes. In particular, "beam compression", "beam compaction", and the like apply to the whole beam generation process and to each of the steps that contributes to the process. Where new terminology is used, the convention will be to capitalize the terms. In addition to the novel terminology, the following lexicon includes some conventional terms to clarify possibly subtle meanings and as a convenience for the reader.

Beamline: A beamline comprises an arrangement of magnets that guide the beam down a vacuum tube, tube included. Several supporting things are implicit: instruments to measure the beam properties without degrading them; vacuum pumping; power supplies; associated controls; etc.

LEBT: This stands for sections of beamline for low energy beam transport. The HIF (heavy ion fusion) Power project predicates industrialization in which operating ranges are tightly fit around design nominal values, in contrast to maintaining the flexibility of multi-purpose research accelerators, which employ tunable low energy transport to match the beamline's transmission properties to beams of a variety of different beams, using source technology that is periodically changed to support evolution of the research mission, etc. HIF power performs the task of transporting the beams at low energy, but integrates the acceleration stages for compactness, improved reliability through fewer parts, and some cost avoidance.

Master timing: Two parts: 1. An absolute time reference to coordinate Driver functions with Fusion Power Chamber functions and 2. Top-level coordination of Driver functions internally. Master Timing 1 is initiated by signaling from the fuel injection system, because the accelerator response time is on a much finer scale than that for the schedule of way-points for fuel injection. Master Timing 2 is coordinated by harmonic relationships between the individual RF systems that perform individual functions in the beam generation process.

Compression or Compaction (relating to beam): In common with all ICF drivers, the goal of the processes used to generate ignition pulses is to concentrate/compress/compact MJs of "wallplug" energy in the driver's delivery vehicle to be deposited in cubic millimeters of target material in nanoseconds.

Compression (relating to fusion fuel): The definition of compression is the ratio of the fuel density at the onset of fusion to the fuel density before compression. Compression is a critical challenge for driver technologies, and classified for decades. Compression is key to the criterion of propagating burn, which is the means to achieve a high ratio of energy out to energy in. The primary mechanism for propagating burn is re-deposition of the energy carried by the helium nuclei that is one product of D-T fusion. This gives the range of the helium nuclei in the fuel around its point of origination as a key parameter for the onset of propagating burn. Stopping the helium ions and comprehensive theoretical and simulation treatments, plus weapons technology and ICF research have established a parameter involving the characteristic dimension of the heated zone and the density of the fuel within that zone.

$$\text{Density} \times \text{Length} = \text{rho} \cdot R = 0.2\text{--}0.5 \text{ gm/cm}^2$$

The length parameter decreases as density increases. For spherical geometry (similar for cylindrical), the mass that must first be heated to ignition if propagating burn is to start is:

$$\text{Mass} = \text{Volume} \times \text{Density} = (4/3)\pi R^3 \cdot \text{rho}$$

The parameter has key implications, most centrally the required degree of fuel compression.

In terms of the propagating burn parameter, the mass is:

$$R^3 \cdot \text{rho} = (\text{rho} \cdot R)^3/\text{rho}^2$$

Thus, $$\text{Mass} = \text{Constant} \cdot \text{rho}^2.$$

In terms of the characteristic dimension, of interest relative to technological capabilities for expediting propagating burn:

$$R \cdot^3 \cdot \text{rho} = R^2 \cdot (\text{rho}*R)$$

Thus, $$\text{Mass} = \text{Constant}/R^2.$$

The energy that must be deposited to raise the burning fuel is ~kT times the number of particles in the plasma fuel, in standard fashion. To reduce the amount of fuel that must be ignited, to bootstrap surrounding fuel into propagating burn, increasing the density is the mechanism.

From these relationships, a critical advantage accrues for heavy ions to accomplish Fast Ignition with Telescoping Beams. For instance, the Isotopic Species for the Fast Ignition Pulse may be selected to heat a tailored mass of pre-compressed fuel.

Microbunch: The beam in a radio-frequency accelerator is composed of packets of beam particles (ions, electrons, or other charged particles). Each RF cycle of the accelerator provides the same acceleration to each microbunch. The present term is used interchangeably herein with the term "micropulse".

Macropulse: A train of microbunches.

Isotope, Isotopic Species: Ions that have identical nuclei.

Ion Species: An Isotopic Species that may be identified further by the charge state of the ions.

Ion Source Hotel: An integrated cluster of ion sources including one for each Species, and for the Species of both the Compression Pulse and the Fast Ignition Pulse (if employed).

HVDC preaccelerator: Acceleration to high energy is by RF processes. Before RF processes can be applied, however, the speed of the beam must be raised to a value that corresponds to the synchronous speed required for a practical RF accelerator structure. Critical characteristics that are imprinted on the beam at its origin are strongly dependent on the voltage of the preaccelerator.

Marquee RF Linac: The Marquee Linac facilitates acceleration of the space-charge dominated low velocity beam by omitting bending of the beams at the lowest velocity where beamline magnetic guidance and focusing fields are least effective. The Marquee linac structure has an array of parallel bore tubes. Each tube in the Marquee carries only one Isotopic Species of beam. The bore tube array of the Marquee Linac matches the bore hole pattern of the Source Hotel and the accelerating column in the HVDC preaccelerator. The beams of specified Isotopic Species in the array of bore tubes move in a programmed temporal sequence. The beams in temporal sequence that are in parallel beam tubes in the Marquee are fed into a single beam tube (one per Marquee) for following beam pulse generation processes.

Telescoping: A process that accelerates a variety of different isotopes in individual macropulses in a sequence timed to cause the various isotopic macropulses to telescope into each other in order to arrive at the fusion target simultaneously or with a programmed sequence of arrival times that achieves a desired ignition pulse power profile. Beams of different Isotopic Species propagate in a common beamline, with static magnetic steering and focusing, as a result of accelerating different Isotopic Species to correspondingly different energies such that all isotopes have the same magnetic rigidity, a function of ion mass, speed, and charge state. Telescoping at the fuel target is the payoff for accelerating a multiplicity of Isotopic Species, which multiplies the six-dimensional phase space available to the designer.

Telescoper: The last section of the linear accelerator has provisions to emit different Isotopic Species with a common magnetic rigidity. This causes the Slugs of various Isotopic Species with different masses to have the different speeds as needed to arrive at the fusion target a specified sequence. The control program for the Telescoper's RF waveform adjusts the time gaps between Slugs in each Ignition Pulse so that the various Slugs arrive according to a specified schedule at the fusion fuel targets in Multiple Chambers at various distances from the Telescoper.

Merging: Multiplying the current in a single beam by directing simultaneous, parallel beams into a common magnetic beamline with an attendant increase in transverse emittance.

Slug: A macropulse of one of the isotopic species designed for telescoping beams. A Slug is formally identical to a Macropulse. The term "Slug" or "Slug Species" or "Slug Macropulse" is used to avoid confusion.

SubSlug: A Slug may comprise a small number (e.g., four) of identical parts called SubSlugs. The SubSlug structure may be created by a gating electrode on the ion source, a "beam chopper" in the early portions of the accelerator, or a combination of both. The SubSlug structure sets up the current amplification steps of Merging and Loop Stacking.

SlugTrain: A complete series of Isotopic Slugs. An ignition pulse may comprise more than one Slug Train, to enable heating a fusion target with beams coming at the target from more than one direction. The Isotopic Species and the Microbunches in the Slugs of different Slug Trains are identical, but the sequence of spaces between Slugs in different Slug Trains may be different, if needed to accommodate different total beamline lengths to the fusion targets.

Loop Stacking Uses a 360 degree bend in the beamline to return a SubSlug to the start of the Loop parallel to the input beamline in synchronicity with the next following SubSlug. The result of Loop Stacking is to multiply the number of beamlines (e.g., one-Loop Stacking doubles the number of beam lines) in a once-through process, in contrast to multi-turn injection in storage rings that stacks beams in transverse phase space in a storage ring's single boretube.

Snug: The process of moving the individual Microbunches within each Slug closer together.

Cradling: A feature programmed into an waveform involving a dynamic frequency shifting, in particular the dynamic frequency shifting used for Snugging. The purpose of the feature is to maximize the efficiency of the Snugger by making it possible to use the widest swing of phases around the zero crossing.

Snugger: The accelerator section that effects the Snugging process.

Bunch rotator: Bunch rotation refers to the orientation of the phase space ellipse. The means to rotate the bunch in this sense is to work on the bunch with electric fields that vary in time so that ions in the bunch that pass a point at different times receive different accelerations. The purpose of interest is to handle the conserved phase space volume to retain the focusing to a spot while also manipulating the ions of the beam to arrive within the necessary pulse duration.

With the conventional definitions for the longitudinal phase space, the horizontal axis represents time and the vertical axis represents momentum. The phase space of a collection of particles (in this case, heavy ions) is "a constant of the motion". In an RF accelerator, the phase space of the bunches evolves as in an elliptical shape that can be squished on one axis and will respond by stretching on the other axis.

Figure 26:
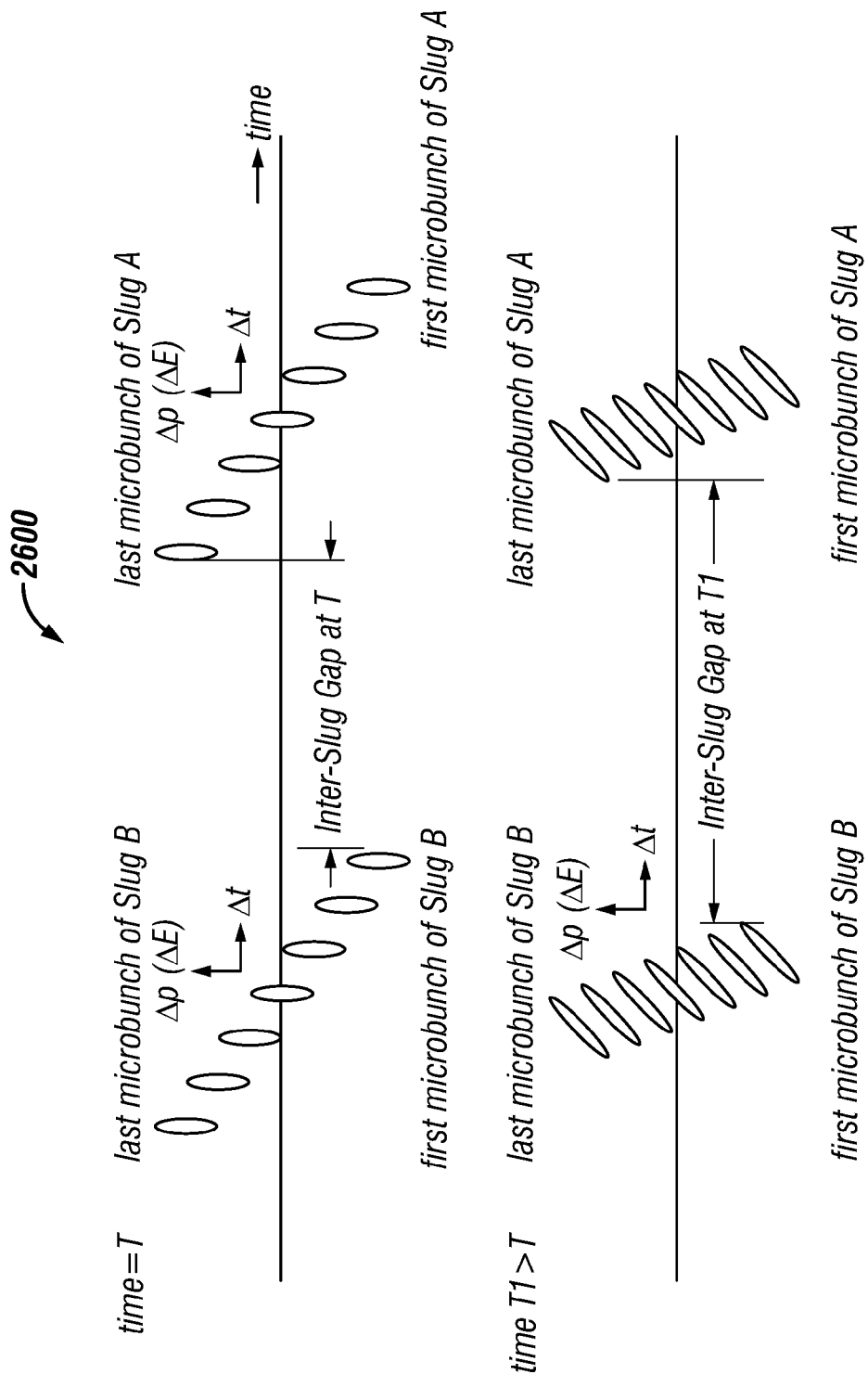
FIG. 26 provides an illustration of increasing gap between slugs by snugging.

If a bunch is tall and skinny, as shown in FIG. 26, it means the momentum spread is at a relatively large value and the time spread must be correspondingly at a relatively small value. Momentum spread results in chromatic aberrations, which must be within some limit (like 1%) if the bunch is focused to a small spot. If the momentum spread is too large, the chromatic aberrations may be the parameter that determines spot size.

If a phase space ellipse is left alone to drift, the higher momentum particles will move ahead and the lower momentum particles will fall behind. The effect is that the ellipse will shear along the axis.

Bunch reflector: The purpose of reflection is to reset the phase space ellipse so that it repeats the shear (described above) as the bunch lives and moves forward. One repeats the process, like Groundhog Day, until you get the bunch to where you want it to go.

Whereas "bunch rotation" connotes "laying the bunch down" on the time axis to minimize the momentum spread at the expense of time spread, bunch reflection rotates the bunch into its mirror image in either axis. Since it is not physical to reset the position of the bunch in time, physically, the reflection is done by shearing the bunch via the applied electric field—that means that the leading tip that is at the highest momentum spread is sent down through the axis to an equally negative momentum spread. Thus, the particle at the leading tip which has been fastest becomes the slowest and begins falling toward the back, while the particle at the rear that was the slowest becomes the fastest and begins moving toward the front.

For illustration, the HIDIF design rotates the bunch after it shears in phase space during a drift distance of 160 m. With the same parameters, a reflector would be needed every 320 m. It will be a bit easier technologically to reflect the bunches more frequently, as the HIDIF pushes the phase width of the bunch at the time when rotation is applied to the extent that they have to fabricate a sawtooth waveform to knock the ellipse down—i.e., to rotate it. They do that to get the longest length along the time axis, and therefore the lowest momentum spread. What we want to accomplish can be done with much simpler demands on the RF waveshape.

Snug Stopper: The snugging process is stopped temporarily to allow the microbunches to maintain their positions in the individual Slugs, while the Slugs "drift" to points at prescribed distances from the targets in multiple reaction chambers.

Helical Delay Line (HDL) 2800: Shown in FIG. 28, a coiled length of beam line in an embodiment. All Slugs exit the Delay Line at approximately the same moment. The specific timing of the various Slugs is set to: a. allow time for a pulsed magnet to switch the slugs of different species a common beamline, in which the continue to the fusion target. The schedule of arrival of the various Slugs (in each SlugTrain of an Ignition Pulse), set at the Ion Sources and coordinated with the waveform of the RF power, results in Slugs arriving at their respective exit ports and, in turn, at the switch magnets to become realigned in the SlugTrains in closer succession, with the spacing schedule set for Telescoping to culminate at the fusion fuel targets. The HDL carries multiple beams in parallel beamtubes, guided and focused by fields from magnets that are integrated into a compact and economical array. Design of the beamlines, with switch magnets, at the exit port locations accommodates switching the Slug from each of the parallel beamlines into a corresponding individual beamlines that continue the array of parallel beamlines to the point where they are reinserted into beamlines that continue to the Multiple Chambers with no further change to the number of parallel beamlines.

Slicker: Restarts the Snugging process at a distance ahead of each chamber such that the Microbunches will complete a specified slide over each other to provide the desired current profile at the pellet. The Slick process is subject to the constraints of the Liouville's Theorem. Simultaneous with progress of the Slicking process, individual microbunches stretch (or "shear") while the area of the longitudinal phase space ellipse remains constant. The result is that individual microbunches become longer, skinnier ellipses in the longitudinal phase space as they simultaneously approach the fusion target and slide on top of one another.

Fast Ignition: A class of fusion target designs that separates the two processes of (a) fuel compression and (b) fuel ignition. Heavy ion beam driver systems can be designed with or without the Fast Ignition feature. Fast Ignition improves the overall efficiency of achieving both the fuel density and ignition temperature requirements.

Compression Pulse: The portion of the driver pulse that drives the processes that compress the fusion fuel.

Fast Ignition Pulse: The portion of the driver pulse that is focused into the approximate center of the precompressed fuel. The duration of the Fast Ignition pulse is characterized by the length of time for the fuel to disassemble, about the time for the fuel density to drop by a factor like two.

Ignition Pulse Profile: The series of arrival times of different Slugs at the fusion targets is set so as to form the temporal shape of the pulse at the target that most effectively "drives: a. the fuel into a compressed state, b. heats the fuel to ignition, or c. performs both a and b in an integrated process of compressing and heating.

Multiple Chambers: HIF fusion power is most economical if a single heavy ion driver system ignites fusion pulses in a repeating sequence in multiple fusion chambers. In the most general layouts of multi-chamber fusion power parks, the distance from the accelerator varies from chamber to chamber. The dynamic beam generation processes must accommodate the variety of distances.

Final focusing lens: Final focusing means the focusing outside the wall of the chamber that then lets the beam fly ballistically to the target. The term 'final' distinguishes this from the many points where the beam is "focused" during transport (in "strong focusing" transport beamlines) to keep it from spreading.

FIG. 1 shows a diagram of a heavy-ion fusion system 1000, known herein as an "Energy Park", incorporating the innovations described herein below. An Energy Park may use power production from fusion reactions alone or by multiplying the fusion energy by using the fusion neutrons to drive fission reactions in sub-critical fission piles. As desired, an Energy Park may incorporate features for destroying high level radioactive waste by intensely bombarding such materials with fusion neutrons, or for the production of neutron beams for various applications. In brief, the system includes a plurality of reaction chambers 1002 in which pulses of heavy ions are directed to targets, generally known as pellets, containing fusion fuel. In the embodiment shown, the reaction chambers 1002 are grouped in a system 1001 known as "Industry Park". As described herein below, the pulses occur in two phases: a compression pulse to pre-compress the fuel in the target in preparation for a fast ignition pulse, which raises the temperature of a relatively small portion of the compressed fuel to ca. 10 keV to cause vigorous fusion reactions. Some of the energy carried by the helium nucleus emitted from the D-T fusion reaction is redeposited in the fuel, raising its temperature further and accelerating its reaction rate. In the process called "propagating burn", fuel adjacent to the fast-ignited mass is ignited by heat transferred from the fast-ignited fuel and subsequently self-heated by redeposition of the energy of the helium nucleus from the fusion reactions, photon flow, and hydrodynamic processes. The burn propagates very quickly throughout the fuel, causing ca. 40% of the fuel to burn. The heavy-ion beams 1004, 1005 are typically routed toward the reaction chamber along beamlines (also 1004, 1005). In one embodiment, each of the reaction chambers 1002 is serviced by two beamlines, each beamline delivering four heavy-ion beams. An accelerator 1003 includes an ion source 1006, an accelerator section 1007 and a current amplification module 1008, known herein as a "snugger". Ions are emitted from the source 1006 and received by the accelerator 1007, where, in addition to being accelerated, they undergo other processing such as focusing, until they are emitted from the accelerator section and received by the snugger 1008. After being emitted from the snugger, the ions undergo further processing, described in detail herein below, before they are allowed to drift in the direction of the industry park 1001, comprising the reaction chambers 1002. Energy liberated as a result of fusion reactions is coupled to a power plant for conversion to other forms of energy. In applications where the fusion energy output is amplified by fission reactions in a sub-critical fission pile placed so as to be irradiated by neutrons from the fusion reactions and thereby to caused to undergo fission reactions, the net energy from fusion and fission processes is coupled to a power plant for conversion to other forms of energy. This is similar to case of only fusion energy, but with additional features appropriate for handling fission materials.

To use neutrons from fusion reactions for applications such as research and production of special isotopes, beams of neutrons in collimation channels provided for the purpose may be directed into moderators to achieve the neutron spectra desired for these applications. The beams also may be directed into a neutron multiplying material or a sub-critical mass of fission material to: 1. Increase the total number of neutrons available that that point for the intended applications, 2. Exchange lower energy neutrons for the high energy fusion neutrons, and 3. Be integrated with the moderator as previously said.

Clean Reaction Chamber Innovations

Figure 2:
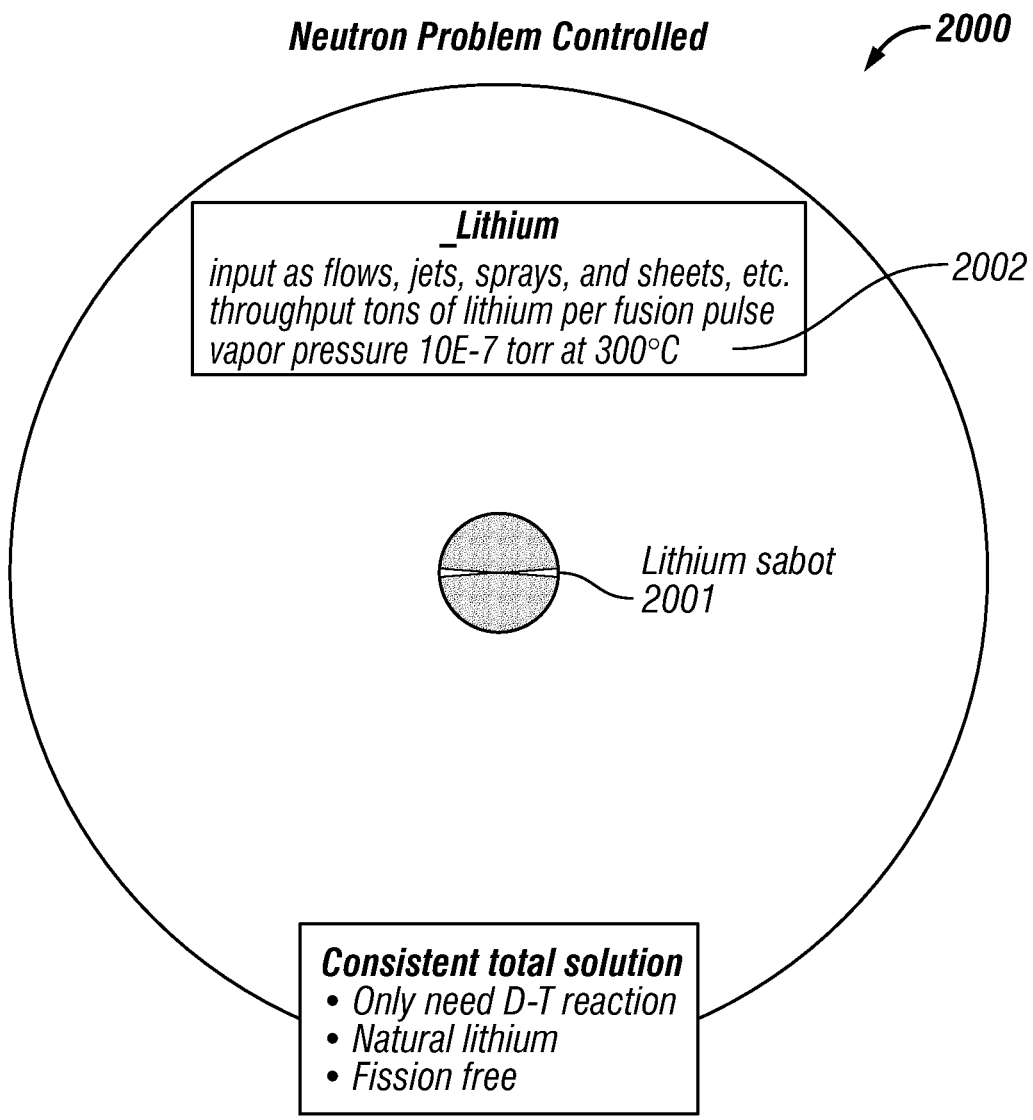
FIG. 2 provides an illustration of a chamber and protection of the chamber from neutrons by lithium sabots and liquid lithium sprays.

The Heavy-ion Driver delivers an Ignitor Pulse via a practical number of beams to the entrance ports into the Reaction Chamber (e.g. eight beams total, with four on each of two sides). The salient features of the chamber embody precautions taken to convert the 14 MeV neutron energy to heat without reaching the chamber 2000 walls. As shown in FIG. 2, this is accomplished by initiating the reaction with the fuel pellet inside a substantial body of lithium 2001. In the simplest example, this is a sphere of lithium about 60 cm in diameter, hereinafter known as a lithium sabot. Additional protection for the chamber 2000 is provided by lithium spray and droplets 2002.

Figure 3:
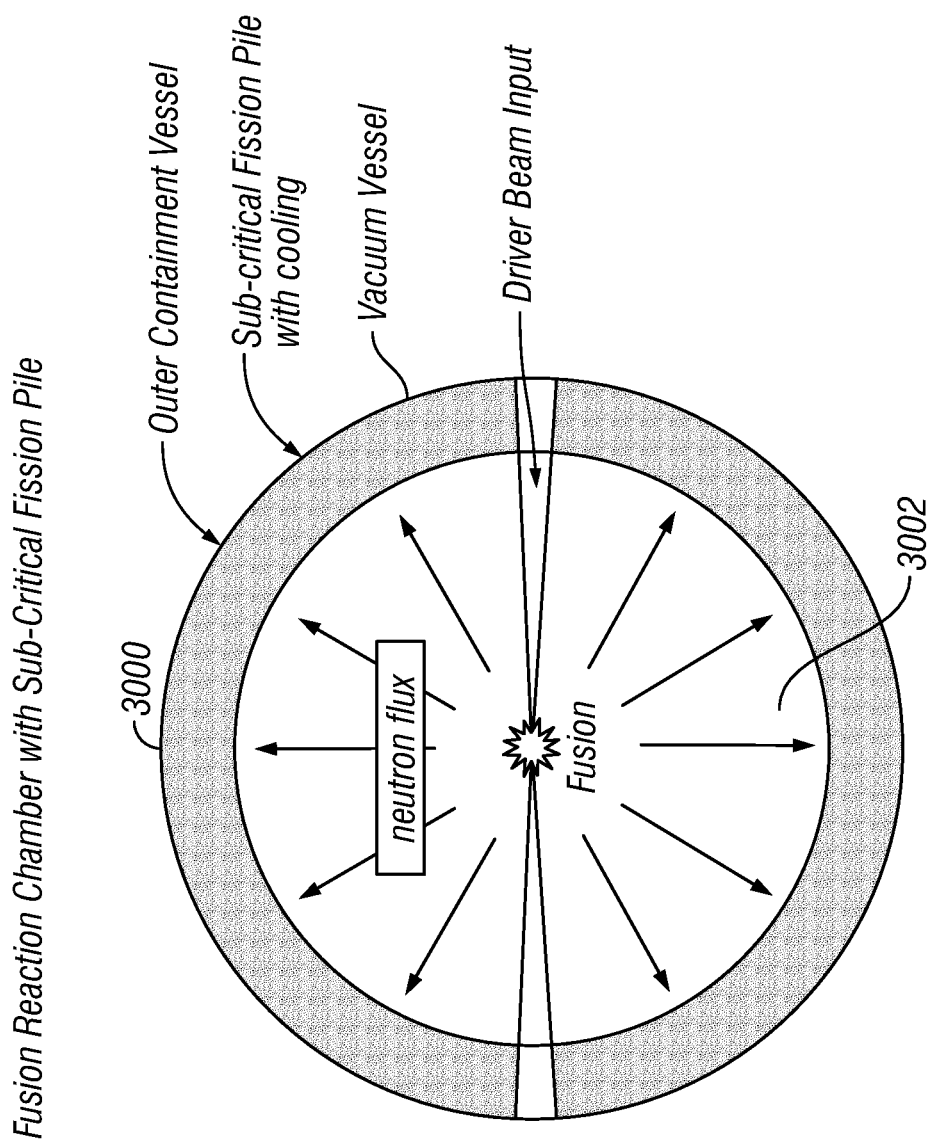
FIG. 3 provides an Illustration of a lithium sabot configured to cause expansion in preferred directions, such as along the axis of a cylindrical containment vessel.

The lithium sabots 3000 also shield the fuel targets at cryogenic temperatures from the elevated temperature in the reaction chamber. The fuel-transporting sabots may be variously shaped and configured, with appropriate access holes 3001 for the heavy ion beams. In the embodiment of FIG. 3, the lithium sabot is spherical in shape, however other embodiments exist wherein the sabot assumes other shapes, cylinders or cones, for example. In all cases the thickness of the lithium must be at least 30 centimeters from pellet to the closest boundary of the pellet holder. Collisions between the neutrons and the lithium atoms over this radius convert a preponderance of the kinetic energy carried by the neutrons to heat. Nuclear reactions of the neutrons with the lithium regenerate tritium, produce additional helium and more heat, and result in a preponderance of the neutrons being captured and denied access to the materials of the chamber walls. As shown in FIG. 3, the lithium sabot 3000 may be configured to cause expansion in preferred directions 3002, such as along the axis of a cylindrical containment vessel.

Figure 4:
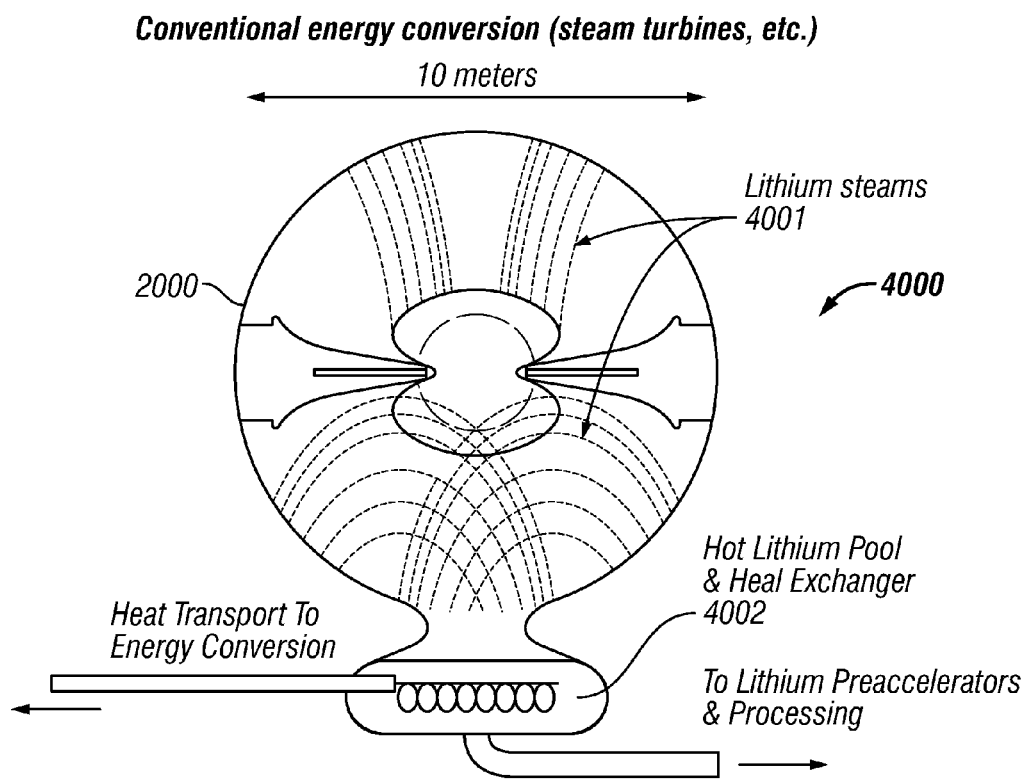
FIG. 4 illustrates protection of a spherical reaction chamber from neutrons by lithium streams.

The reaction chamber 2000 can have various shapes from spherical to cylindrical to composite shapes of various conic surfaces. FIG. 4 illustrates an internal view 4000 of a reaction chamber 2000, schematically illustrating a rain of protective lithium droplets 4001, is shown. A bounding envelope must withstand both high vacuum and moderate transient pressures and will be constructed from steel, and other materials. Leaching of alloy materials is avoided by materials contacting only lithium returning from the low temperature end of the heat exchanger. Additional lifetime is added to the chamber by cladding of alloy steels with simple iron on the surfaces facing lithium. Lithium flowing in conduits such as pipes and/or tubes also flows at, mainly, the low, incoming fluid temperature, approximately the melting point of lithium (180.5° C.).

The heated lithium cools from a plasma state and eventually condenses in a series of phases, and the chamber is back to its 'cool' state ready for another reaction to take place in a fraction of a second. This requires pumping tons of lithium per pulse to cool and protect the chamber walls, e.g. approximately five tons for fusion releases of two BOE (barrel of oil equivalents) each, or 50 tons for twenty BOE releases. The heated lithium goes through the heat exchangers and returns as cool fluid to cool the chamber and re-establish the vacuum (low gas density) necessary for the ignitor beam to propagate across the chamber radius to ignite the next fuel target.

The total mass of lithium for each fusion pulse, injected into the chamber at flow rates tailored along the chamber's length for the desired temperature history, is sized according to the integrated scheme of fuel sabot injection, ignitor beam passage, fusion energy containment and conversion, expansion of the lithium, extinguishing the plasma, further cooling to heat transfer temperatures, and restoring the required pre-pulse environment. These phases compare to the processes of an internal combustion engine operating on chemical combustion:

power stroke with power take off;
exhaust of spent fuel charge;
rejection of unused heat;
fuel charge injection; and
ignition.

Figure 5:
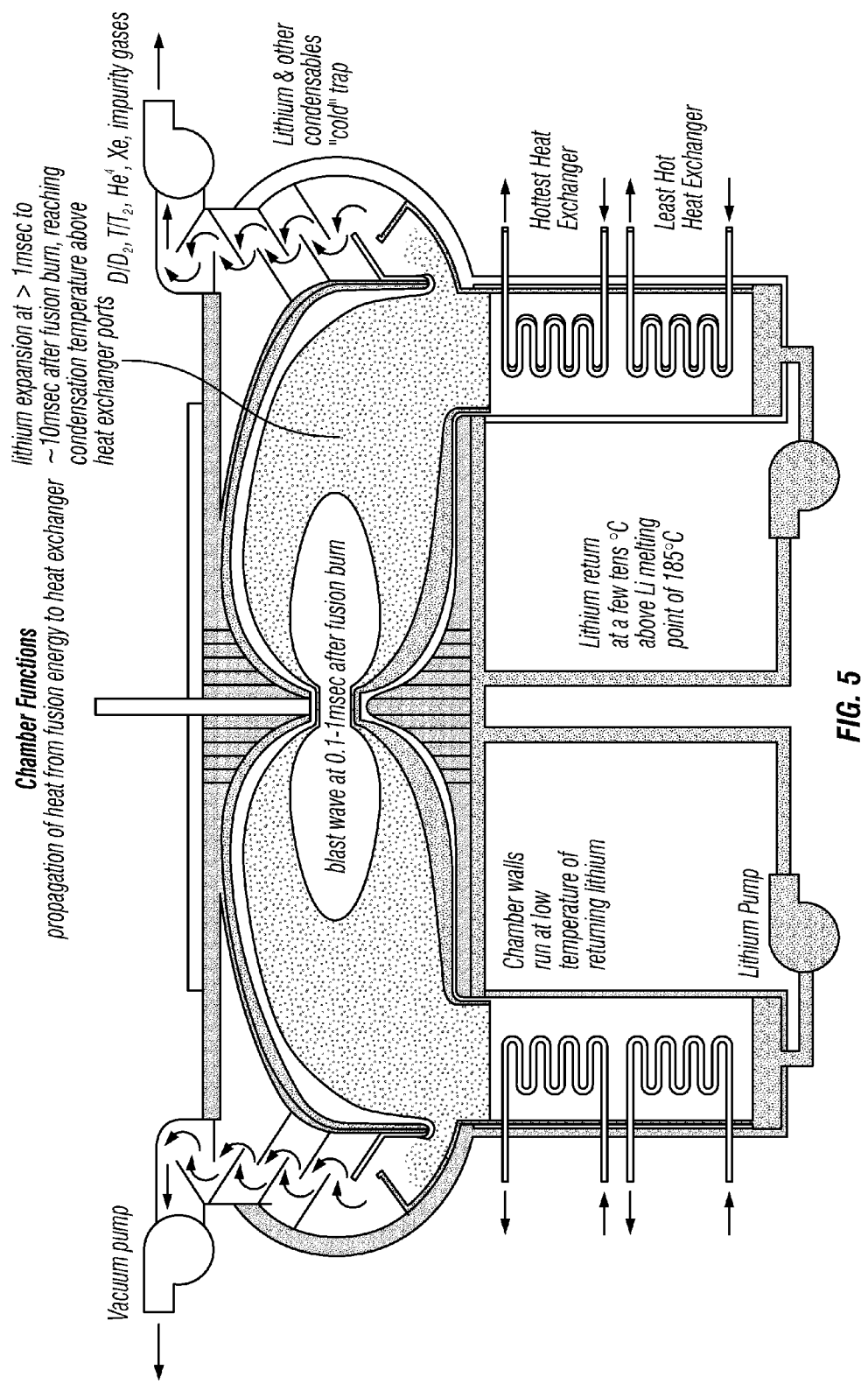
FIG. 5 provides an illustration of a reaction chamber environment at an early stage of lithium plasma expansion approximately one millisecond after the fusion energy release.
Figure 6:
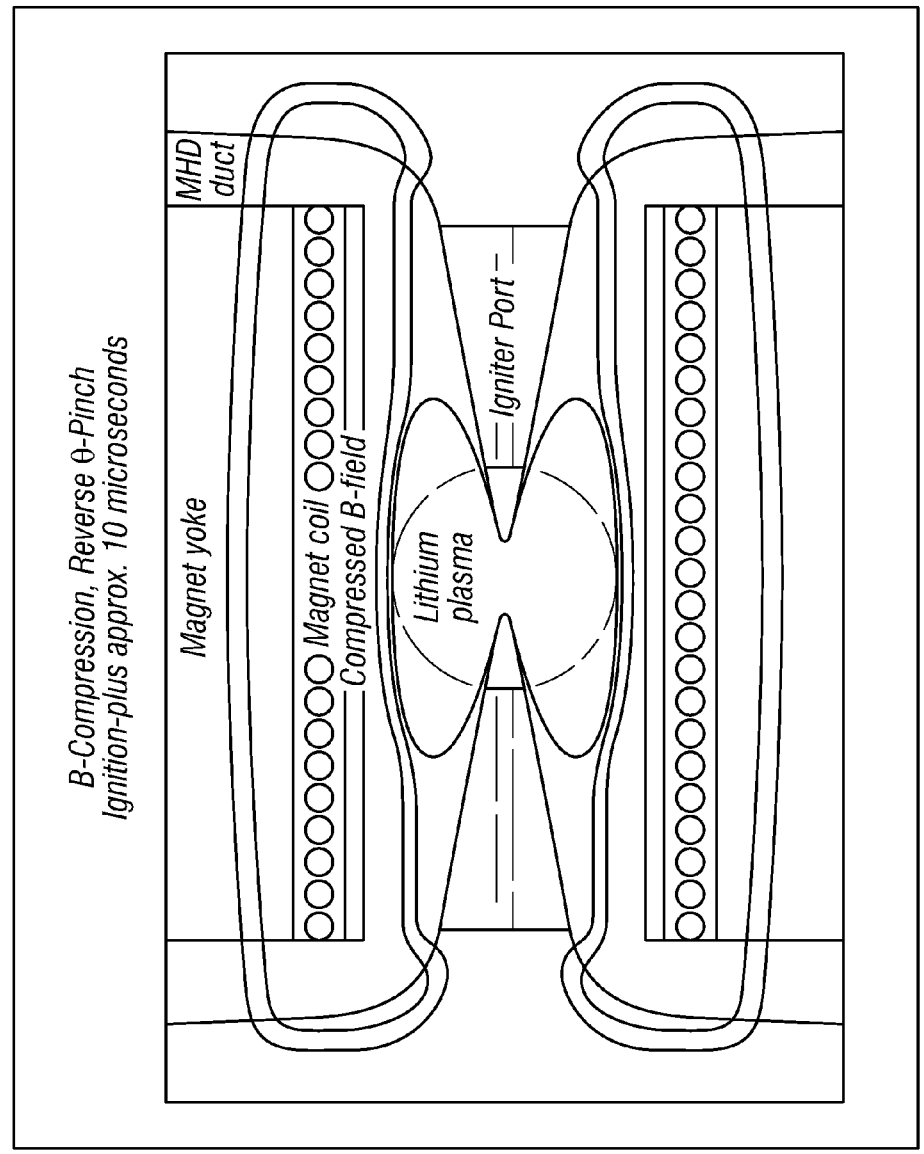
FIG. 6 shows a schematic arrangement for an energy conversion to electricity by a non-contacting, topping-cycle.
Figure 7:
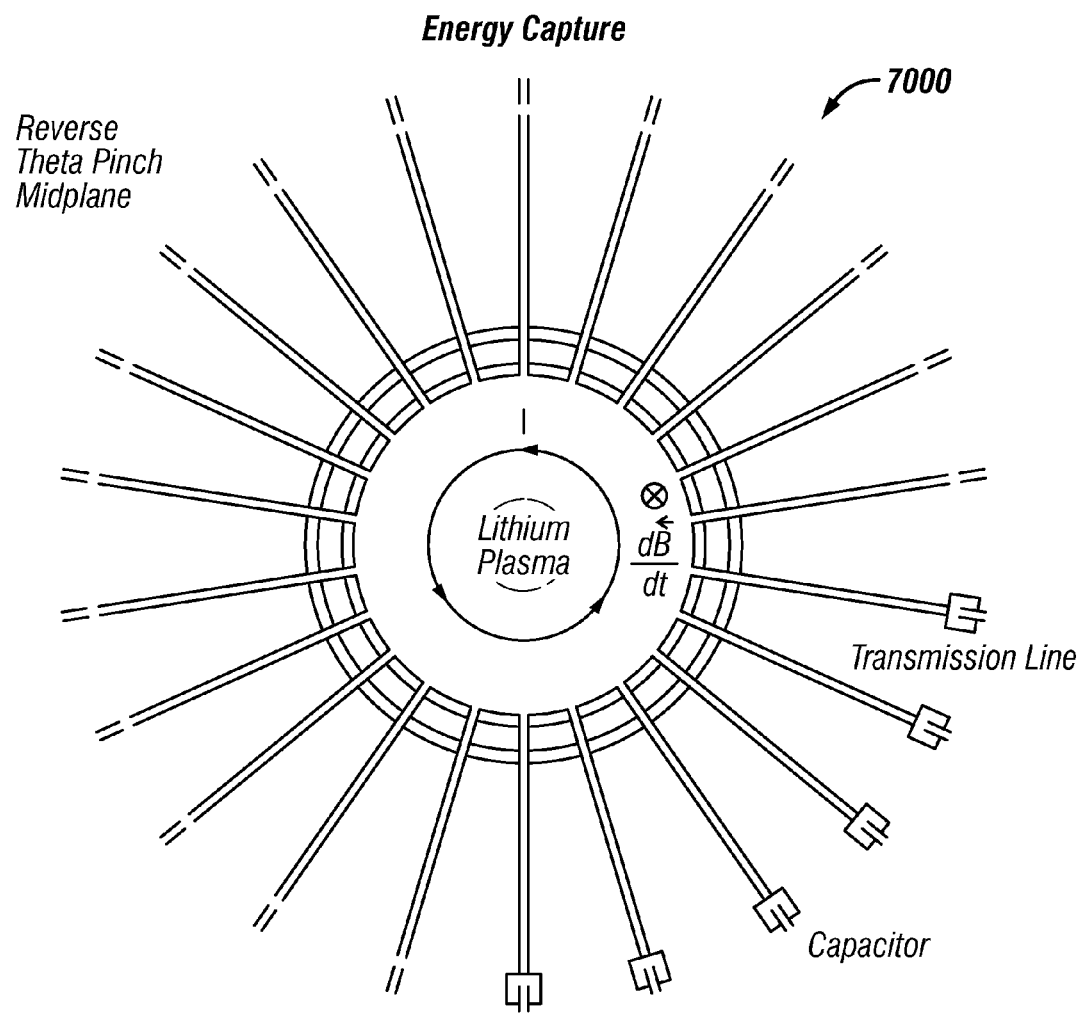
FIG. 7 provides a diagram of Pulsed direct energy conversion involving transmission, handling, and processing technology for timescales of approximately 10 microseconds.

FIG. 5 provides an illustration of a Chamber 5000 environment at an early stage of lithium plasma expansion around one microsecond after the fusion energy release. For illustration, fusion releases equivalent to the energy contained in two barrels of oil, absorbed in the lithium sabot, form electrically conducting lithium plasmas. Regarding the plasma as the thermodynamic working fluid at this stage, non-contacting means may be provided that operate with this extremely high temperature working fluid, to realize a topping cycle with a revolutionary increase in conversion efficiency. The novelty in the present embodiment of this energy conversion technique is that it applies to the combined heat of the electrically neutral neutron, which carries 80% of the total fusion energy release, as well as the electrically charged helium nucleus, which carries only 20% of the total fusion energy release. FIG. 6 shows a schematic arrangement 6000 for a energy conversion directly to electricity by a non-contacting, topping-cycle. As shown in the diagram 7000 of FIG. 7, pulsed direct conversion involves transmission, handling, and processing technology for timescales of around 10 microseconds.

Neutrons are insulated from the chamber walls by flows and sprays of low temperature lithium returned from the heat exchanger 9001. A large chamber for producing 100 BOE, or more, per minute provides adequate gas dynamic expansion. The volume of the plasma that forms upon ignition of the fuel pellet at the center of the Lithium may be about 1440 cubic meters. Microseconds after the pellet undergoes Fusion the lithium surrounding the fuel pellet has vaporized to become Plasma whose energy is being harvested by direct conversion to electromagnetic fields and electric currents.

Further cooling and chamber wall protection is accomplished by filling the chamber volume with sprays of liquid lithium droplets. Out to a certain distance from the fusion burn, this lithium becomes part of the plasma. Further out, lithium is even vaporized. Lithium covering the walls protects the walls by ablation, and the lithium beneath the ablation boundary maintains the walls at the modest temperature of the lithium returned from the heat exchanger 3001 subsystem. Heat is not extracted through the main walls of the chamber, as the bulk of the heat flows towards the ends of the cylindrical expansion volume. The lithium working fluid progressively cools by interaction with lithium sprays along the axis of the cylindrical chamber, and condenses beyond the direct conversion zone. Condensed, hot lithium comes in contact with the primary heat exchanger 3001 and heat is transferred to a secondary fluid for use in processes located outside the primary containment, defined as the lithium boundary.

Exhaust of fusion reaction products concerns primarily the helium and tritium produced. Tritium is needed to fuel later D-T (deuterium-tritium) pulses. Tritium containment also is the chief radiological hazard of the entire HIF power system. The large body of knowledge regarding tritium safety is clear on the engineering requirements. The HIF chamber system economically accommodates several layers of redundant features to assure tritium safety.

Figure 8:
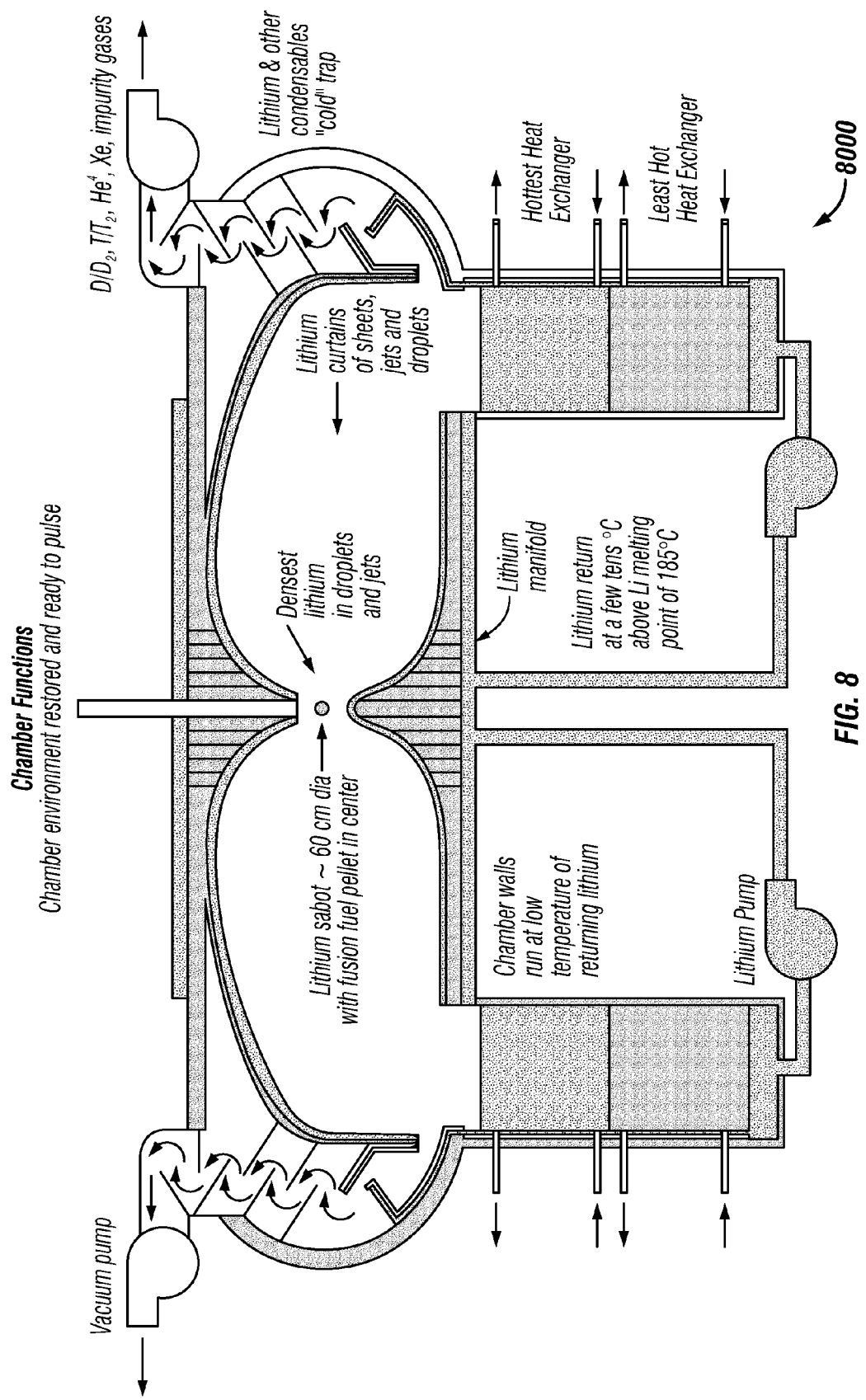
FIG. 8 shows a reaction chamber with lithium restored to receive a fusion energy release, with vacuum restored to allow propagation of a heavy-ion ignitor pulse.

Prior to the next energy release, the low temperature lithium acts as a getter pump to scavenge lithium vapor left behind by the power and exhaust dynamics. FIG. 8 shows a Chamber 8000 with lithium restored to receive a fusion energy release, with vacuum restored to allow propagation of the HIF ignitor pulse.

The temperature of the lithium progressively decreases as it functions to:
 capture a preponderant fraction of the neutrons and essentially 100% of their energy;
 to knock down the pressures of the explosive pulse; and
 to convert energy to electricity in non-contacting, direct-conversion processes.

Lithium in liquid form at different positions in the reaction chamber experiences temperatures as low as 200 degrees Celsius to temperatures as high as 1200 degrees Celsius each time a pellet ignites, not counting the room temperature lithium of the fuel sabot or the temperatures of this and immediately surrounding lithium during the plasma state. This heat flux, along with the electrical energy extracted by direct conversion, is the major product of the fusion reaction. Secondary heat exchangers convert this heat to other products such as hydrogen gas for use in producing synthetic fuels, steam for use in conventional steam turbines, and heat for the desalinization of water by evaporation.

Figure 9:
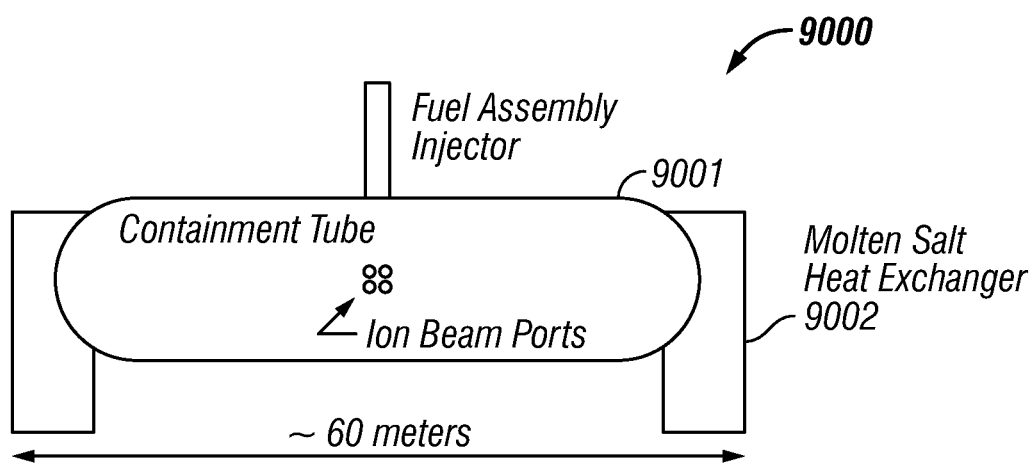
FIG. 9 provides an illustration of a cylindrical containment vessel and primary ancillary elements, principally primary heat exchangers, fuel injector, and vacuum pumping for exhaust of reaction products and the fraction of the fuel that remains unreacted.

An external view 9000 of a cylindrical reaction chamber 9001 and its primary heat exchange system 9002 is shown in FIG. 9. In addition, a fuel injector, and vacuum pumping for exhaust of reaction products and the fraction of the fuel that remains unreacted (typically about half).

Because tritium is released to the working fluid during the reaction it must be recovered to meet governmental radiation safety standards and to provide the Tritium necessary for subsequent reactions. To assure that no Tritium is accidentally released to the environment, the whole of the reaction vessel and its heat exchangers is typically enclosed in a secondary containment vessel. This vessel may be filled with a gas that is not reactive with Lithium, for example Argon. Supporting activities for the reaction vessel 2000 include:
 Lithium pumps;
 Pellet making facilities;
 Lithium sphere, or other carrier, manufacturing facilities;
 Tritium recovery facilities;
 Large vacuum pumps; and
 Secondary heat exchangers.
Of all of these supporting activities, only the secondary heat exchangers can be outside the secondary containment structure. All functions internal to the secondary containment are capable of operating remotely, for no oxygen or water or water vapor can be located where it could come in contact with the lithium. Lithium oxidizes rapidly in the presence of air and reacts violently when in contact with water.

Ignitor Pulse Structure and Timing

Figure 10:
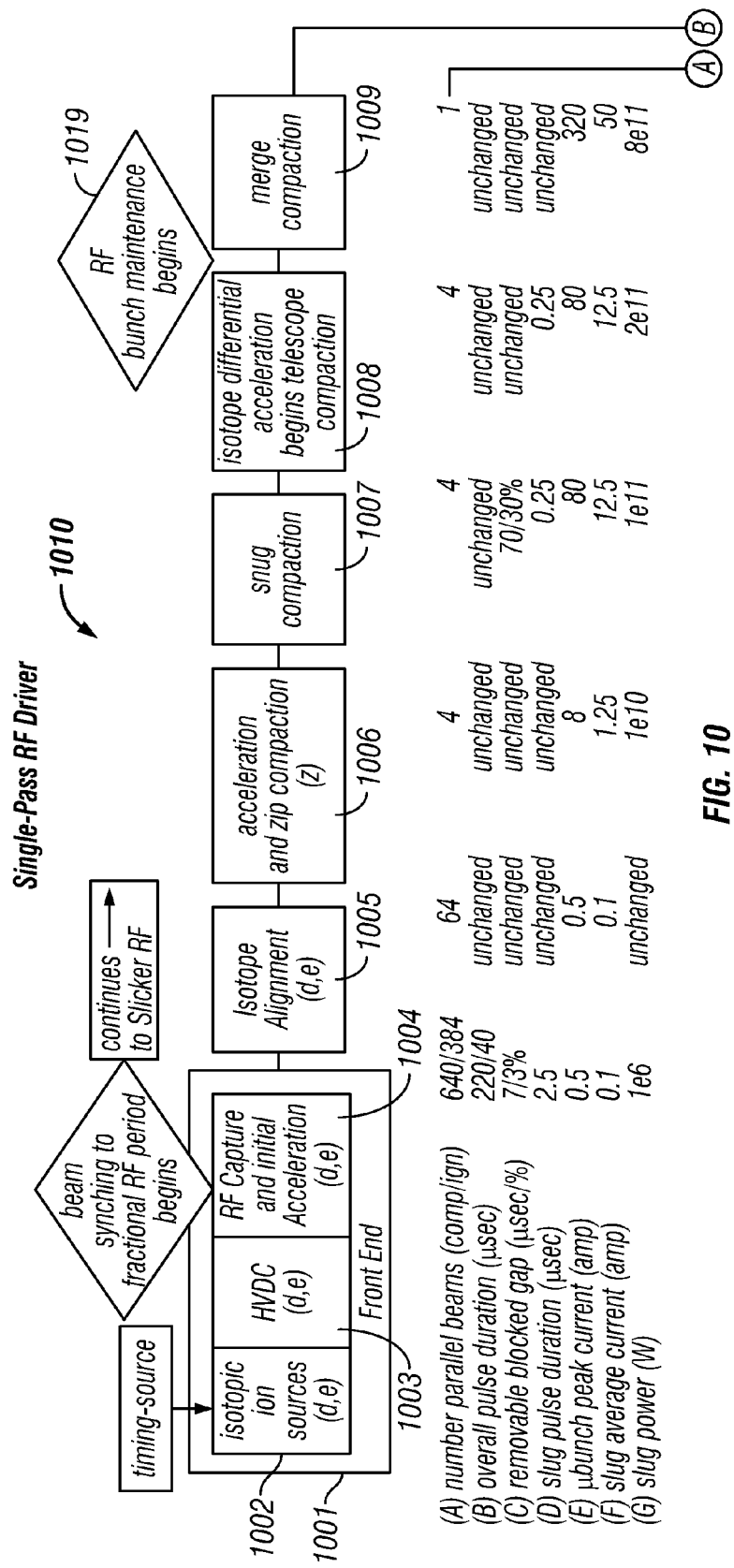
FIG. 10 provides a block diagram of a Heavy-ion Driver.
Figure 10:
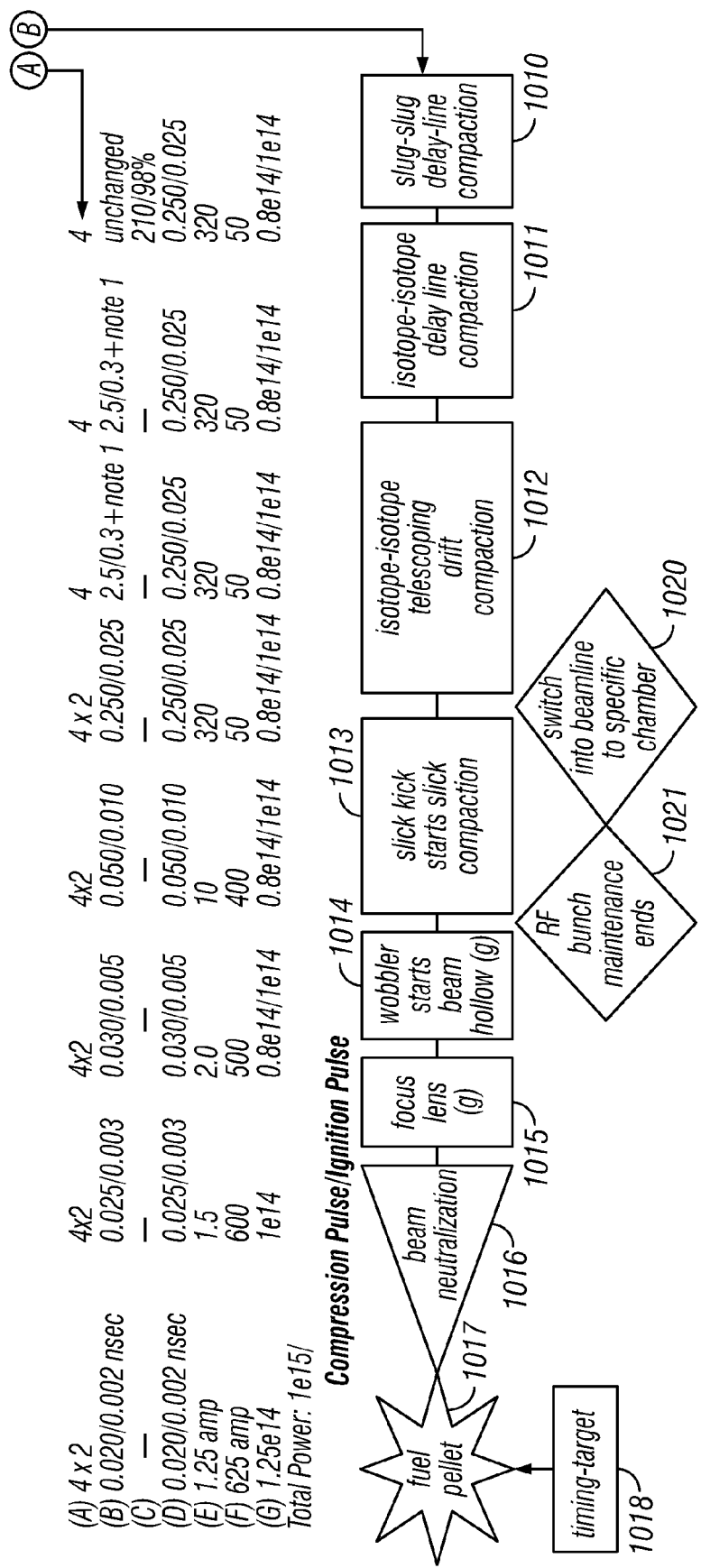

It is instructive to regard the Driver design from the vantage point of the controls system. This especially aids design illumination by providing a common framework to describe the manner in which the individual processes function and the requirements to coordinate them. Referring now to FIG. 10, a top-level functional block diagram of an HIF Driver 1000 is shown:
 Front end 1001;
  isotopic ion sources (d, e) 1002; timing source;
  HVDC (d, e) 1003;
   RF capture and initial acceleration (d,e) 1004; beam synching to fractional RF period begins; continues to Slicker RF;
 Isotope alignment (d, e) 1005;
 Acceleration and Zip compaction (z) 1006;
 Snug compaction 1007;
 Isotope differential acceleration begins telescope compaction 1008;
  RF bunch maintenance begins;
 Merge compaction 1009;
 Slug-slug delay-line compaction 1010;
 Isotope-isotope delay-line compaction 1011;
 Isotope-isotope telescoping drift compaction 1012;
  Switch into beamline into specific chamber 1020;
 Slick kick starts slick compaction 1013;
  RF bunch maintenance ends 1021;
 Wobbler starts beam hollow (g) 1014;
 Focus lens (g) 1015;
 Beam neutralization 1016;
 Fuel pellet 1017; and
 Timing target 1018.

The above design provides the timing accuracy to cause the various dynamic processes of beam generation to culminate at fusion fuel targets with including power profile and aiming, at fusion targets power profile and to meet the targets as they move through the target zone. The design also provides the timing flexibility required to achieve specified Ignitor Pulse parameters, in Multiple Chambers. Overall Ignitor Pulse programming is able to vary the spacing of Isotopes based first on the speeds of the different ions a table of Isotopic Species. The timing for source gating is derived from the master clock of the RF synchronizer.

Improvements in the areas of each of the functional blocks include:

New Features of Ion Sources and Low Velocity Acceleration:

Most of the new mechanisms for the compaction of the beam come after the beam leaves the linac. The new design also involves changes in features of the linac, which complement the improved beam reconfiguration (manipulation) design. Most novel are the features related to the more effective use of a larger number of different Isotopic Species than in previous HIF driver designs. The Front Ends of the accelerator include a combination of underused but previously demonstrated features plus the novel integration of the first RFQ (radiofrequency quadrupole linac section).

Ion Source Hotel

The Ion Source Hotel (array) integrates many isotopic sources into a compact cluster of one for each Species, including both the Species for the Compression Pulse and for the Fast Ignition Pulse (if employed). The output pulses from individual isotopic sources are given synchronized timing via: 1. a gate voltage and 2. pulsed excitation of the ion emission process in a programmed series to produce the basic building block of Slug beam lets in the desired sequence. The compact array of beams enables the HVDC column to continue the parallel geometry of the beam paths from the specified array of apertures.

HVDC Preaccelerator

HVDC source technology in excess of 1 MV, e.g., 1.5 MV demonstrated in prior art, viz., Argonne National Laboratory 1976-80. In conventional design practice, the peak current limit for transport in a strong focusing magnetic beamline increases with $(\beta\gamma)^{5/3}$ ($\beta$=v/c, c=speed of light, $\gamma$=relativistic factor). Using commercial ion source technology and commercial HVDC sources, this scaling contributes an important factor to increasing the peak current of each beam, with the desired low beam emittance, at the output of the linear accelerator. The array of beams is suitably compact for immediate transfer (close-coupling), with continuation of spatial configuration of the array of apertures and beam centerlines, to the following Marquee RF Linac.

Marquee RF Linac

The Marquee Linac facilitates acceleration of the space-charge dominated, low velocity beam by not significantly bending the beams at the lowest velocities where magnetic focusing fields are less effective. The Marquee linac structure has an array of parallel beam channels matching the pattern of beam centerlines in the Source Hotel and the accelerating column in the HVDC preaccelerator. Each beam channel in the Marquee carries only one Isotopic Species of beam. The pulsed beams of specified Isotopic Species (aka Isotopic Macropulses or Sluggettes) occur in the array of beam channels in the programmed temporal sequence imprinted at the ion sources.

The first section of the Marquee Linac is a radiofrequency quadupole (RFQ) accelerator structure. The ion speed at the output of the Marquee will be specified in detailed design based on the beam physics and capabilities of the beam handling component technology (e.g., pulsed magnets). In one embodiment, the RF Marquee section may comprise only RFQ tanks at the one RF frequency (i.e., no jump of RF frequency).

Aligner (Aka Marquee Collapser)

After the Marquee linac section, the beams that exit in temporal sequence from the parallel beam channels are fed into a single beam channel, i.e., one channel downstream of each Marquee, by a beamline switchyard using moderately fast switch magnets. Specifying a practical rise time of these magnetic switches will be a determinant of the temporal gap between Slugs, along with the requirements for downstream beam handling and the eventual telescoping of species. After the Aligner (Collapser), all isotopic Sluggettes, emitted from each one of the multiple front ends, are transported and further accelerated in one beam channel.

Overview of Current Multiplication Processes

Accelerator Driver Summary

Telescoping is exploited, e.g. 10 Isotopes for tenfold increase in working volume of 6-dimensional phase space. State of the art source technology is used.

A State of the art Preaccelerator HVDC of ~1 MV is used, cf. Argonne National Laboratory 1976-80. A Linac emits multiple parallel beams, e.g. four.

Stacking in transverse phase space uses a low number, e.g. two in each transverse plane. Ignitor Pulses are generated with once-through accelerators and beamlines. Storage rings are not used. Microbunch structure is maintained all the way to the fusion fuel target, i.e., identity and integrity of each RF microbunch of ions is maintained. Macropulses of individual isotopes, called Slugs, contract (called Snug) due to differential acceleration in Snuggers, e.g. ±5% to ±10% of the nominal speed, using successive blocks of linear accelerator tanks operating at progressively higher frequencies, e.g. from 400 Hz for first block and 4 GHz for the last block.

The last sections of the Snugger, called the Snug Stopper, reverse the sense of the input Snugging voltage to return the nominal speed of all microbunches to the nominal speed of the Isotopic Slug. The beam passes through a Helical Delay Line 2800 that removes space from between Slug centroids by magnetically switching out successive Slugs from successive coils of the Helix, at programmed times such that, when they are reinjected into common beamlines, they take the next programmed step of power amplification.

This set of beamlines, e.g., four beamlines, continues to switch points that route the beams to one of the multiple fusion chambers. The differential distance to multiple fusion chambers is accommodated by the central timing program for computer-controlled operation. To provide two-sided target illumination, a set of two Slug Trains, each comprising a Compression Pulse and a Fast Ignition Pulse, are produced in series by the target for both Slug Trains. The accelerator may be timed such that drift distances and other parameters for Snugging and Telescoping simultaneously achieve maximum intensity timed in coordination with fuel target timing.

A low factor of emittance multiplication, e.g., 2.5×, realizes a step-change improvement for low emittance at the fusion fuel target. The Fast Ignition requirement of small spot diameter is enabled by the smaller emittance. Chromatic aberrations are controlled within practical limits by conservation of longitudinal phase space RF of the beam structure at the microbunch level, e.g., 1% momentum spread in the final focus lens.

Overall RF-based coordination produces and delivers Ignitor Pulses to fusion targets on absolute, end-to-end timing to the accuracy of a fraction of an RF period. Substantial timing errors are permissible, as the limit of the capability exceeds foreseeable requirements.

Programmed timing of the pulsing of the array of ion sources, HVDC, and RF power provides the large flexibility (bandwidth) of the design concept to dial-in the sequence of beam generation processes in the computer control program.

Ignitor Pulse Structure and Timing

It is instructive to regard the Driver design from the vantage point of the controls system. This especially aids design illumination by providing a common framework to describe the manner in which the individual processes function and the requirements to coordinate them. Referring now to FIG. 10, a top-level functional block diagram of HIF Driver 1000 is shown:

ion sources 1001;
preaccelerator HVDC (high voltage direct current) 1002;
an RF linear accelerator section 1003;
a current amplification section 1004; and
multiple reaction chambers 1005.

The above design provides the timing accuracy to cause the various dynamic processes of beam generation to culminate at fusion fuel targets with including power profile and aiming, at fusion targets power profile and to meet the targets as they move through the target zone. The design also provides the timing flexibility required to achieve t specified Ignitor Pulse parameters, in Multiple Chambers. Overall Ignitor Pulse programming is able to vary the spacing of Isotopes based first on the speeds of the different ions a table of Isotopic Species. The timing for source gating is derived from the master clock of the RF synchronizer.

A beam diagnostics and accelerator controls system establishes accuracy of the arrival of the Ignitor Pulse to timescales for the Ignitor Pulse's temporal waveform, e.g. nanoseconds to tenths of nanoseconds. Synchronization of the absolute arrival time of the Ignitor Pulse with the passage of the fusion fuel target as it falls through the bullseye is obtained by precise tracking of the fuel target's position and orientation by tracking means such as reticules affixed to the targets and tracking observation by means, e.g., optical, that provide precision measurements of the position, speed and rotation of each target within its lithium sabot. Provision of such tracking means are facilitated by the use of the sabot and the relatively large size of each sabot-target assembly.

The Driver is computer operated, using centralized Master Timing via the coordinating effect of synchronizing RF waveforms. Distributed timing control provides realtime corrective responses, using for example the ability (provided by the ionic speeds being less than control signal propagation speeds) to feed-forward data about the beam position and other parameters. The state of the art for the precise timing and control of RF fields extends to approximately one part in ten thousand.

Delivery of a high current short duration pulse to the fusion pellet target located in each of many chambers at various distances from the source is depends on the pulse structure of the ion source. The precise timing of each beam to each chamber is unique and accounts for the distance to the chamber for the specific beam, the properties of all of the switches and accelerators in the beam path, and the precise lengths of each of the delay paths. It also may take into account the differences in mass of the individual isotopic species used in the ion beam.

When the properties of the pulse at the target are defined by the energy release needs of the fuel pellet, the challenge is to amplify the source ion current via the pulse structure and the accelerator properties to the magnitude required by the ignition parameters at the target.

Figure 11:
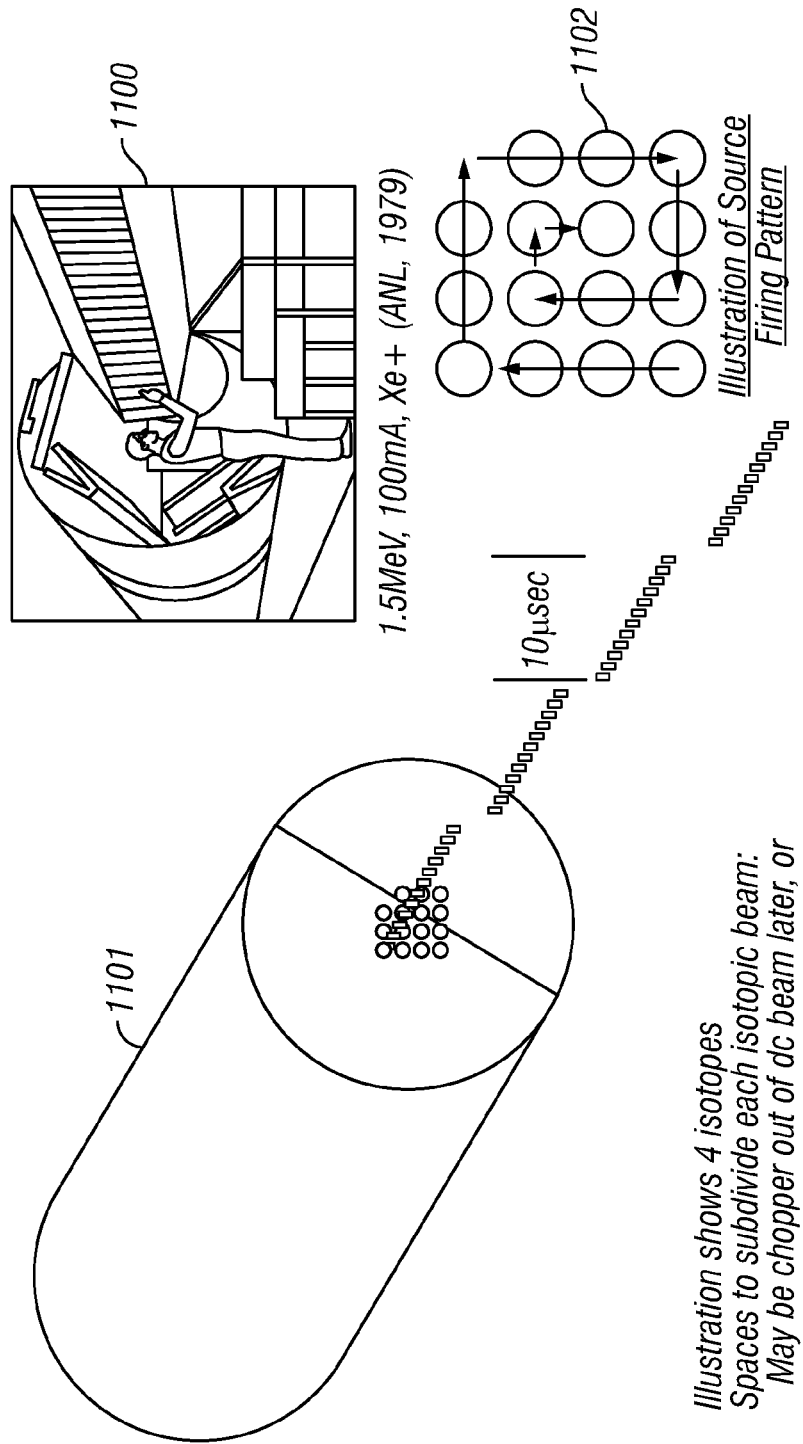
FIG. 11 provides a diagram of source, HVDC, and beam structure.

This amplification is dependent upon cascading a series of steps of current amplification as described in subsequent sections, but it is all dependent on the ion source current parameters and their precise timing structure as they leave the sources. The timing within the pulse structure 1102 that evolves as a result of the beam generation processes is set by the release of ions via grid gating at the source 1101. The heaviest ions are released first and are followed sequentially by each of the lighter species in descending isotopic mass order. One source for each of the isotopes is integrated into a compact structure called a Source Hotel 1101, as shown in FIG. 11.

Figure 12:
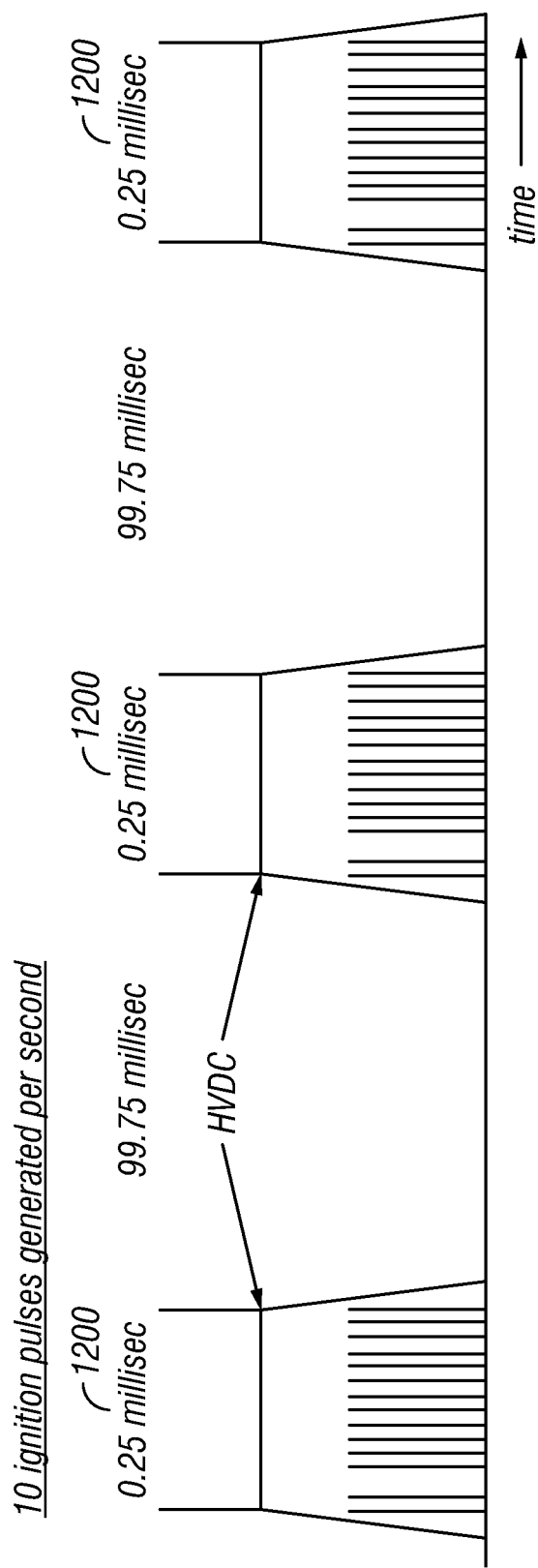
FIG. 12 provides a diagram of pulse structure from isotopic sources and an HVDC preaccelerator.

The ion source within a Source Hotel 1101 is gated to release identical duration macropulses 1200, FIG. 12 as a set of equal parts, e.g. four, of the feature of the beam structure called an Isotopic Slug. The Isotopic Slugs are sequential and do not overlap, propagating in parallel channels. The source beams are accelerated by HVDC in Preaccelerators, with one Source Hotel extractor integrated with the HVDC column electrodes in each Preaccelerator. The electrodes have a pattern of apertures that matches those of the Hotel. For purposes of illustration, the emission from sixty-four, state of the art Source Hotel-Preaccelerator assemblies comfortably exceeds the requirements of the most stringent Ignitor Pulse parameters.

The sequence of Isotope Slugs for the Fast Ignition (FI) pulse is emitted first (i.e., using heavier ions for the FI Pulse than for the Compression Pulse), with the first Slug containing the heaviest isotope. Next, the Slugs for the Compression Pulse are released after a pause in time determined by the velocity differences between the FI ions and the lengths of beamline determined by details of the series of beam generation processes. The timed release of each of the different Isotopic Slugs follows in descending isotopic mass order, with a schedule of delays between Slugs that is determined by the ion mass (which determines its speed in a series of isotopes by the Telescoping Condition of equal magnetic rigidity), the accelerator length, and the length of the beamline to a fusion target in a given reaction Chamber.

Each complete series of Isotopic Slugs forms a non-overlapping sequence of Slugs called a Slug Train. The total release duration for each Slug for the Compression Pulse (which many times the total energy as the Fast Ignition Pulse) is nominally 10 µsec and the overall release time Slug Train lies between 400 µsec and 500 µsec, depending upon the distance to the most distant reaction chamber.

In the first RF accelerator section, the Slugs continue to be accelerated as parallel beams with the Source Hotel's array. All the accelerating channels are on, regardless of which channel a Slug is in at a given axial location and time. Visualized end-on, the emission of Slugs from the individual channels is similar to a theatre Marquee with only one light blinking at a time in a pattern with complex but specific timing.

Immediately downstream from the Preaccelerator, each macropulse enters the first section of the RF accelerator and is imprinted with the micropulse structure. The strength of the accelerating field over the entire linear accelerator is higher for Slugs with higher mass, to accelerate the higher mass to an equal speed at each point along the linac.

Referring now to FIG. 13, shown is a diagram 1300 of a pulse structure in the RF accelerator.

The first RF accelerator is a multi-channel radiofrequency quadupole, or RFQ, which integrates RF quadrupole electric focusing and acceleration. The RF field in the initial section of the RFQ provides strong focusing fields and a smoothly increasing accelerating field to approach isentropic conversion of the DC incoming Slug beam into microbunches (µbunches) in a continuous stream at the RF frequency. For illustration, each µbunch contains a number of ions of the order of ten billion. An entire Ignition Pulse (e.g. carrying a total of 20 MJ of ions that carry 20 GeV (3.2 nanoJoules) each) contains about eighty thousand of these elemental, µbunch groups of the energy-carrying heavy ions. The purpose for continuing the Marquee in the first stage of RF acceleration is to delay bending the beam until the speed of the ions is able to efficiently use magnetic focusing to handle the space charge forces associated with high beam current. The initial speeds of the heavy ions for HIF Drivers (i.e., in the front end) are especially slow because, to achieve the brightest beam, the preferred choice is for the ions to be singly charged.

Figure 14:
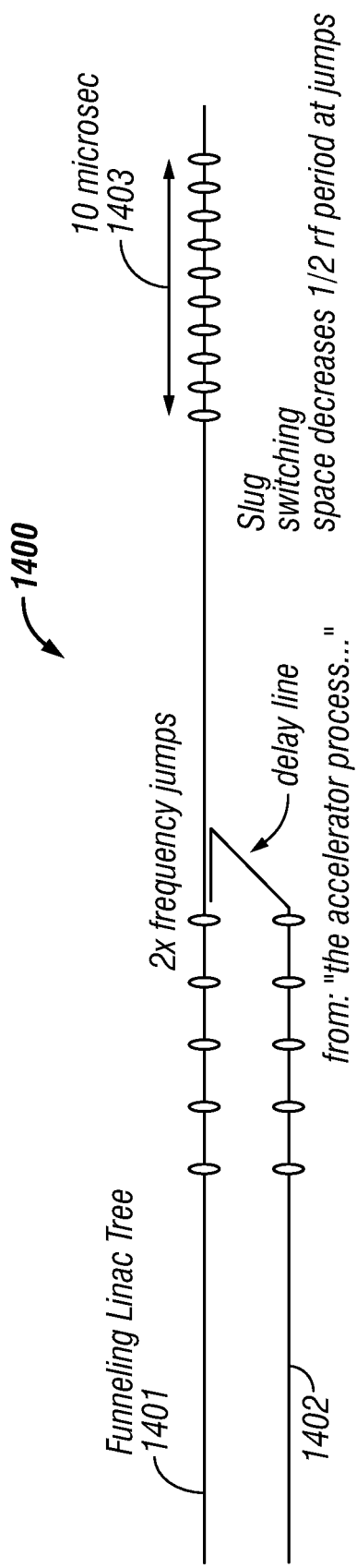
FIG. 14 illustrates a current amplification method by funneling microbunches.

After the ion speed is raised in the RF accelerator section with the Marquee array of parallel Isotopic Slugs, the beam is fed to an accelerator section operating at twice the frequency of the RF Marquee, e.g. 12.5 MHz. Between the two RF structures, the beams from the Marquee are Aligned for insertion into the 25 MHz structure as a collinear Slug Train. The array of the Aligner's magnetic beamlines, e.g. sixteen (nominally ten for the Compression Pulse and six for the Fast Ignition Pulse), are routed, one each, to a corresponding series of AC switch magnets (one on the Aligned beamline for each Slug) that bend the Slugs into a common, Aligned magnetic transport channel, in a Slug Train with the specified time structure. Prior art also describes an alignment process that integrates the interleaving (or funneling) of microbunches at the frequency doublings. Prior art further describes a process of interleaving two beams that smoothly integrates with the design of an RFQ accelerator. Using this concept, the Aligner also doubles the average current of a Slug. FIG. 14 provides a diagram 1400 showing the interleaving of two beams of microbunches 1401, 1402 into a single beam 1403 having twice the frequency of the original beams 1401, 1402.

The beams emerge in the higher frequency RF structure downstream operating at 25 MHz (e.g., a second RFQ) with twice as many micropulses in each Slug, and half the number of parallel beams. The beams continue into the next structure and upon emergence are interleaved with an adjacent beam once again thus again doubling the number of micropulses and halving the number of beams that need to enter the next linac section. After each subsequent acceleration section the beams continue to have their micropulses doubled by interleaving until four beams remain at the end of the 200 MHz accelerator.

Figure 15:
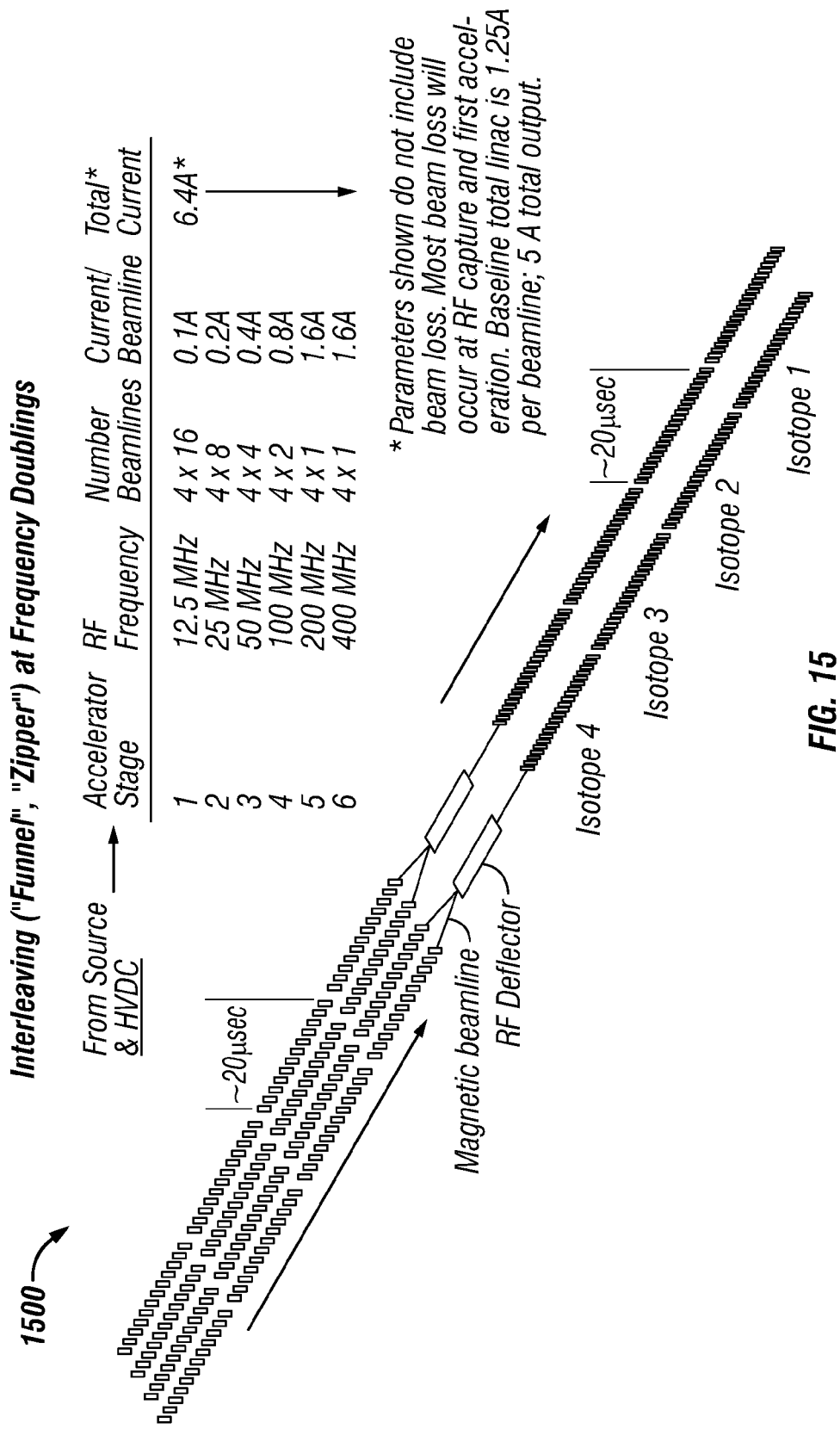
FIG. 15 provides an Illustration of beam temporal structure in a section of the linear accelerator that includes interleaving microbunches at a frequency doubling.

With interleaving repeated at each of the frequency steps, e.g. five, the current of each Slug multiplies by a factor of thirty-two. FIG. 15 provides a diagram 1500 illustrating the process of "funneling"—interleaving at frequency doublings. The timing structure for the RF fields in any given section of the linear accelerator is illustrated in FIG. 15. The beam forming process is repeated a second time, producing two sequential Slug Trains. The two Slug Trains are separated later, to deliver one beam to each side of the destination reaction Chamber. For illustration, the result of interleaving is four parallel beams in the last section of the linac used by the slower group of Slugs, e.g. the substantially heavier ions used for the Fast Ignition Pulse. The final portion of this linac section, called the Telescoper, has a pulsed switch magnet for each of the Slugs. The switches are located where the Slug in question reaches the specified Common Beam Rigidity. Once that magnetic stiffness is reached, they are removed from the accelerator and fed into a Telescoping beamline, i.e., a magnetic beamline in which Slugs of the same stiffness but different speed are able to catch up to each other. The following (faster) Slugs for the Fast Ignition Pulse are fed into an accelerator with twice the frequency (e.g., 400 MHz), but are not interleaved, and continue as four parallel beams of Slugs with RF-synchronized microbunch structures. The final portion of this linac section is, again, a Telescoper, integrating a pulsed switch magnet (between linac tanks) for each of the at the point where the Slug in question reaches the specified Common Beam Rigidity, which is identical with Rigidity of the ions in the group of slower Slugs.

Once all slugs are out of the Telescoper, the four beam lines are merged to form one beam line with four times The current. The radiofrequency microstructure of the merged beam is the same as for each of the pre-merged parallel beams, as is the SubSlug structure.

Next, alternating SubSlugs from the merged beam line are immediately switched into the start of a new beamline, which is bent into 360 degree loop, to arrive in RF synchronism with the next SubSlug. This Loop Stacking will use a series of two loops (sending four parallel beams downstream), or one (sending two parallel beams downstream). The result of Loop Stacking is to position multiple SubSlugs at precisely equal distances from the fusion target.

Downstream, the Slugs are the length of a SubSlug, and the SubSlug timing feature goes away. The number of parallel beams in parallel beamlines at this point (i.e., either two or four, in this illustration) continues to the Chamber and the fusion target, with one of the two SlugTrains magnetically switched into one or the other of two sets of the beamlines for two-sided target heating.

All operations beyond the Telescoper may take into account the fact that the Slugs are moving at different velocities relative to each other and thus are getting progressively closer together at the same time that the RF frequency of the Snugger is bringing the micropulse structure to higher and higher frequency. The Snug Stopper freezes the microstructure, but the Slugs continue to drift together until, at the target, they all arrive on their pre-programmed schedule.

Specified RF waveforms are generated at low power by a Master and Subordinate Arbitrary Waveform generators. The Driver's RF Master Clock communicates with the Chamber controls, in particular those concerned with the dynamic injection of fuel charges in their protective sabots.

The total duration of beam emitted by the linear accelerator for each ignition pulse is, for example 200 μsec. Blank spaces in the overall beam profile are needed for a number of purposes, including:
  Gating the outputs of the ion sources for different Isotopes;
  Subdividing Isotopic Slugs into a number (e.g., four) of SubSlugs;
  Switching alternating SubSlugs into parallel beamlines in Loop Stacking;
  Raising or lowering RF accelerating gradients between passage of one Isotopic Slug and the next, to accelerate isotopes with different masses to equal speeds at each point of the path through the Fixed Beta-Profile linac and Telescoper;
  Raising or lowering the RF frequency in the beam manipulation processes of Snugging, Snug Stopping, and Slicking;
  Switching Slugs after the HDL from individual beamlines into common beamlines;
  Bifurcating beams for RF bunch maintenance in the HDL and at the Slicker.

Certain processes can exploit the same time gap as certain others. Thus, the required sum the time gaps may be less than the sum of the times of the gaps for processes individually. Prominent features of the design are specifically for the purpose of removing these gaps, including Telescoping of Multiple Ion Species and by the action of the Helical Delay Line 2800.

New and Modified Features and Processes for Ignitor Pulse Generation

The following list is in the approximate order in which the processes occur during generation of an Ignitor Pulse:
1. From a closely-packed array of ion sources, generate a time-sequenced series of separate beams of a specific set of ion species in individual parallel channels. The set of heavy ion species may comprise isotopes of the same atomic element or a combination of atomic elements.
2. Accelerate the multiple beams from the source array in a HVDC structure with: the same array of parallel channels and close-coupled to the ion sources to maximize beam brightness.
3. Capture the DC beam in the RF fields of a radiofrequency quadrupole accelerator (RFQ) which: 1. Is integrated with and close-coupled to the HVDC accelerating structure, 2. Converts the time-sequenced DC pulses of the isotopic beams in parallel channels into trains (called a "macropulses") of "micropulses" at the RF frequency and 3. Further accelerates the ions to facilitate beam transport using magnetic fields.
4. Use magnetic fields to direct the time-sequenced beams of different isotopes onto a common beamline for further acceleration in the same sequence.
5. Double the current per isotopic beam macropulse by "zippering" the micropulses of previously separate beams of each isotopes into a single line, at points where beams are transported from an accelerator structure at a given RF frequency to a structure at twice that frequency, as required to accommodate the progressively increasing speed of the ions.
6. Move microbunches within each Slug closer together (Snug). The process is illustrated in FIG. 24. Microbunches within a Slug are differentially accelerated and decelerated, progressing from maximum deceleration of the first microbunch in a Slug to maximum acceleration of the last microbunch in a Slug;
7. Differential microbunch acceleration is achieved by offsetting the RF frequency of the Snugger linear accelerator sections. From the first microbunch experiencing the most deceleration, the phase of the RF field experienced by successive micropulses moves progressively higher on the RF waveform, until the last microbunch in a Slug experiences the most differential acceleration;
8. The absolute frequency offset is calculated by dividing the difference of the stable (but decreasing) phase angle from front to back of the Slug, e.g., 60 degrees total, by the number of micropulses in a Slug, e.g., one thousand;

9. The RF phase control requirement is set by the fractional frequency difference, for example, one part in ten thousand;

10. RF frequency of each Snugger tank is programmed to step progressively to higher frequency, synchronized to the different speeds of the multiple ion species. Practical limits on the bandwidth of the linac structures and their RF power sources determine the limits on the different Isotopic Species that can be treated by one Snugger beamline;

11. Where another unique group of Isotopic Species is used with a large difference in mass and speed, e.g., to achieve valuable effects in the fusion fuel target such as Fast Ignition, separate, parallel Snuggers are required. Each separate Snugger is able to treat Isotopic Species with mass differences ranging over approximately 10% (i.e., ±5%);

12. Snugging causes the microbunches in a Slug to pass successive points along the beamline at progressively higher frequency, corresponding to the decreasing distance between microbunches. To maintain efficient use of the applied RF voltage, the RF frequency is correspondingly increased in a specified number of discrete locations in the Snugger, in successive blocks of Snugger linac tanks. Higher frequency RF structures handle higher electric accelerating fields, substantially shortening physical length;

13. Snugging limit is reached when the dimensions of RF structure are judged to be as small as acceptable to pass the very-high-power beam with a total beam loss by wall impingement of, for example, 1% over tens of kilometers of beam tube;

14. Slug average current increases, e.g. 10×, for Snugging that is driven by frequencies starting at 400 Mz and stopped by frequencies ending at 4 GHz. Width of phase on RF Snugger wave is substantially unchanged, and microbunch peak current increases by the Snugging factor, i.e., 10× for this example;

15. Snug Stopping returns the microbunches to the same reference energy, as will be required regarding chromatic aberration at the focus. the: enables timing to accommodate different distances to multiple chambers;

16. In the Telescoper accelerator section, Slugs of different isotopes are accelerated to the different energies needed for all isotopes to have common rigidity. In general, the Telescoper accelerates multiple parallel beams. The multiple parallel beams of each isotopic species are diverted by pulsed switch magnets, located between consecutive tanks of the Telescoper section, when the energy of that specie's ions reaches the specified ratio of momentum to charge state (i.e., magnetic stiffness or rigidity) that is identical for all species to enable all species to be: 1. transported in the same beamlines without change to the strength of the magnetic field prior to 2. Telescoping of the different isotopic Slugs into each other as they approach the end of the beam path to the fusion pellet.

17. Emit multiple, parallel high-energy beams (e.g., 4 beams) from the Telescoper, which is the concluding part of the linear accelerator.

18. Merge multiple beams (e.g., 4 beams) from linac into one beam by stacking them 2×2 in each plane of the transverse phase space. This results in a 4-fold increase in micropulse peak current and Slug peak or average current, and a concomitant increase in the beam emittance by the basic factor of two plus a small dilution factor;

19. Maintain individuality of the merged microbunches throughout the system, until released from RF phase focusing in the beamlines leading to the fusion fuel target in a specific chamber;

20. Reconfigure the Merged single beam into multiple parallel beams in a Slug-Slug Delay Line (SSDL). In one embodiment, the first of two consecutive Slugs is switched into the first phase of the SSDL such that, at the output of this phase, the previously consecutive, inline Slugs travel in two parallel beamlines, with micropulses RF synchronized, micropulse for corresponding micropulse. Repeating this process in the second stage of the SSDL results in the desired number of parallel beams (e.g., four) at the SSDL output. The micropulses in all the parallel beamlines (e.g. four) are RF synchronized, micropulses to corresponding micropulses. In the embodiment treated here, the delay in, and therefore the length of, the second phase of the SSDL is twice as long as in the first. The magnets that switch selected Slugs into the SSDL are moderately fast, by virtue of the enlongated gaps between Slugs that results from Snugging. The resultant configuration of four parallel beamlines is carried throughout the following processes, until focused onto the fusion fuel pellet;

21. Microbunch structure is maintained by Phase Focusing naturally in the Main Linac, Snugger, and Telescoper linac structure. In other portions of the beamlines where the beams do not experience the electric fields of RF acceleration, the microbunch structure is maintained by periodic Bunch Reflectors (Double Rotators). In standard practice, the typical use of single Rotation minimizes the momentum spread while maximizing the time dimension of a microbunch. Double Rotation, which accomplishes Reflection of the longitudinal phase space ellipse in the time axis, facilitates maintenance of the microbunch structure over long transport distances by resetting the orientation of the ellipse such that a longer distance will be traveled before shearing of the phase-space ellipse in the longitudinal plane requires the next application of Rotation/Reflection;

22. Helical Delay Line 2800 (HDL, a.k.a. Isotope-Isotope Delay Line) removes specified, high fractions from the time gaps between Slugs (e.g., Slug centers move from 2.5 μsec apart to 300 nsec apart);

23. Helical Delay Line 2800 (a.k.a. Isotope-Isotope Delay Line) function has the flexibility to remove a variable amount of the time gaps, as required by Multiple Chambers;

24. Microbunch identity' continues to be maintained by Phase Focusing in the HDL by periodic Bunch Reflectors/Double Rotators. For large differences of the ion (and microbunch) velocity, in particular where velocities are used for the Compression Pulse and the Fast Ignition Pulse that are widely different, each of the parallel beamlines in the HDL is bifurcated before entrance to each Bunch Reflector and recombined into a common beamline just after exiting the Reflector;

25. Slicking is accomplished in the sections of the beamline that are specific to one of the multiple reaction chambers. Slicking again provides differential microbunch speeds between successive microbunches at a specified distance upstream from each fusion chamber. The amount of differential speed imparted to the microbunches of each Slug is set to cause the microbunches to interpenetrate to form the desired contribution to the pulse structure of all isotopic Slugs at the fusion target. The distance from the Slicker to the Chamber and Target is approximately the same for each of the Multiple Chambers; and 26. The beam Wobbler (ref. Golubev), FIG. 16, was conceived to create a hollow beam for the Compression Pulse to heat an annular portion of the cylinder containing the fuel, FIG. 17.

Figure 18:
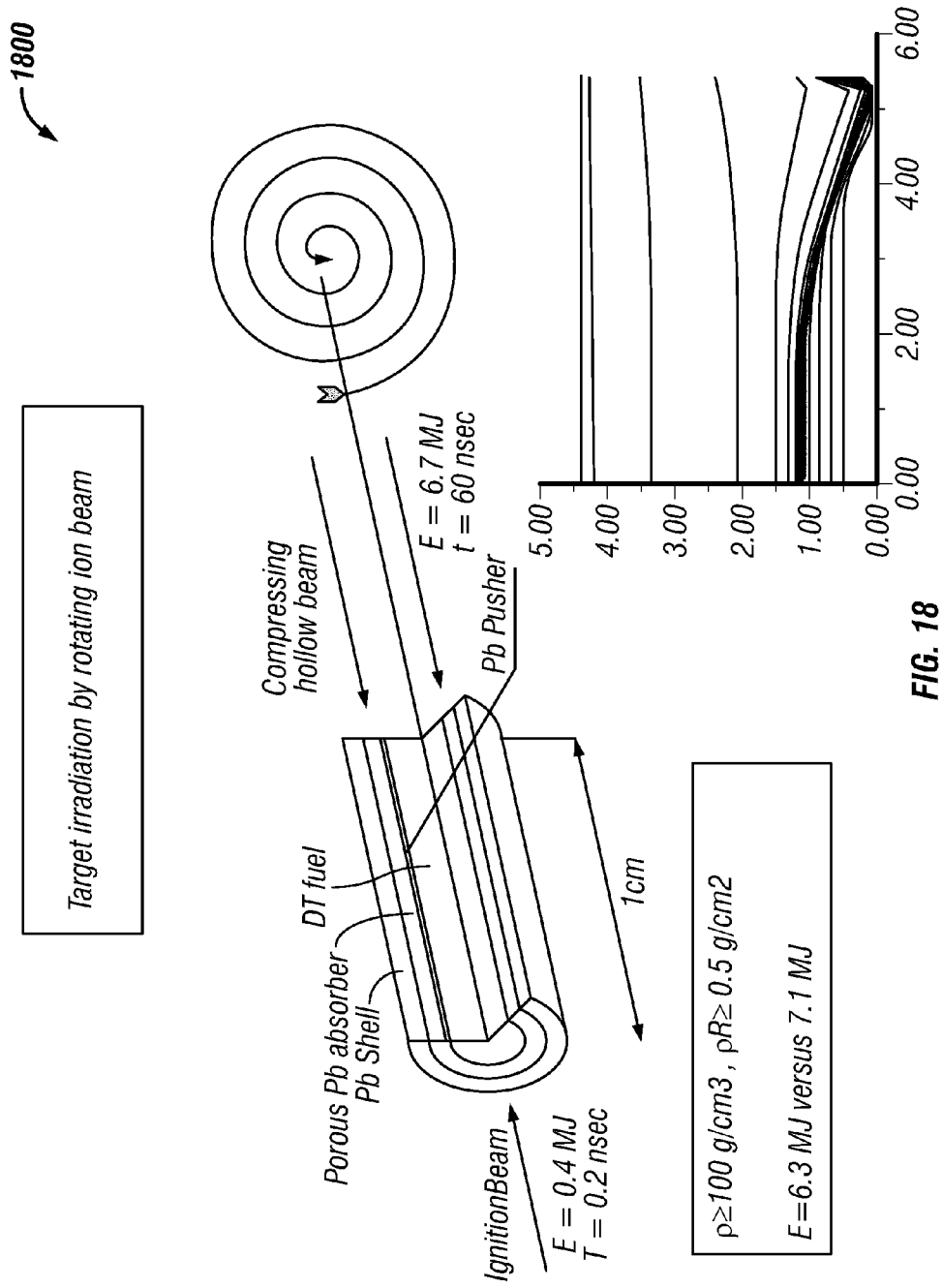
FIG. 18 provides a diagram illustrating target irradiation by a rotating ion beam.

27. Conventionally, the Wobbler's RF field is programmed to cause the annulus heated by the spiraling Compression Pulse (the absorber layer) to follow the imploding radius of the layer of the cylinder's barrel that works to compress the fuel (the "pusher" layer) (Ref Basko. FIG. 18). This improves the efficaciousness of a given amount of beam energy to drive the implosion. The extent of this improvement is limited, however, because the size of the spot (e.g., 1-3 mm) results in heating material that is more remote from the absorber-pusher interface as well as the desired material close to the interface.

28. The innovations that reduce the spot size (e.g., 50 μm) amplify the benefits of following the absorber-pusher interface by causing the beam energy to be deposited more at the most desirable radius and, therefore, to not continue to deposit heat in material that is more remote from the interface, and therefore less effective in contributing to the implosion dynamics.

29. In the prior art, the motion of the absorber-pusher interface inward results in expansion of the absorber material. This results in reducing the density of the absorber material with concomitant reduction of its stopping power, which in turn results in wasting some of some the energy of the ion beam by allowing the affected beam ions to carry some energy beyond the far end of the target.

30. The loss of efficiency by rarefication of the absorber layer is avoided by heating the thinner annulus (e.g., 100 μm with the e.g. 50 μm radius spot) near the absorber-pusher interface. Thereby, the beam ions encounter target material that has had the least time to expand as the beam heats the thin annulus just outside the interface while the interface moves inward.

Figure 19:
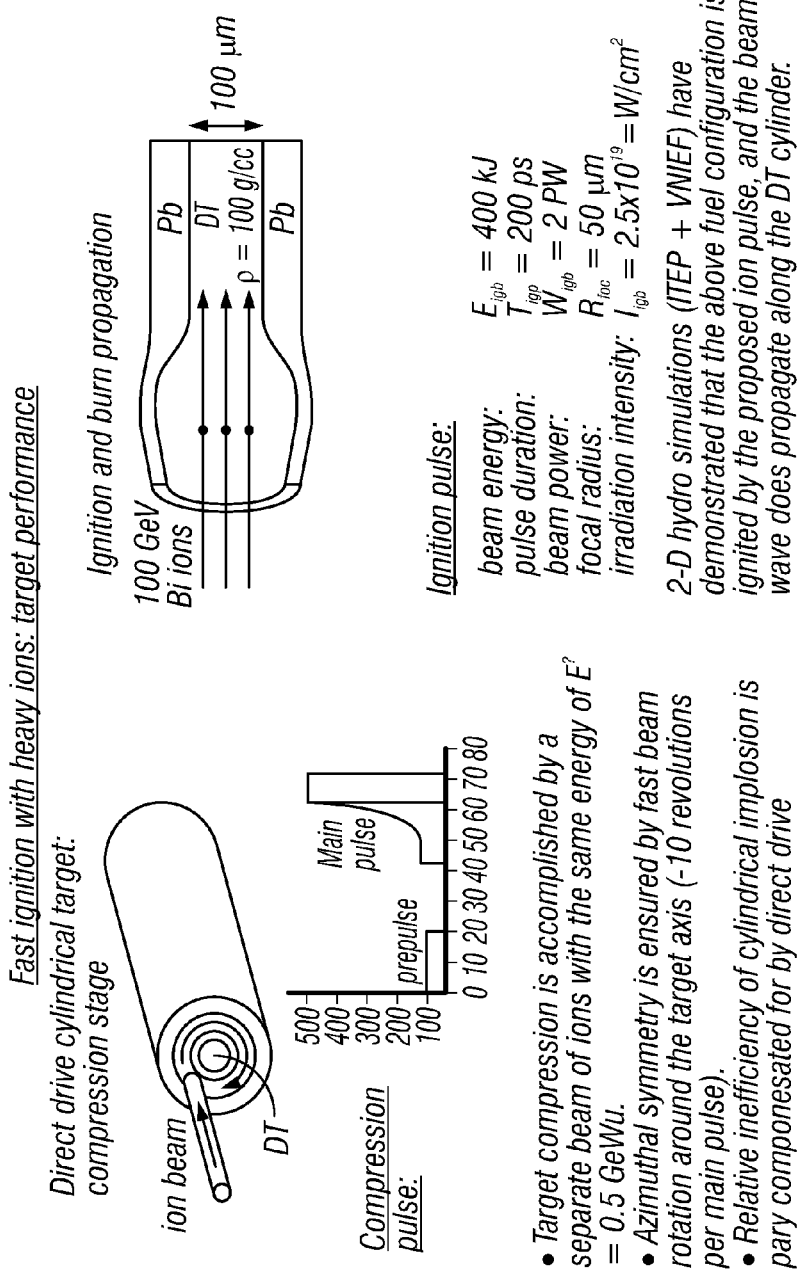
FIG. 19 provides a diagram depicting fast ignition using heavy ions.

31. Fast Ignition is accomplished after the fuel has reached peak high density, e.g., 100 g/cc. In the prior art (Ref. Basko. FIG. 19), fuel compression is accomplished by the action of the Compression Pulse alone, and the range of the ions used for Fast Ignition is the same as that of the ions used for Compression. These ions penetrate farther into the pre-compressed fuel than needed to bring to ignition temperature only the amount of fuel needed to initiate a propagating fusion burn.

32. The innovation of applying the principle of telescoping beams (multiple ion species) allows using ions with shorter range for the Fast Ignition pulse as compared to the range of the ions for the Compression pulse.

33. Because the prior art for cylindrical pellets with Fast Ignition using ions with the same range for Fast Ignition and for Compression results in heating a larger mass of pre-compressed fuel than needed for Fast Ignition, the Fast Ignition beam must carry more total energy by the same factor. By the same token, the prior art requires the Fast Ignition beam to have higher power than required by the fundamentals of Fast Ignition because the Fast Ignition energy must be deposited in the same amount of time regardless of penetration depth.

34. The basic design requirement for Telescoping is that all ions have the same magnetic rigidity, which is proportional to $\beta\gamma A/q$ (b=v/c, c=speed of light, A=atomic mass number, and q=ionic charge number). Because the most favorable charge state is singly charged (due to space charge limits in beam transport and ion source design), it is most likely that all ions will be in the same, singly charged state. When the same charge state is used for the different isotopes, the result is that heavier isotopes will have less energy.

35. In addition, any of the high-energy beam ions (for Compression or the shorter range ions) will be fully stripped to a charge number equal to the atomic number Z (i.e., q=Z) by interaction with the target material.

36. Both the lower energy and higher Z of the heavier ions contribute to shortening the range of the ions in the Fast Ignition pulse as compared to the ions in the Compression Pulse. For example, using xenon (Xe) for the Compression Pulse and lead (Pb) for the Fast Ignition Pulse, the Telescoping condition is met with ~13.5 GeV Pb for the Fast Ignition Pulse and 20 GeV Xe for the Compression Pulse. The resulting difference in range is about a factor of seven.

37. The factor of e.g. about seven reduction in range reduces the required beam power by this same factor of seven.

38. The range of the Fast Ignition ions may be adjusted, with corresponding adjustment of the range of the Compression ions, to optimize the parameters of the ion beam to achieve greatest efficiency of the overall use of beam energy to achieve compression and ignition with propagating burn.

39. The benefits of using shorter-range ions, i.e., the part of the overall driver pulse for which Fast Ignition is the first purpose, may be exploited most thoroughly by making the duration of the shorter range pulse longer than needed for the Fast Ignition function alone. For simplicity of presentation, therefore, the terms "Fast Ignition pulse" and "shorter-range pulse" may be used interchangeably, particularly for description of effects other than the principal one of Fast Ignition.

40. The dynamics of the end caps may be optimized by heating them using parts of the longer duration beam of shorter range ions (aka Fast Ignition). By temporal modulation of the amplitude of the Wobbler's RF field, these parts of the beam may be caused to hit the target off-axis, and the spot-on-target may be caused to spiral toward the axis as used in the prior art for the Compression pulse (FIG. 18). The spiraling may also combine moving away from the axis, if useful.

41. The additional advantages accruing from the duration of the shorter-range beam being longer than the Fast Ignition time generally involve overlapping the first-arriving portions of the Fast Ignition pulse with the later-arriving portions of the Compression pulse.

42. By appropriate shaping and timing of the Wobbler's waveform and, therefore, od the Wobble of the beam at the target (i.e., the radial distance of the wobbling (revolving or swirling) beam spot from the axis of the target), the various portions of the Fast Ignition pulse before those designated for Fast Ignition per se may be used to tailor cylinder-end dynamics.

Figure 20:
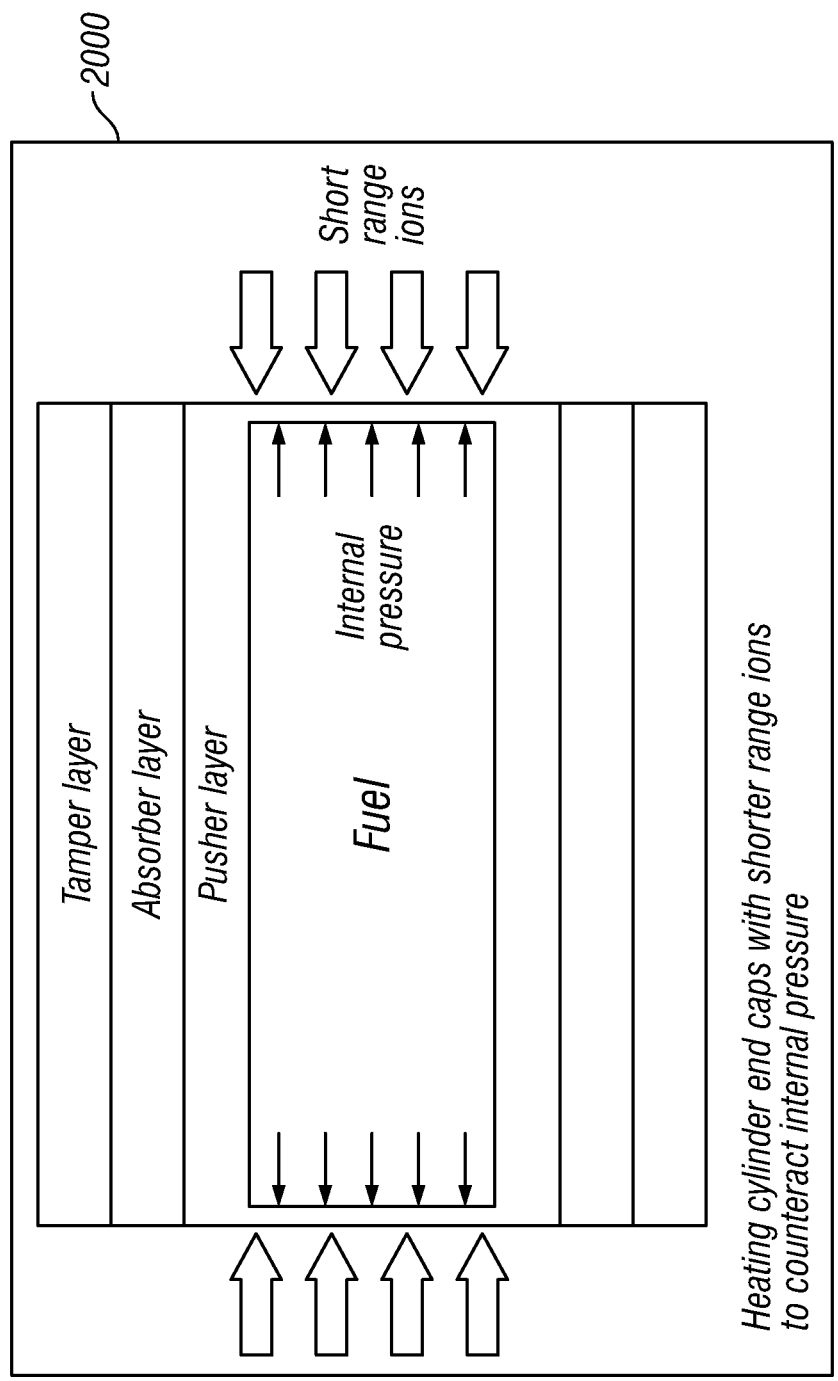
FIG. 20 provides a diagram illustrating heating of cylinder end caps with shorter-range ions to counteract internal pressure.

43. One such effect would include generating pressure in the end-cap material to resist bulging or blowing out. (FIG. 20) Because the Fast Ignition isotopes penetrate much less material, the end closure of the cylindrical target needed to stop them will be accordingly thinner than the cylinder barrel is long, and the intensity of heating this material will be commensurately, higher for a given beam power, modulo the area of the end caps that is being heated. The pressure generated will resist the pressure from inside the cylinder that would drive the ends outward.

44. In addition to resisting bulging or blowing out, the high pressure generated in the material of the end caps provides a means to drive the end caps inward. This may be used to combine motion of the end caps toward the mid-plane of the target, along the target's axis, with the basic radial compression of the cylinder barrel that is driven by the longer-range ions of the Compression Pulse.

Figure 21:
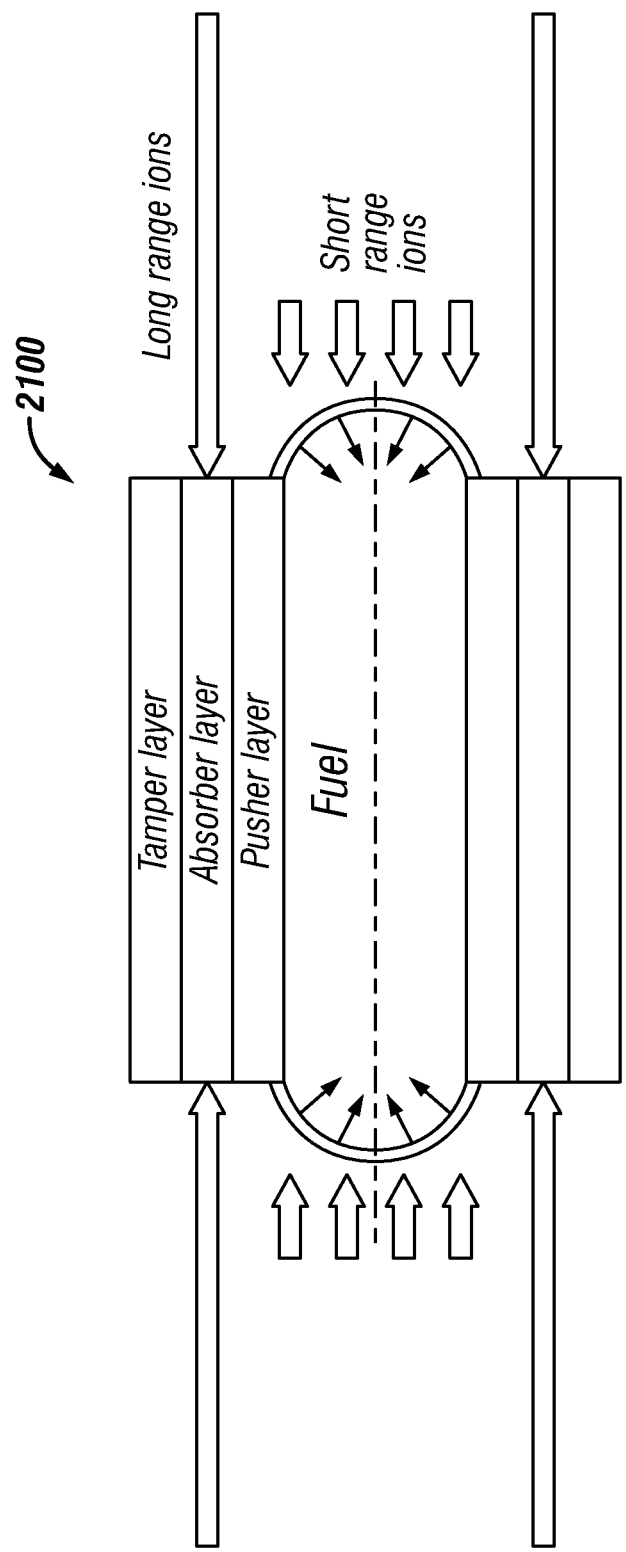
FIG. 21 provides a diagram illustrating cylinder end cap implosion.

45. Curvature of the end caps together with appropriate wobble of the target spot may effect motion, driven by the energy deposited by the short-range ions, which approaches hemispherical implosion at each end of the target. (FIG. 21) The resulting convergence of the end caps is coordinated with the cylindrical convergence of the body of the cylinder.

46. The general goal of this combination, and other design uses of shorter range and longer range ions, is to optimize the overall dynamics of the target implosion, to achieve the desired density of the fuel mass at the location designated for Fast Ignition with the least effort (least energy content and power) from the ion beams.

47. Because of the telescoping of the isotopes that comprise the beams with shorter-range (for Fast Ignition and additional purposes), the time scale of the beams at the Wobbler is beneficially longer than the timescale of the Wobble of the beam spot on the target. The longer timescale for modulating the Wobbler's makes the desired modulation of the waveform of the Wobbler field technically feasible.

Figure 22:
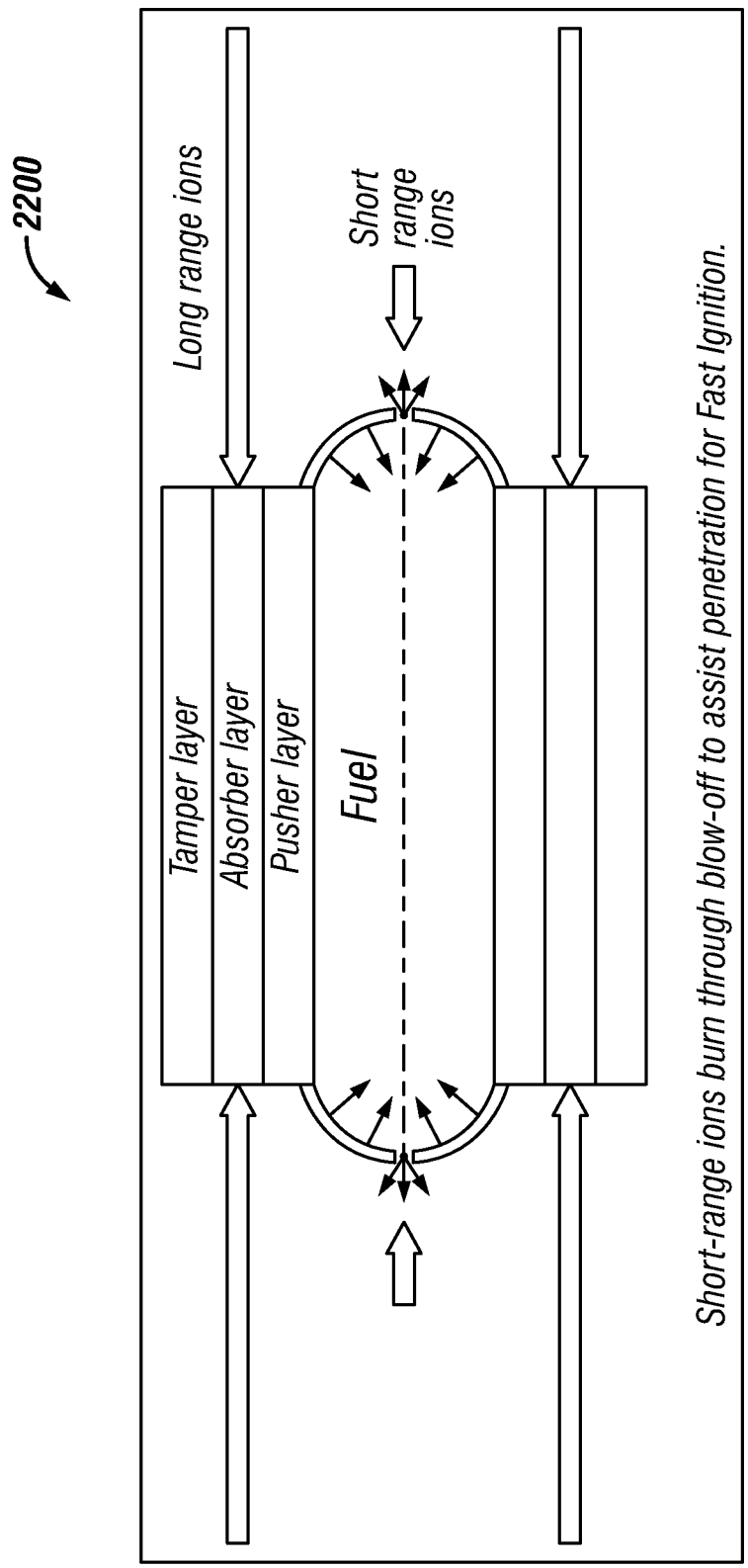
FIG. 22 provides a diagram illustrating burn-though by shorter-range ions.

48. Another use of the overall duration of the Fast Ignition pulse being longer than needed for Fast Ignition alone concerns fuel or target material that will have blown outward along the axis during the compression phase. By timing the arrival of portions of the Fast Ignition pulse that are not wobbled to arrive on the axis (and near the axis) before of the designated time for heating the Fast Ignition fuel mass, the short range beam will burn through material that has blown-out along the axis. (FIG. 22) Blow-off that is fuel will, in general this material will be at lower density than required for fast ignition, and the Fast Ignition beam will need to burn through this blow-off to reach the desired Fast Ignition mass.

49. The processes for burning through the blow-off are generally by heating, which increases the internal pressure and the thermal speed of the material. Higher pressure will cause the material to expand, decreasing its density and thereby decreasing the deleterious, premature slowing that robs energy from the Fast Ignition beam. Higher thermal speed will accelerate movement of the material out of the way of the Fast Ignition pulse.

50. On the axis, the blow off will be primarily fusion fuel escaping through the hole provided to admit the Fast Ignition beam. Therefore, besides the direct heating of the blow-off material, the burn-away/burn-through on axis will be aided by fusion reactions resulting from the Fast Ignition beam heating the blown-off fuel. Although the density of the blown-out fuel will be below that needed to ignite propagating burn, the additional heating from the fusion reactions that occur will contribute to driving the blow-off out of the path of the Fast Ignition beam, allowing it to penetrate to the high density fuel designated for Fast Ignition.

51. The various advantages of using ions with significantly different stopping distances (ranges) in the target involve appropriate timing of the RF field in the Wobbler. Slower (and heavier) isotopic species will pass through the Wobbler before the faster (and lighter) species.

52. The largest difference in speed will be between the isotopes in the Compression Pulse and the isotopes of the Fast Ignition Pulse. For example, the speeds of 20 GeV xenon ions and 13.5 GeV differ by ~30%. For this much difference in speed, the Wobbler may be located at a position upstream from the target where the time gap between the slower Fast Ignition pulse and the faster Compression pulse allows the entire Fast Ignition pulse to exit the Wobbler before the RF fields of the Wobbler begin to rise.

53. The part of the shorter range beam that heats the fuel mass designed for Fast Ignition is the last to arrive at the target on the axis and will therefore not be Wobbled. This may be accomplished by designating either the first part or the last part of the pulse of short-range isotopes as the Fast Ignition part. Selection of one versus the other end (slowest or fastest) of the slow isotopes may be beneficial for optimizing overall driver design.

54. The slowest isotopes will be first through the Wobbler, but the higher speed of the last isotopes may be used to achieve reversal of the order of the isotopes during transit between the Wobbler and the target. This would be accomplished by making the transit distance sufficiently long for the faster isotopes to pass through the slower isotopes as all isotopes are traversing this distance.

55. If the first part of the Fast Ignition pulse is designated for heating the fuel mass for Fast Ignition, the Wobbler's field will be off when this first part passes through it.

56. If it is beneficial to designate the last part of the shorter range ion beams to heat the Fast Ignition fuel mass, the distance from the Wobbler to the target will be sufficient to allow the last isotopes to become the first to arrive at the target. In this case, the Wobbler field is off when the last part of the Fast Ignition pulse passes through it.

57. The spot of the beam on the target may move radially inward or outward according to the programming to achieve a radial "rastering" effect, if desired for smoothing the irradiation intensity or for any other purpose beneficial to optimizing the overall driver design.

58. Also to improve the smoothness and symmetry of heating the end caps, the beam emittance may be purposely made larger for the portion of the short range (FI) pulse that is used to heat the end caps. By this means, the area that is irradiated at any moment by this beam will be larger than the small spot desired for fast ignition, e.g., 50 µm, without changing the settings of the elements of the final focusing system on the beam's necessary nanosecond time scale. The larger spot size would add smoothness and symmetry to the heating, which will help suppress the growth of instabilities during the implosion of the end caps.

59. The desired variation of the emittance may be generated at the driver's Front Ends by appropriately designing the extraction electrodes for selected ones of the ion sources for the multiple isotopes.

60. If a larger emittance is used for some part or parts of the beam, it will facilitate achieving high power in the beams by: 1. The scaling of the achievable, space-charge limited (Child-Langmuir law) current from ion sources, and 2. The scaling of the space-charge-limited maximum transportable, beam current (e.g., Maschke, 1976).

61. The beam emittance of the parts of the shorter range beam that arrive at the end caps of the target at progressively later times will be progressively smaller, to focus most efficiently on the decreasing radius of the imploding end-caps.

62. During the period just previous to Fast Ignition, when the main function of the shorter range beam is to burn through the blow-off, the beam emittance will be the smallest value, i.e., that required by the small radius of the cylindrical volume containing the fuel mass for Fast Ignition.

63. Emittance changes will be in steps, corresponding to designing different isotopic ion sources according to the part of the shorter range beam that will be provided by these particular sources.

64. The feature of varying the emittance and thereby the spot size may also be used for the Compression pulse, if this would add any performance advantage for the dynamics of the implosion of the cylindrical barrel.

65. Additional detail may be added to the programming of the Wobbler field to cause the shorter range ions to impact that target at varying radial distance from the axis as may provide additional benefits for the overall compression and ignition processes.

In general, through the effects described in the foregoing, the programming of the wobble of the different parts of the Fast Ignition pulse, in combination with the telescoping of the different isotopes that make up the overall Fast Ignition pulse, is designed to achieve the most efficient and effective use of beam energy and power for the fuel compression and ignition processes.

Description and Operation of New Current Multiplication Processes

Beam Parameters at Linac Output

The parameters that characterize acceleration in the linac follow the prior art, proven by operating machines and established by designs using standard, industrial design tools. Total linac output current is increased by using multiple, parallel, RF-synchronized output beams, e.g., four. Linac output further is increased at the Front End via the well-known scaling of space-charge limited current with $(\beta\gamma)^{5/3}$ ($\beta$=v/c, c=speed of light, and $\gamma$ is the relativistic parameter), using established ion source and high DC voltage technology as demonstrated by the Argonne National Laboratory 1977-1980 using a 1.5 MV Dynamitron®.

The new arrangement of current multiplying processes makes strong use of accelerating multiple isotopes. The effect of using Multiple Isotopes, alternatively known as "Telescoping Beams", can be appreciated by adding another multiplicative factor to the previously existing line-up of processes. However, ramifications of the present approach to exploiting beam telescoping lead to distinctly different types of current multiplier processes than those identified in Equation 1. Occurring in the driver system "downstream" (after) the linear accelerator, and under the constraints of the 6-D phase space of each species of beam particle as previously discussed, the different beam restructuring, beam compaction/intensification/overall current-amplification also favorably affect the ultimate focusing on the fusion target, reducing it by a factor $\geq 10$.

New Features after the Main, Fixed Beta-Profile Linac

Figure 23:
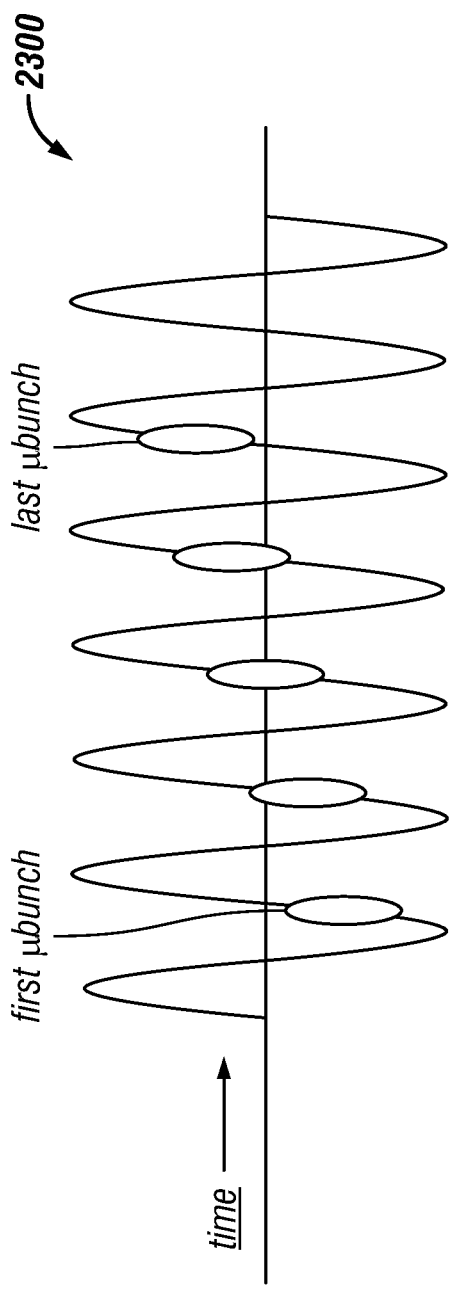
FIG. 23 provides a diagram illustrating microbunches differentially accelerated by offset RF frequency.

As shown in the diagram 2300 of FIG. 23, Snugging imparts a differential velocity between successive microbunches. Snugging is accomplished by offsetting the RF frequency of the Snugger from the bunch frequency (the rate at which microbunches pass a point on their path) such that the first bunch is decelerated most and the last bunch is accelerated the most.

Figure 25:
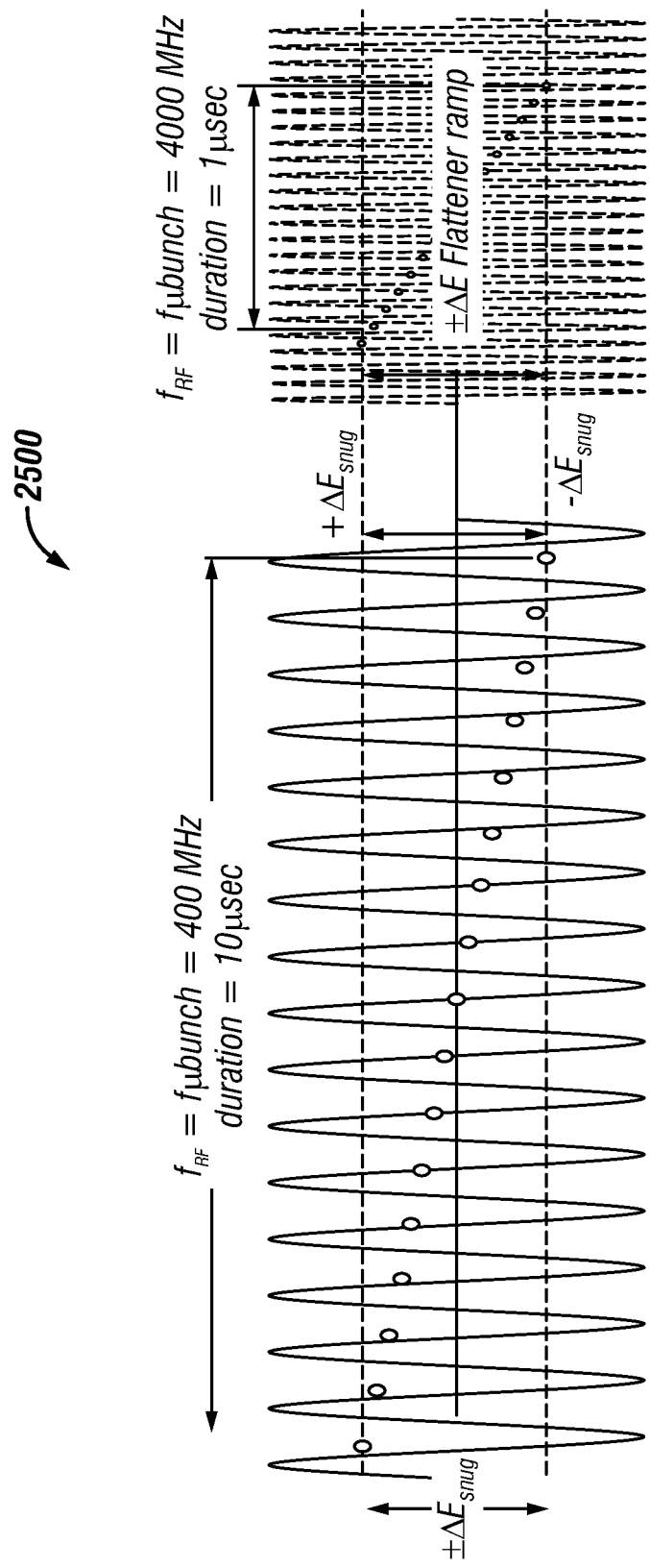
FIG. 25 provides a diagram illustrating differential acceleration by offset RF frequency.

FIG. 24 provides a detailed diagram 2400 depicting the processes of snugging 2401 and snug-stopping 2402. FIG. 25 provides an alternate diagram 2500 illustrating differential acceleration by offset RF frequency.

The microbunches inside each Slug are virtually identical at the input to the Snugger, which imparts a progressive speed differential amounting to, for example, ±5% to ±10%, to the first and last microbunches relative to the unchanged speed of the center bunch. When Snugging has reached practical technological limits, e.g., clearance between the beam and the surface of the beam tube or electrode, the Snugging process is reversed and the speed differential is removed in the Snug Stopper.

As shown in FIG. 25, the amount of frequency offset is the quotient of (1) the maximum phase shift specified to be experienced between the first and last microbunches and (2) the duration of the Slug. For illustration, taking the Slug to be 1 microsecond long and the total phase shift to be 60 degrees (⅙ of an RF cycle), the frequency shift will be ⅙ MHz. Taking the RF frequency of this Snugger section to be 1 GHz (e.g., an accelerating cell length of 12 cm for a v=0.4c ion), the phase control accuracy requirement is about 0.016% or better.

Both differential acceleration and differential deceleration result from the Snugger's RF field being offset slightly from the bunch frequency. To add differential velocity to the last half and subtract velocity differentially from the first half, the Snugger RF frequency is higher than the bunch frequency at a given point on the beam path. To remove the differential velocity in the Snug Stopper, the RF frequency is lower than the bunch frequency at that point in the beam path.

The Snug Stopper is shorter than the Snugger because its RF frequency is higher, e.g. 10×, and the higher RF frequency structures support an accelerating voltage gradient that is higher as approximately defined by the Kilpatrick limit. For the example of 10× Snugging with equal increase in RF frequency, the gradient of the Snug Stopper is about three-times higher than in the first section of the Snugger.

As shown in the diagram 2600 of FIG. 26, Slugs are caused to contract axially inside the Snugger, e.g., by 10×. Entering the Snugger, the distance from the center of one Slug to the center of the adjacent Slug is the length of a Slug plus an inter-slug space originally set by the Master Timing. For example, Slugs that are 2.5 μsec long at the Snugger entrance will be 0.25 μsec long at the Snugger exit.

The empty space that grows between the Slugs in Snugging will be subsequently removed via the Helical Delay Line 2800 (isotope-isotope delay), as described in sections treating the HDL, and other elements downstream from the Snugger.

No net power is added to a Slug by Snugging. Excitation of the accelerator structure is the primary power requirement. However, beam energy flows to the RF fields during deceleration, allowing corresponding reduction of the RF feed power. For the microbunches that are accelerated, the RF feed power is increased correspondingly to supply the acceleration energy. A modest part of the shifting energy might be recycled, e.g., from the decelerated bunches to the accelerated bunches, by RF system design refinements. In sum, however, the energy consumed by the Snugger including the excitation "copper loss" will be a small fraction, e.g. 1-5%, of the energy consumed by the primary linear accelerator.

The efficiency of using the provided RF accelerating field strength gains when ions experience the amplitude near the peak of the sine wave. In opposition to this argument for using a large excursion of phase angles is the desirability of a linear progression of the differential acceleration of successive microbunches. For illustration, nearly linear progressive increased acceleration/deceleration would restrict the phase width to ±30 degrees. A larger phase shift will decrease the peak RF voltage and/or the length of the Snugger accelerator. The Snugging uses the rising side of the sine wave, which provides the phase stability effect (phase focusing) that maintains the longitudinal emittance of the microbunch.

By insertion of RF cavities at harmonics of the basic Snugger frequency, a virtual RF wave may be synthesized with an effectively larger phase width to drive the Snugging action.

Cradling also may be incorporated into the control of the RF waveforms to increase the usable phase width in Snuggers and Slickers. The Cradling effect shifts the RF sine waveform to compensate for the curvature of the sine wave as the differential speeds increase in the microbunches as the Slug passes through a Snugger, or to a much lesser extent in the Slicker. Control of the waveform for Cradling is integrated with parameters from detailed design and modeling. Cradling increases the efficiency of the Snugger and Slicker accelerators, primarily to reduce cost, although the power used by these components is a small fraction of the total required to run the Driver.

When the Snugging action reaches a technical limit or otherwise desirable stopping point, the Snug Stopper removes the differential energy spread by reversing the differential acceleration process. A primary technical consideration is the existence of high power RF sources at the frequencies of the Stopper. Another primary design restriction is the diameter of the bore tube, which decreases with increasing RF frequency. For illustration, starting the Snug with a 400 MHz RF and stopping the Snug with 4 GHz RF will shorten the Slug by a factor of ten, and transmission through a bore diameter on the order of 2 cm.

Snugger Accelerator and RF Accelerator Structures, Frequencies, and Bandwidths

Snug

Microbunches enter the Snugger at the bunch frequency emitted by the previous linac section. The bunch frequency may be the same as the RF frequency in that section, or an even sub-harmonic, e.g., one-half the RF frequency. The RF frequency of successive sub-sections of the Snugger increase to maintain efficient use of the RF waveform (e.g., $\geq \pm 30$ degrees of phase) as the microbunches move closer together. The highest bunch and RF frequency will occur in the Snug Stopper, during the process of removing the bunch-bunch speed differences. The highest RF frequency will be set by considerations such as beam scraping on the apertures, e.g., approximately 2 GHZ to 4 GHz.

Control of the timing and waveform of the Snugger's RF field provides the sequence of synchronized RF frequencies, which progressively increases in blocks of accelerator sections, to accommodate Slugs with progressively higher nominal speeds and, therefore, higher bunch frequencies. The required RF bandwidths correlate with the range of the speeds of the various Isotopic Species.

One design-optimization trade-off concerns the number of different RF frequencies used. For any given frequency, individual microbunches move toward the zero crossing point of the RF waveform, and experience a smaller fraction of the peak accelerating (or decelerating) voltage gradient. By increasing the RF frequency of succeeding Snugger sections, the voltage gradient experienced by the first and last microbunches can be periodically reset to the original phase angle. Thus, the utility of many frequencies is to achieve more efficient use of a length of Snugger and the RF power that drives it.

The state of the art of accelerator structure and RF power design and manufacturing makes it practical and economical to use a substantial number of discrete frequencies. However, the multiplicity of frequency changes will experience diminishing returns, and the number of frequency changes used is a topic appropriate for trade-off studies during detailed design.

Control of the waveform for Cradling is integrated with parameters from detailed design and modeling.

Snug Stopping

Snug Stopping removes the velocity differential when the process has reached the practical limit set by the diameter of the bore-tube that the beam must pass through. Beam scraping is to be avoided, and simulations of particle beams are challenged to model beam "halo", however it is noted that the high quality beams will be focused to millimeter and submillimeter diameters downstream, albeit by lenses with large aperture magnets. The workhorse S-band structure of SLAC's 2-mile linac is an appropriate illustration. The structure's bore is about 2 centimeters, which seems ample for clean passage of the heavy ion beam.

Microbunches progressively compress axially to fit similarly on RF waves with decreasing RF periods. The momentum spread within microbunches increases proportionally. This larger momentum spread, however, after the microbunches are released from phase focusing after the Slicker (at a later point on the beam path, and potentially after the RF Chromatic Corrector just after the Slicker), they shear in longitudinal phase space, the phase space ellipses stretch in the time dimension, and their instantaneous momentum spread shrinks. This behavior is exploited in the beam compaction effect of the Slicker, as discussed elsewhere herein.

Telescoper

The multiplicity of isotopes is distinctively greater than the prior art. The internally consistent, end-to-end design is predicated on using many isotopes, e.g. ten. When an Isotope reaches the Common Rigidity, that Slug is switched into a Telescoping Beamline, i.e., a beamline in which Slugs get closer together as they move downstream toward the fusion target in one of the multiple chambers. Heavier isotopes are switched out of the Telescoper first. The isotopic masses of the multiple isotopes range approximately ±5%, subject to the bandwidth limitations of downstream RF beam handling processes.

Timing features of the beam pulse structure are provided by generating a specified RF waveform that applies to all operations needed to generate each Ignitor Pulse. Included is the differences needed to accommodate the different overall distance from the ion sources to the fusion fuel targets in one or another of the Multiple Chambers, arriving according to a specified sequence that provides the desired Ignitor Pulse power profile. Gated emission of the various Isotopes from their respective is coordinated with the master RF waveform.

New Features after Acceleration

For illustration, at the linac output, each of four active beam tubes emits 1.25 A.

Merge

The multiple beams exiting the linac are merged in the transverse phase space (the 4-dimensional phase space including both planes). This amplifies the current in a single beam by the number of incoming beams (i.e., beams emitted from the linac), e.g., four. Merging of four beams into one beam may be effected in a two-step process: (1) Merge the four beams two at a time, in one of the planes of transverse phase space, to result in two downstream beams, and (2) Merge these two beams into one using the other plane of the transverse phase space. Beams may be merged with economical use of phase (small emittance dilution), by merging at a beam focus.

Because storage rings are not used in the SPRFD, and therefore the emittance will not be increased by multi-turn injection into storage rings, the Merge (including dilution factor) is the last process that necessarily increases the transverse emittance of the beam after its exit from the linear accelerator, of which the Telescoper is the last section.

The transverse emittance after the merge leaves a factor of approximately ten to spare in each transverse plane. That is, if transport over the remaining beamline were perfect, i.e. no emittance growth, the radius of the spot on the target would be ten times smaller than the 50 μm needed for Fast Ignition. An appropriate apportionment of this factor of ten is to assign a factor of three to the accumulation of emittance growth as an unspecified contributions from the expected imperfections, misalignments, tolerances in the precision of RF fields, and the precision of magnetic fields optimized versus cost. The remaining approximately factor of three to spare in the transverse emittance is kept as a factor of safety.

This introduces substantial improvement in the tightness of focusing of the beams on fusion targets compared to the prior art. Although the maximum peak target heating needed for Fast Ignition is the top priority, and overall improvements in the efficiency and effectiveness by additional uses of the tighter focus are a second major benefit of the reduced beam emittance, an alternative use with cost and chamber design benefits would be to give relief to the parameters of the final magnetic lens system. As a general guideline for a final design, maximizing beam parameters to minimize risk is prioritized over exploiting potential costs savings. This rule follows the logic of the first thermonuclear explosive that the design should be "as conservative as possible" (Teller and Garwin). Using design innovations to achieve cost savings will be applied for design refinements during the build-out phase of the fusion power supply system for the economy.

Slug-Slug Delay Line (A.k.a. Loop Stacking)

The Slug-Slug Delay Line is the complement of the Merge. It completes the affordable trade of available transverse phase space for a needed reduction in longitudinal phase space.

Slug-Slug Delay sorts successive sections of beam (Slugs) into parallel beamlines. The microbunches in parallel beamlines are in synchronism, as needed to maintain correlation for RF structures with multiple bores for the parallel beams.

The following illustrates a case of Slug-Slug Delay. The structure of the beam emitted by the accelerator is specified with each Slug subdivided into four Sub-Slugs, which are separated by time gaps that are adequate for the rise-time of switch magnets. The first Sub-Slug is switched into a beam line that completes a revolution to return the Sub-Slug to the vicinity of the input switch, after which it is in a separate beamline that is parallel to the beamline that carries the unswitched following Slug. These two parallel beams are switched into a second loop with twice the circumference of the first. After one orbit around this loop, these two parallel beamlines proceed in parallel to the two beamlines carrying the following unswitched pair of Slugs.

Beam amplification has been accomplished by investing a portion of the availability of investable room in transverse phase space that is due primarily to the absence of multi-turn injection into storage rings. The longitudinal phase space is unchanged in principle, and growth by dilution will be determined by the precision of the RF fields that maintain the microbunch structure as the beams travel to the target.

The total instantaneous current of the multiple propagating Slugs has been increased four-fold by the Merge, and the empty space between Slugs has been increased four-fold. The enlarged space represents culmination of the beam manipulations that rearrange the various smaller time gaps into one continuous gap between isotopic Slugs, which is removed in one large chop, performed by the Isotope-Isotope Delay Line (aka Helical Delay Line 2800, or HDL) and the following reinsertion of the sequence comprising all isotopic Slugs into a single set of four parallel beamlines.

The multiple beam configuration (e.g., four) established at the output of the Slug-Slug Delay continues to the fusion fuel target. The eight Slugs going into the Slug-Slug Delay come out as two sets of Slugs in the four parallel beamlines. One set of four Slugs is routed to each end of the cylindrical target.

Figure 27:
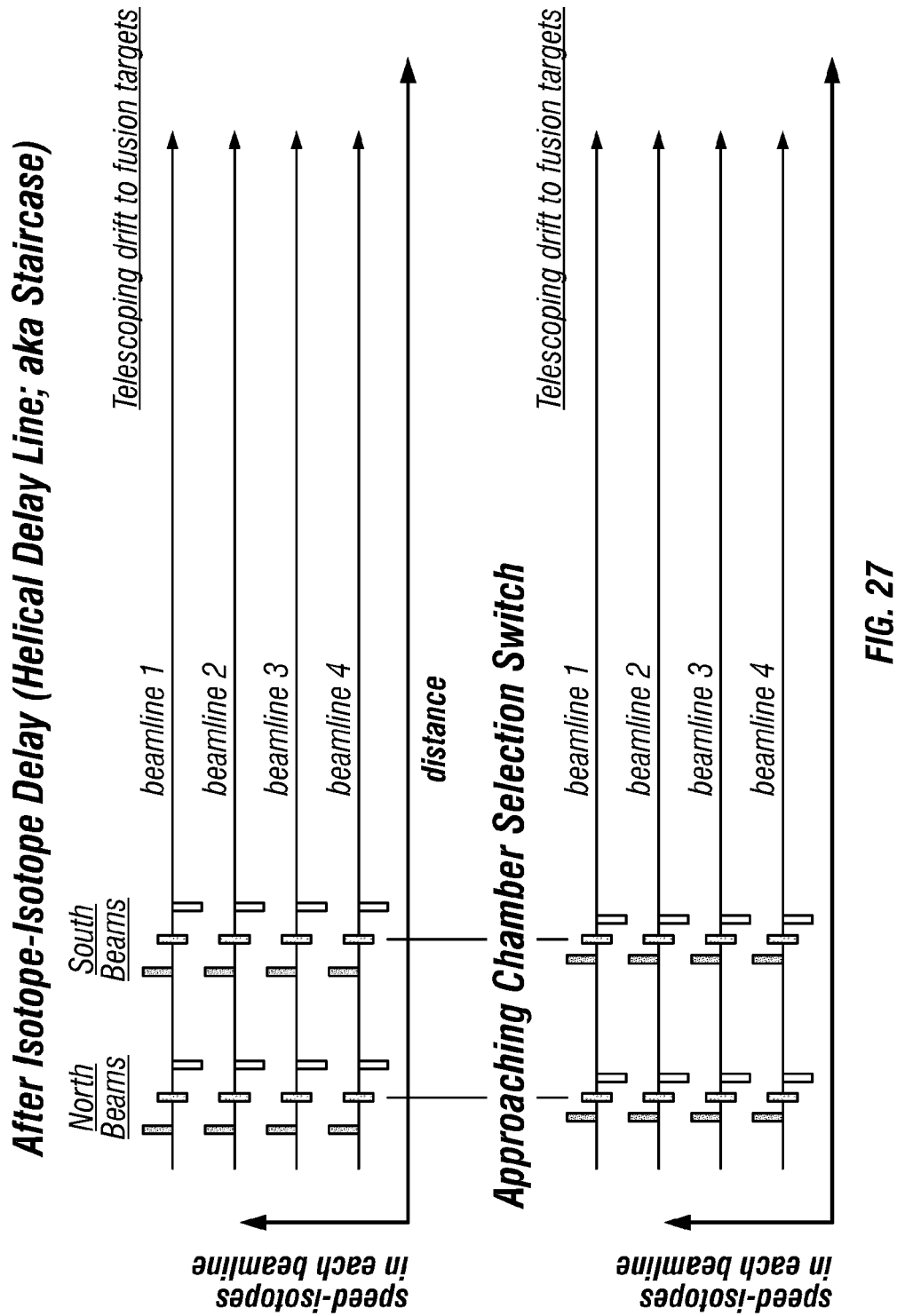
FIG. 27 illustrates lengths and spacings of slugs using three species for illustration.

The choice for the location of the Slug-Slug Delay from a number of possible positions along the beamline depends on the technology trade-offs associated with propagating a single beam (viz. after Merging the multiple beams from the linac) or as multiple parallel beams (viz. as created by the Slug-Slug Delay, aka Loop Stacking). This consideration is relevant to the beam configuration input to the Helical Delay Line. FIG. 27 shows a diagram 2700 of the relative length and spacings of slugs, using three species for illustration.

Isotope-Isotope Delay Line (Aka Helical Delay Line, HDL)

Figure 28:
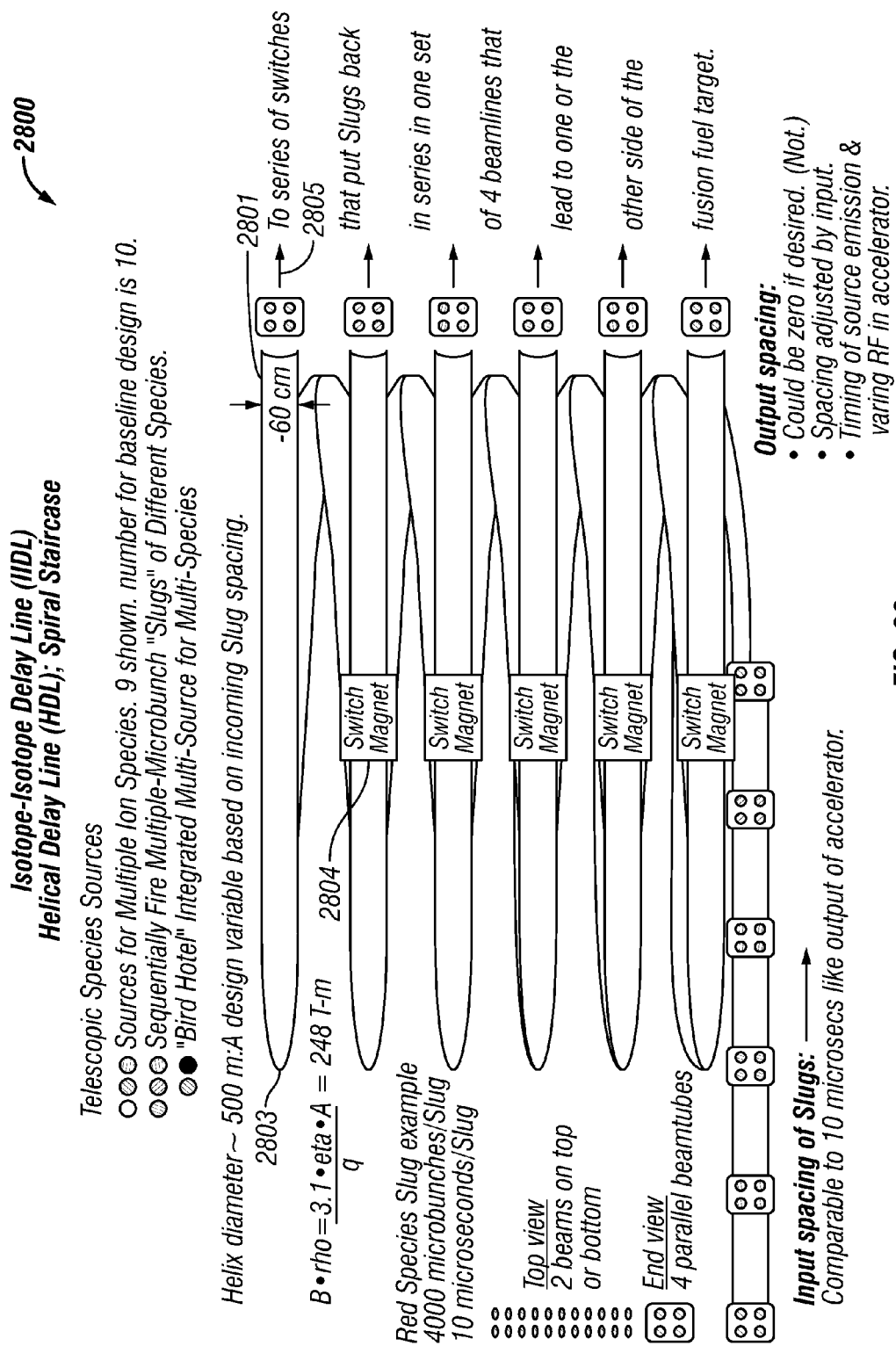
FIG. 28 provides an illustration of a helical delay line.
Figure 28:
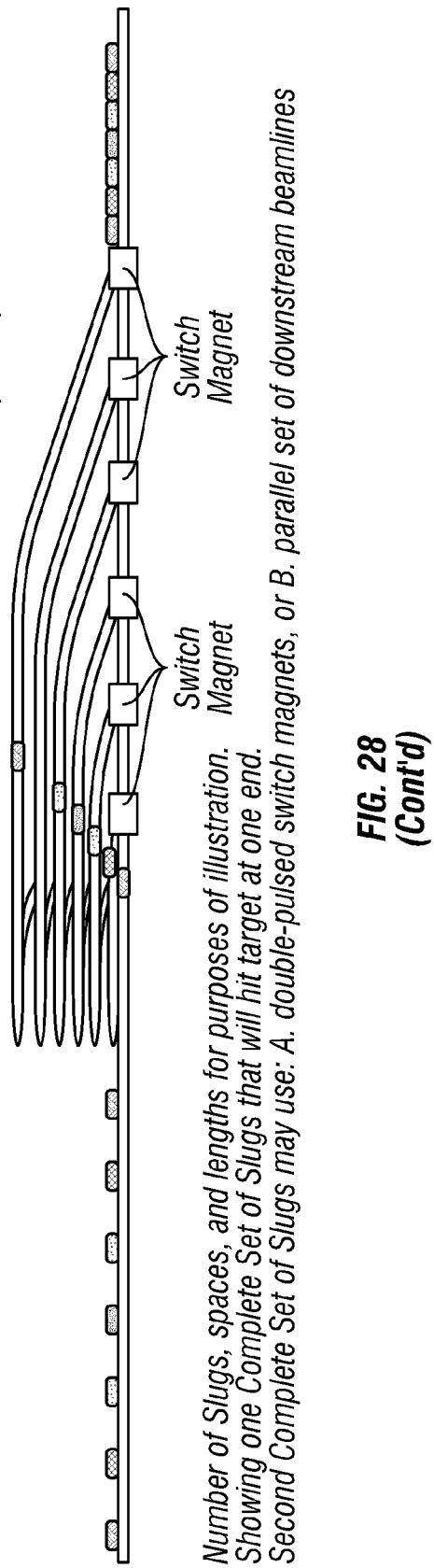

Shown in the diagram 2800 of FIG. 28, the effect of the Helical Delay Line 2801 is to chop out a preponderance of the space between centers of successive Slugs. This achieves a major reduction in overall beam duration, which was made possible by rearranging various gaps into a single large gap between Slugs in the series of beam manipulations previously described, e.g., Snugging moves the multiple small gaps between microbunches inside individual Slugs to the gap between Slugs.

After the isotopic Slugs are reinserted in common beamlines (e.g., four), the gap remaining between the trailing end of one Slug and the leading end of the next, likewise the time between Slug centers, is intentionally variable. This is to accommodate the different amounts of telescoping that will occur during transit over the different remaining distances to the Multiple Chambers.

The length of each coil (orbit length) 2803 of the HDL is of the order of the distance between the centers of successive Slugs. However, timing of the magnets 2804 for switching individual Slugs out of the HDL accommodates any Slug spacing greater than the time of the orbit around the circumference of one coil of the HDL. The first Slug in a Slug Train traverses the full length of the Helical Delay Line before its exit point. Successive Slugs of progressively faster ions exit the HDL sequentially, after traversing progressively fewer turns of the HDL. The exits 2805 for the various Slugs are approximately at the same azimuthal point on the HDL 2801.

Large fractions of the inter-Slug gaps, including the enlargement of the gaps due to Snugging and the Isotope-Isotope Delay Line, are removed when the Slugs exiting the HDL are switched back into the common beamlines that continue to the Chambers.

After output from the HDL, the space now between Slugs, after reinsertion as inline Slugs in the parallel beamlines (e.g., four) that will terminate at the mouth of the Final Focus lenses (e.g., four), is specified by the downstream timing requirements for ignition in one of the Multiple Chambers. The Slug-Slug space remaining accommodates subsequent beam manipulations and beam dynamics, particularly those manipulations that operate on individual microbunches within individual Slugs. Examples are Slicking, and potentially RF Chromatic Correction to counter the contribution of the Slick Kicks, by exploitation of their inter-correlation, to chromatic aberration at the spot-on-target focus. Microbunch properties (emittances) are maintained by periodic Reflection of the ellipse of the longitudinal emittance, or distributed phase focusing up to the Slicker's output, or potentially the output of the RF Chromatic Corrector. RF maintenance maintains the longitudinal microbunch structure within Slugs.

Slug's Exit Delay Line

The spacing of the microbunches within each Slug is static from the Snug Stopper downstream to the Slicker that is in the portion of the beamline specific to one or another of the Multiple Chambers. The freezing of the microbunch spacing uses the Snug Stopper to remove the speed difference between microbunches and uses Bunch Maintenance (Reflectors) at intervals along the beamline up to the Slicker. Freezing the microbunch spacing in this way accommodates:

Different lengths of the paths of different Slugs through the HDL and

Different lengths from the HDL to the Multiple Chambers.

Locating the Snug Stopper upstream from the HDL 2801 removes the relatively large energy spread from microbunch to microbunch that was input for the Snug process. This allows the Isotope-Isotope Delay Line (HDL) to transport beam with only the small momentum spread inside individual microbunches.

Microbunch Maintenance

Maintaining the microbunch structure and preserving the 6-dimensional phase space of individual bunches is an overall hallmark feature of the new Driver design.

Beam Drift and Conditioning for Multiple Chambers: HIF fusion power is most economical if a single heavy ion driver system ignites fusion pulses in a repeating sequence in multiple fusion chambers. In the most general layouts of multi-chamber fusion power parks, the distance from the accelerator varies from chamber to chamber.

Telescoping and Snugging are the key dynamic beam generation processes. Telescoping first is grossly programmed (bracketed) via appropriate differences in the timing of emission from Multiple Isotopic ion sources to culminate at Multiple Chambers. The precise timing within the timing brackets is provided by RF waveform control. Absolute timing of the arrival of a Slug at the target thus is extended to a small fraction of the RF period of the lowest frequency RF accelerator. For example, control to 0.01% of the 100 nsec period of a 10 MHz Marquee Linac would give 0.01 nsec control of the Ignitor Pulse Profile. However, this timing is further refined by the beam handling at the highest RF frequency, about 2 GHz. RF phase control to 0.01% of the 0.5 nsec period at 2 GHz translates to timing control to 5 psec. Passing this level of control along the beamline translates to tightly regulating the beam's speed. This translates to tight regulation of the time of arrival of all pieces of the beam at the target for near simultaneity or pulse profile shaping as desired.

Slick

The Snug Stopper permits microbunches within a Slug to maintain their relative positions as a Slug traverses the distance to one of the Chambers. At a specific location on the beamline before the target Chamber, the differential motion of the microbunches is restarted by the Slick process, which is similar to the RF process for Snugging, differing only in that after the Slick kicks imparts the differential speeds, the microbunches are released from phase focusing and the Slick process is not terminated and allowed to continue to the target.

Figure 29:
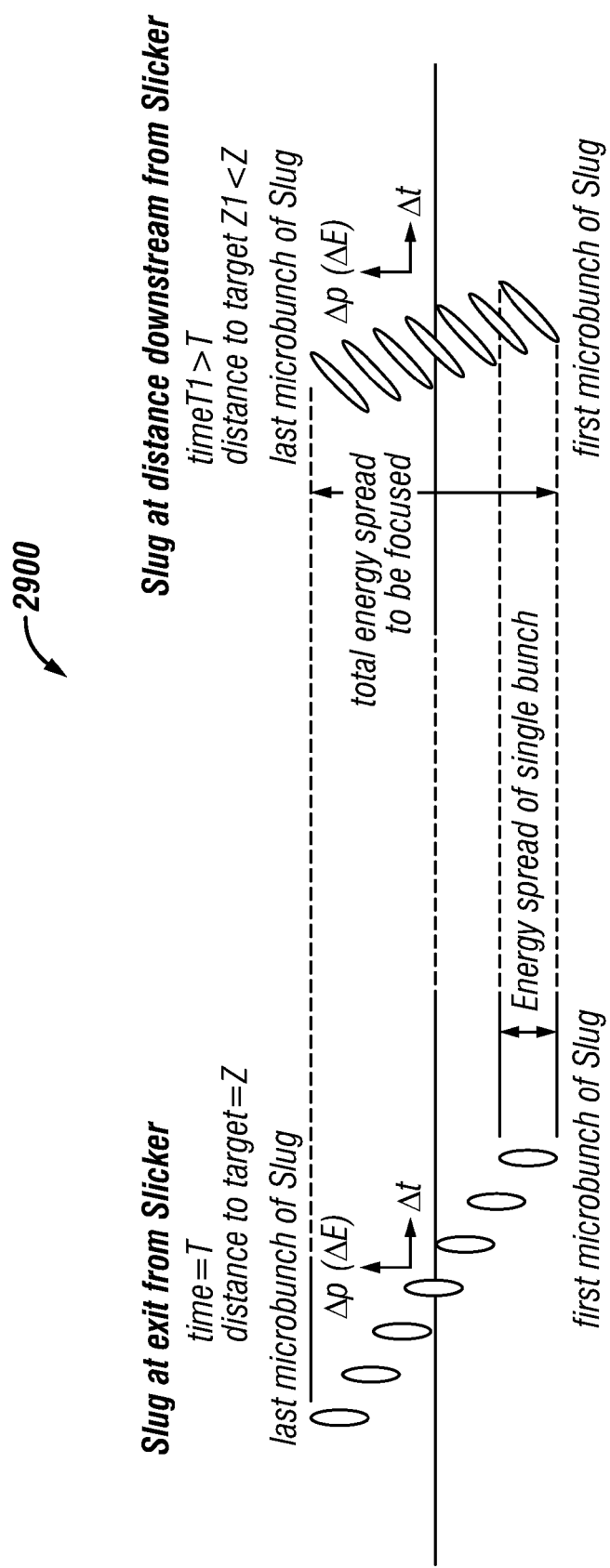
FIG. 29 provides a diagram of microbunch motion downstream from a slicker.

At specified distances upstream from each of the Multiple Chambers, Slicking imparts specified, smaller velocity differentials back into microbunches of the various Slugs. After the Slicker, the microbunches are released from the axial length constraint of phase focusing. FIG. 29 illustrates the Slicking process 2900. As the Slicked beam drifts toward the target chamber, the centers of the microbunches get closer together and individual microbunches lengthen as a result of the velocity spread intrinsic in the longitudinal phase space. Space charge forces also stretch the microbunches, and tend to distort the ends of the longitudinal phase space ellipses such that the emittance, or momentum spread, that effectively must be focused tends to increase. This space charge effect is mainly operative during the initial period before consecutive microbunches start to feel the counteracting space charge of each other.

Conserving the longitudinal phase space area, the microbunches stretch in time and narrow in instantaneous momentum spread as the various Slugs proceed, and eventually Telescope into the desired beam power profile at the fusion target. RF Chromatic Correction may remove part or all of the contribution to chromatic aberration due to the Slick kicks, but the required size of the spot-on-target budgets allowable chromatic aberration that will be met without taking advantage of this possibility.

The differential speeds imparted to the microbunches by the Slick kicks are initially specified so that all microbunches arrive at the target simultaneously, or with a desired spacing. Any effects of space charge to alter the inter-bunch speed differential may be compensated in part by corresponding modulation of the accelerating voltage of the Slicker. Space charge effects and errors in RF waveforms of the bunch maintenance and the Slick will be responsible for any growth of the longitudinal emittance.

Figure 30:
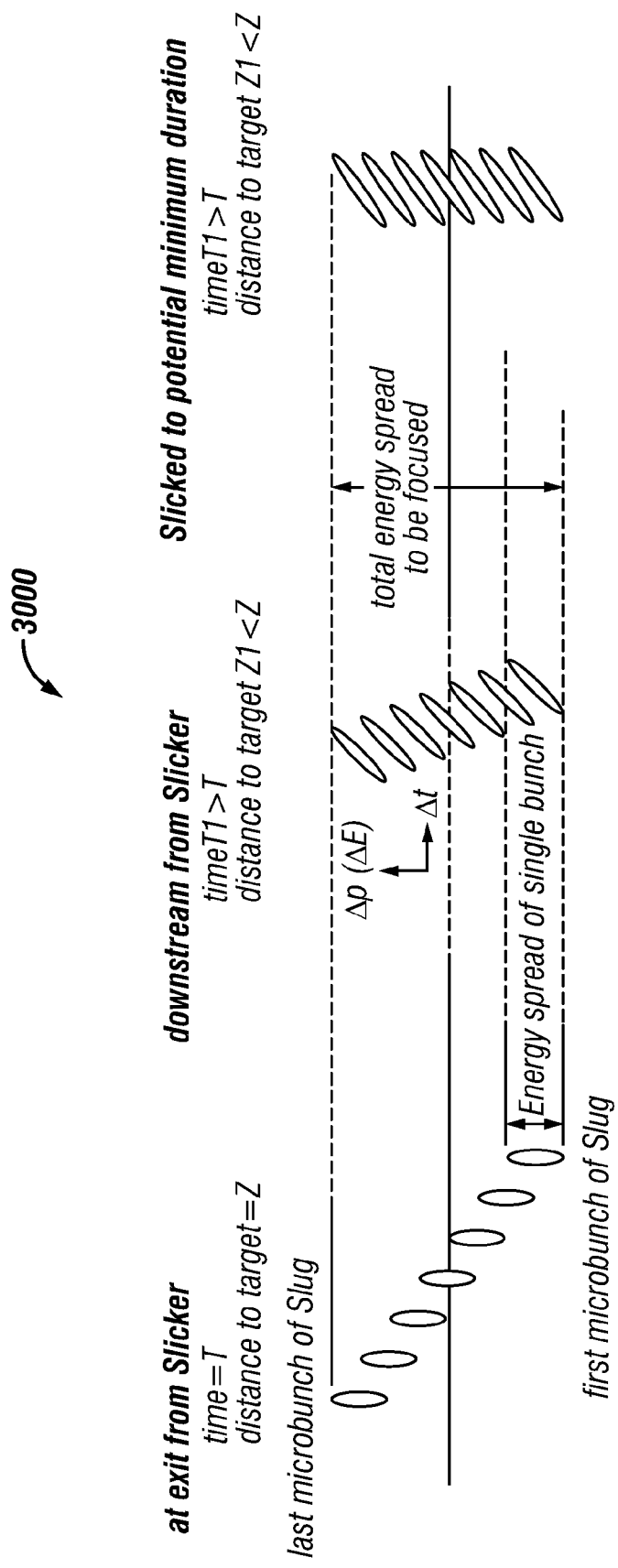
FIG. 30 provides an illustration of potential minimum slug duration by slicking.
Figure 31:
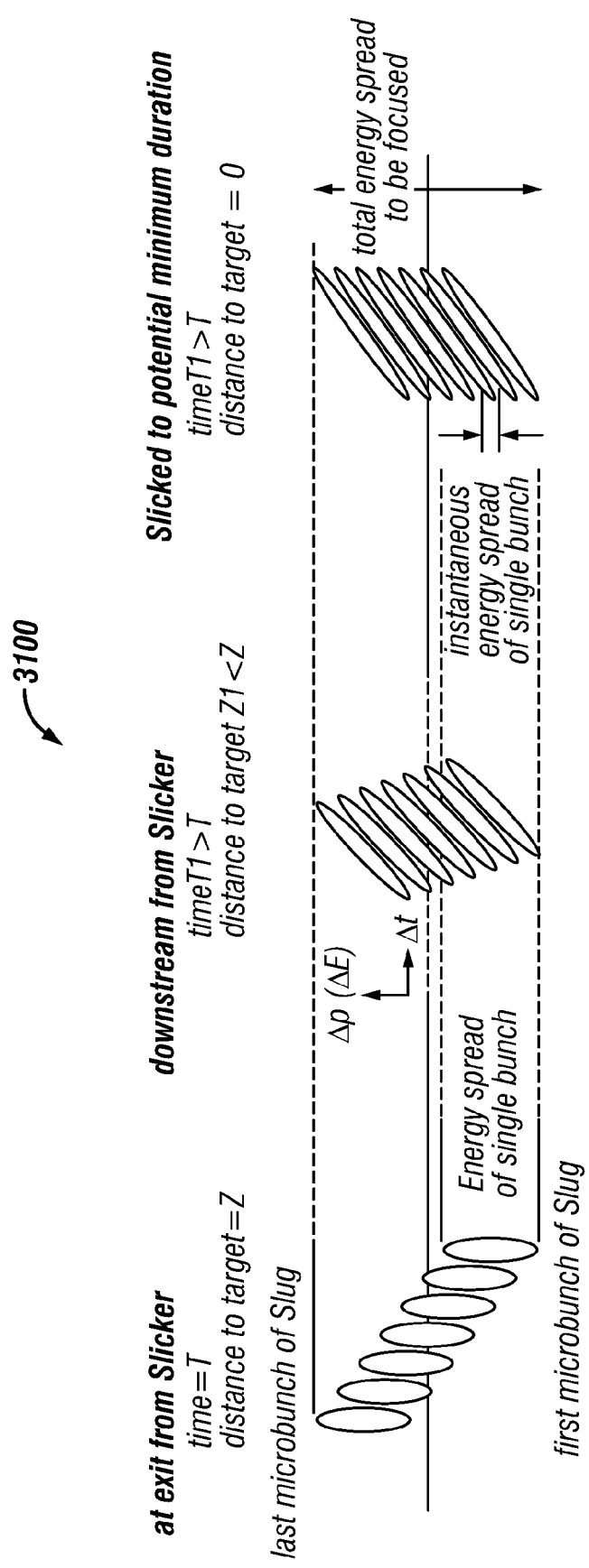
FIG. 31 provides an illustration of slicking that indicates relative contributions to the overall momentum spread from microbunch phase space and slick kicks.
Figure 32:
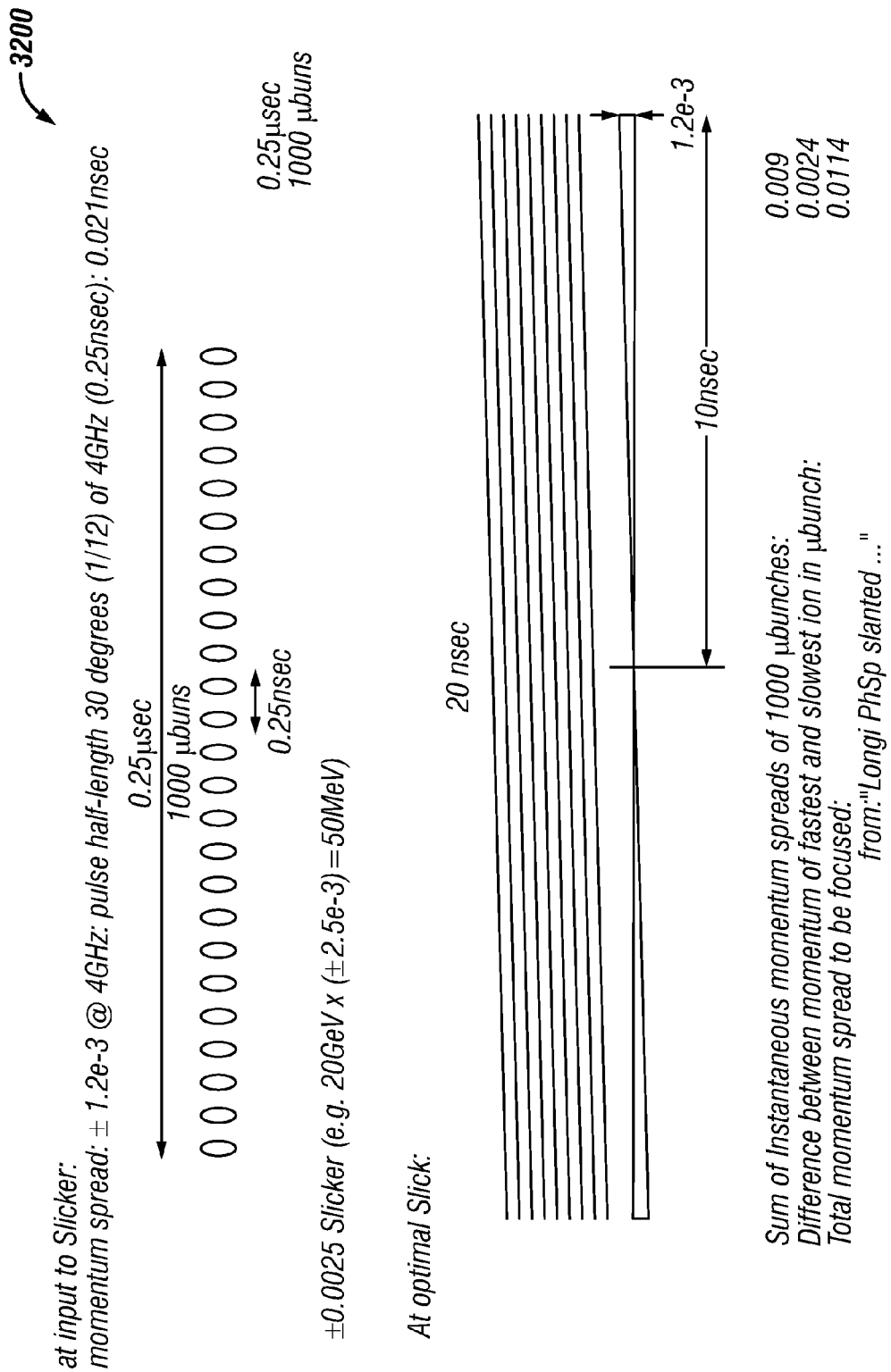
FIG. 32 provides an illustration showing the extensive thinning of the longitudinal phase space ellipses that results in an optimal slick effect.

The effective minimum, total momentum spread 3000 is illustrated in FIG. 30 for the general case. The potential minimum Slug length is seen by inspection to be the sum of the instantaneous momentum spreads of the stack of Slicked microbunches plus the difference of momentum between the front and the back of one microbunch. This effective minimum momentum spread (illustrated in FIG. 31) is well below the requirements for acceptable chromatic aberration at the target. FIG. 32 provides a diagram 3200 illustrating an optimal slicker effect.

Ignitor Pulses are switched from a Trunk Beam Line into beamlines that terminate in (are specific to) the individual Chambers. Each of these terminal sections of beamline, two per chamber, requires an individual Slicker. Slick imparts much smaller differential speeds than Snug (<0.5% vs. 5%) and the total of Slickers for all Chambers is a relatively small part of the system's cost.

TABLE 1

Illustration of Slick as scaled from prior art

| HDIIF linac 10 GeV Bi+ 200 MHz | HIF linac 20 GeV Xe+ 400 MHz | HIF Snug 20 GeV Xe+ 4000 MHz | HIF Slick 20 GeV Xe+ @4000 MHz | @target |
|---|---|---|---|---|
| 5 nsec | 2.5 nsec | 0.25 nsec | 0.25 nsec | 20 nsec |
| 1.2e−4 | 1.2e−4 | 1.2e−3 | 1.2e−3 | 1.2e−3 |
| 1.5 nsec | .75 nsec | .075 nsec | n/a | 9e−6 |
| q_μbunch _peak | q_μbunch I_peak | q_μbunch I_peak | n/a | 1000 |
| | | | n/a | 9e−3 |
| | | | .075 nsec q_μbunch I_peak | 10 nsec Snugmore |

Wobbler

The primary purpose of the RF Wobbler is to swirl the beam spot rapidly around a circular spot on the end of an annular stopping region in the cylindrical target. Wobbling/Swirling at a ≥1 GHz serves purposes of: 1. Smooth energy deposition density in the target, and 2. Smooth variation of the trace of the spot while varying the amount of wobble to cause the beam spot to spiral toward (or away from) the target's axis.

The RF Wobbler is located upstream of the final focusing lenses, where the beam diameter is small in correspondence with the high-frequency Wobbler's aperture. Where Isotopic Species that have a large percentage speed difference are used, particularly for the sequential processes of Compression and Fast Ignition, the block of Slugs for Compression must experience the Wobbler effect (for the spot to illuminate an annular shape), while the Wobbler effect must be off when the portion of the beam for Fast Ignition passes through, so the Fast Ignition pulse will arrive at the center of the target.

A number of beneficial effects accrue from using slower ions for the Fast Ignition Pulse compared to the speed of the ions of the Compression Pulse. For Cylindrical Targets in particular, the peak power required for Fast Ignition decreases approximately linearly with the ion range. The range of energy deposition shortens with higher Z (atomic number) and lower kinetic energy. The sensitivity of design optimization to the choice of ions is not great, and choices of the relative mass of the Fast Ignition and Compression ions are driven by the practical consideration of immediate availability of the hardware, i.e., known and readily made ion source technology.

For illustration, volumetric plasma xenon sources is commercial technology (ANL used this technology in key current and brightness demonstrations 1976-80.) Using xenon at Z=53 for the Compression Pulse, a number of heavier ions are good candidates. If lead is used for the FI ions, and 20 GeV is the nominal energy of the multiple xenon isotopes for the Compression Pulse, the Telescoping Condition requires the energy of the lead isotopes to be in a range near 13 GeV. The shortening of the range in the pre-compressed fuel, of this example, is a factor of 6×-7×. The volume of the FI heated mass of pre-compressed fuel may be made to be approximately the minimum (spherical) physical volume, containing the minimum mass to be FI-heated. Quantitatively, the reduced FI Pulse peak power requirement that results from the more optimum depth of the Fast Ignition-heated zone is a major reason for confidence in the operability of the new Driver (SPRFD) design. Coordinated optimization of the parameters for the Fast Ignition and Compression Pulses will achieve significant cost avoidance.

For illustration, the spot size required for the Ignitor Pulse Beams is found from the propagating burn parameter, rho·R, for example 0.5 g/cm^2 (a conservative value). For fuel pre-compressed to 100 g/cm^3 (a relatively safe requirement), the radius of the FI-heated spot diameter needs to be at least 50 μm. Larger spots require more peak ignitor beam power and energy. Smaller spots require more compression, and higher beam brightness.

The FI spot requirement is approximately a factor of ten tighter than for the Compression Pulse, as has been shown by reliable simulations. Prior HIF art held the Compression spot to be achievable, but hard to improve on. The use of the expanded volume in 6-D phase space provided by using a multiplicity of isotopes, particularly avoiding the emittance increase due to multi-turn injection into storage rings, achieves the desired improvements, and makes the advantages of Fast Ignition safely within reach of the technology.

The large difference in speeds between the Compression and Fast Ignition pulses illustrates the substantial time gap between them at the Wobbler. This gap illustrates the satisfactory timescale of the Wobbler's rise time, as illustrated in FIG. 33. The bandwidth for modulating the Wobbler field is indicated by reference to the rise time.

The rise time of the RF Wobbler field is of importance regarding separate pulses for Compression and Fast Ignition (FI). Wobbling enables heating an annulus along the axial direction. But the beam energy for Fast Ignition per se needs to be delivered on axis, with two considerations: (1) If the total cross-sectional area of the pre-compressed fuel is larger than the minimum set by the propagating burn parameter, the Fast Ignition beam may be correspondingly off-axis. (2) If, economically, the power of the Fast Ignition pulse may be greater than the optimized minimum, the Fast Ignition pulse may have a larger spot area than the minimum, which may be off-axis and still cover the optimal minimum area of the end of the mass of precompressed fuel to be fast ignited.

Target Improvements

Compared to the prior art, the new current multiplying processes result in improvement of the beam parameters that define the intensity of target heating and the target response. Higher total beam energy, reduced spot sizes will increase power deposition density and drive targets providing higher energy gain from the fusion reactions. Power deposition density in the target will increase in proportion to the square of the spot diameter. Ignition calculations for fuel target design are planned to exploit these improvements.

Heat deposition uniformity is important for good target performance. Wobbling Telescoping Species smoothes the heat deposition by displacing the instantaneous spots hit by different Species. Due to their different speeds, ions at corresponding points along the different Slugs pass through the Wobbler at some distance upstream from the target (e.g., 30 meters) at different phases of the Wobbler RF field, and ions at different axial positions along a Slug penetrate the heated annulus at different azimuthal points.

During the passage of a Slug through a cylindrical target, a Wobbled beam flies forward with the fixed shape of a helical coil spring. The thickness of the coils is the diameter of the beam spot. During passage of this helical shape through the target, the instantaneous heating at each point in the cylindrical annulus corresponds to the helical shape of the heat source. Heating of the entire annulus is not instantaneously uniform. The time-averaged heating smoothes out over passage of the whole Slug.

With Telescoping, the helical-spring shape of different Slugs in the target is rotated relative to each other, around the common axis. For illustration, if the SlugTrain timing is specified for all Slugs to arrive at the target simultaneously (or with another specified timing, such as to provide a desirable Ignitor Pulse Power Profile), the tips of the different beam helices enter the annulus being heated at different azimuthal locations. The interspersed helical Slugs of the Multiple Isotopes fit into the helical spaces (the helical pitch minus spot diameter), netting a smoothing factor improvement equal to the number of Multiple Isotopes. Different Slugs may be timed for different overlapping arrangements.

The stretching of individual microbunches by the Slicker adds a further smoothing effect. The ions in a given microbunch differ in speed by, e.g. 0.1%. This results in ions that experience the Wobbler fields at the same time arriving at the target at different times. The effect is to flatten the cross section of the instantaneous beam.

Important improvements in target performance accrue from the smaller spot size by causing the spot of the Compression beam to follow the decreasing radius of the interface between the absorber layer and the pusher. Fast Ignition is accomplished with less (e.g., ⅐) as much beam energy and power in the Fast Ignition (FI) beams by using shorter-range, heavier isotopes for the Fast Ignition pulse than for the Compression Pulse. The shorter-range beam may provide additional advantages by increasing the duration of the shorter-range relative to the time for Fast Ignition per se, while maintaining the same power level, by driving the cylindrical end-caps to facilitate fuel compression and by burning through material blown off during Compression to reach through this material and heat the fuel mass to be Fast Ignited.

Advantages of New Design

First single-pass HIF driver to use conventional accelerator technology;

Makes strong use of multi-species for telescoping beams at fusion target;

Eliminates storage rings, removing difficult/expensive technical issue;

Loosens requirement for beam emittance of individual ion sources; and

Reduces aggregate total solid angle of igniter beam input-port apertures in the walls of the fusion chambers.

New Technical Features
- Multiple fusion chambers with one robust accelerator/ignitor (2-10 BOE per fusion pulse);
- sacrificial lithium fuel-charge sabot, neutron moderator, T-breeder, ultra-high temperature hot working fluid;
- Lithium droplets and fog sprays muffle blast;
- Lithium droplets and fog sprays create ultra-fast, inter-pulse, fusion chamber vacuum pump;
- Pulsed, very high-flow rate lithium pump (from ~2 tons up to 10 s of tons per second in earliest chambers)
- Multi-ion species source hotel;
- Micro-bunch snugging system preserves RF temporal structure and timing of ion beam;
- Delay Line reconfigures intra-isotope beam structure to reduce momentum spread for focusing on target;
- Helical, serial-species delay and re-timing line;
- Fewer beamlines and final focus lenses into fusion chambers;
- Heat transferred at very high temperature by lithium vapor to heat exchanger inputs, and not transferred through the chamber walls, so that chamber structural materials operate at the low temperature of the lithium returning from heat exchangers, e.g., a minimal temperature above (e.g., 25° C.) the melting temperature of lithium (185° C.) and
- The potential for direct conversion of fusion energy carried by both charged particles and neutrons.

Improvements Concerning the Overall System Performance and Cost Include:
- Improved ignitor pulse focusing properties (by exploiting 6-D phase space of multiple species);
- More intense target heating, with classical "Bohr" ion stopping in matter that typifies HIF using RF drivers;
- More uniform target heating;
- Ten times more ignitor pulse energy than the National Ignition Facility;
- Fast Ignition (FI) with FI ion species chosen to maximize ignition vigor;
- Timing for Multiple Fusion Power Chambers;
- Driver duty factor in Pulsed RF range; and
- Relieved vacuum requirements.

The new beam processes do not call for multi-turn injection into storage rings. This avoids areas of prior technical concern, significant design effort, and major hardware demonstrations of issues peculiar to storage rings. Removing these concerns shortens the schedule for HIF by removing the need for a time-consuming validation project, necessitating hardware with size, capabilities, and costs similar to those of the storage rings and linac that would be used in a power producing system.

Comparison

The new processes may be expressed in terms of a line-up of beam multiplication processes.

$$I_{target} = I_{source} \times N_{isotopes} \times N_{sources} \times N_{snug} \times N_{slick} \times N_{sides}$$

For illustration, treating either Compression or FI pulse. Compression parameters shown in Table 2, herein below

TABLE 2

| | | |
|---|---|---|
| $I_{source}$ | xenon with 1.5 MV Preaccelerator voltage = | 0.1 A |
| $N_{isotopes}$ | number of sources per Source Hotel = | 10 |
| $N_{sources} =$ | number of beam channels in Source Hotels, Preaccelerators, and Marquees = | 32 |
| $N_{snug} =$ | ratio of microbunch spacing pre- and post-Snug = | 10 |
| $N_{slick} =$ | length of Slug at Slicker ÷ length of Slugs at target = | 12.5 |
| $N_{beams} =$ | number of beams into chamber = | 8 |
| $I_{target} =$ | total beam on target from all directions = | 128,000 A |
| Total Power = | $I_{target}$ × Ion Energy (20 GeV) = | 6.4 PW |

Increasing the total current out of the linac results in the linac's RF power being on a relatively short time per ignition pulse, e.g., 300 microseconds. Using ten pulses per second, e.g. to drive ten Multiple Chambers at one pulse per second each, the RF duty factor is 0.003, safely inside the range classified as pulsed RF power. The benefits of pulsed RF are higher peak power per source and lower cost per peak-power Watt.

The new set of processes for compacting the current produced by the linac minimizes the time the beam dwells in any section of the beam tube, and achieves the important case of a single pass system. Generating the pulse in a minimum of time increases the required RF peak power, but reduces the RF duty factor below the threshold of a fraction of 1%, where peak RF power costs substantially less peak Watt than continuous RF power. For purposes of illustration, Table 3 illustrates this cost consideration based on engineering estimates scaled from state of the art HIF design and costs in the current state of the art of RF power systems:

TABLE 3

| | Linac current total | K.E/ion | Peak RFpower | Ignitor energy | Beam load | Ontime/ pulse | Rep rate | Duty factor | Price/ W-peak | Average power | Price/ W_avg |
|---|---|---|---|---|---|---|---|---|---|---|---|
| HIF | 5 A | 20 GeV | 100 GW | 20 MJ | 0.9 | 300 µs | 10 pps | 0.3% | .015$/W | 300 MW | 30$/W |
| HIDIF | .4 A | 10 Gev | 4 GW | 4 MJ | .6 | 1500 µs | 50 pps | c.w. | N/A | 400 MW | 30$/W |

With 5 A at 20 GeV, the RF feeds 100 GW into the beam during the pulse. The power to excite the accelerator is a factor of several less than the beam power, but is not shown. With this caveat, the illustration is instructive for consideration of the economics of HIF power production.

The new design features exploit the large increase in the total 6D phase space made available by the use of Multiple Isotopes. The smallest area that can be illuminated at the surface of the target and, therefore, the smallest volume into which the beam energy can be deposited, is governed by the conservation law of physics known as Liouville's Theorem. The essence of Driver design is to work with the 6D phase space defined at the point of origination of the entire number of beam ions, which total about 10 peta-particles, ten million billion, for each Ignitor Pulse.

HIF Driver designs in the prior art are considered stressed, in terms of the capabilities of known technology. Characteristically, the stress is expressible by pressure to achieve the highest brightness of ion sources, to put the required number of ions into a small enough volume of 6D phase space, so that the processes that constitute Ignitor Pulse generation deliver the beam parameters to the fuel target that ignition calls for.

Transverse emittance benefits the most, by avoiding the large increase of emittance attendant on multi-turn injection into storage rings, and limiting stacking in transverse phase space to a factor of two in each transverse plane in the Merge. The factor, e.g. 2.5× (including dilution), by which transverse emittance grows in each plane, as a result of Merging multiple beams emitted by the Linac, is the only one of the series of beam conditioning processes that employs the transverse (4D) phase space.

Smaller transverse emittance enables achievement of smaller beam spots on the target, which increases heating intensity as the inverse of the diameter squared. For illustration, a spot diameter five times smaller will increase the intensity twenty five times. Preservation of the microbunch structure and integrity in phase space offers, in principle, to deliver the smallest emittances to the target promised by a heavy ion fusion driver with beam parameters that are very conservative (significant margin of safety).

The Snug and Slick effects capitalize on microbunch maintenance to conserve longitudinal phase space by systematically moving inter-bunch spaces to the adjacent inter-Slug spaces, which subsequently are largely removed (according to pulse timing specifications) by the Helical Delay Line. This process compacts the beam without damaging the longitudinal emittance, resulting in lower chromatic aberration at the target.

Generation of Ignitor Pulses by a single pass through the system relaxes the vacuum requirements. This avoids cost and adds safety margin to the design. The new beam processes do not call for multi-turn injection into storage rings. This avoids areas of prior technical concern, significant design effort, and major hardware demonstrations of issues peculiar to storage rings. Removing these concerns shortens the schedule for HIF by removing the need for a time-consuming validation project, necessitating hardware with size, capabilities, and costs similar to those of the storage rings and linac that would be used in a power producing system.

For an illustrative comparison to the prior art, the new Driver concept combines 5-10× higher total Ignitor Pulse energy (or more); as high or higher total Ignitor Pulse power; smaller spot sizes on targets able to achieve Fast Ignition and improve overall implosion efficiency and effectiveness; appropriate pulse power shaping at the target; Fast Ignition that is optimizable by choice of Ion Species for the Slugs in the Fast Ignition Pulse; and beneficial treatments of the dynamics of the end caps of cylindrical targets (preventing the end caps from blowing out and causing them to implode, and assisting the Fast Ignition pulse to burn through extraneous material along the target axis), by extending the on-time of the shorter range ions used for Fast Ignition.

The raised confidence in reliable fusion ignition and burn carries over to all of the alternative applications of achieving massive quantities of fusion reactions, including: commensurately stronger confidence in the less-demanding production of commercial power that accrues by multiplying the fusion energy output by driving sub-critical fission piles; using the output of fusion neutrons to destroy high-level and/or long lived radioactive wastes, including integration of waste destruction with additional power from fission reactions; and extremely higher fluxes of neutrons in beams for various purposes.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A particle accelerator system, comprising:
   a source assembly for emitting a stream of isotopic slugs, each slug comprising a train of microbunches;
   at least one RF (radiofrequency) accelerator section for receiving said slug stream and focusing, accelerating and funneling said slug stream until a plurality of high-current, parallel slug trains emerges;
   a telescoper for receiving said plurality of high-current parallel slug trains and emitting different isotopic species into a single common-rigidity beamline, wherein that said species arrive at at least one a fusion target in a specified sequence;
   at least one snugger for receiving said common-rigidity beamline and snugging slugs within said common-rigidity beamline until they drift to points at prescribed distances from said least one target in at least one reaction chamber.

2. The system of claim 1, wherein said source assembly comprises:
   a patterned array of heavy ion sources, each source emitting pulses of a separate isotopic species in a sequence determined by a control element; and
   a HVDC (high-voltage direct current) preaccelerator for accelerating said heavy ion pulses to a synchronous speed required by said at least one RF accelerator section, wherein electrodes in said HVDC preaccelerator are disposed in a manner that mirrors patterning of said array of heavy ion sources.

3. The system of claim 1, wherein said at least one RF accelerator section comprises:
   a first RF section comprising a multi-channel radiofrequency quadrupole (RFQ), which provides strong focusing fields and a smoothly increasing accelerating field to approach isentropic conversion of a DC incoming slug beam into microbunches in a continuous stream at an RF frequency;
   an aligner for funneling slugs of a variety of isotopes from said first RF section structure section to a single collinear beam comprising a variety of isotopic slugs specified by a programmed time sequence and for increasing an average current of a slug; and
   a plurality of additional RF sections wherein two incoming beams are zipped into a single beam to approximately double the average current of each slug as it passes between a first accelerator section and a following accelerator section, wherein an RF frequency of the following section is at double the frequency of the first section, conducted in a complementary arrangement of beamline magnets and a RF deflector, wherein the two zipped beams are progressively aligned into one beam on a common axis.

4. The system of claim 1, wherein said telescoper comprises an accelerator section having at least one pulse-switched magnet;
   wherein said system further comprises a merger for merging a multiplicity of beams in a transverse phase space as they emerge from said telescoper into a single beam;

said system further comprising:
a Slug-Slug Delay Line for sorting successive sections of beam, provided with time gaps between said sections by gating ion source emission or applying magnetic or electric fields at a later stage of low-energy acceleration, into parallel beamlines, in synchronism at the level of the individual microbunches in the beam sections in parallel beamlines, to maintain the microbunch structure in common RF sections with multiple bores for the parallel beams.

5. The system of claim 1, wherein said at least one snugger differentially accelerates each microbunch within a slug within a beamline to move microbunches within slugs closer together while being maintained under the control of RF phase focusing;
wherein said snugger comprises a succession of blocks of RF accelerator sections, said blocks operating with a succession of RF frequencies, said succession of RF frequencies programmed to coordinate acceleration of the multiplicity of isotopic slugs, each of which has a specific characteristic speed; and
wherein said snugger further comprises a snug-stopper for temporarily stopping snugging of slugs until they drift to points at prescribed distances from at least one target in at least one reaction chamber.

6. A driver comprising:
a particle accelerator system comprising:
a source assembly for emitting a stream of isotopic slugs, each slug comprising a train of microbunches;
at least one RF (radiofrequency) accelerator section for receiving said slug stream and focusing, accelerating and funneling said slug stream until a plurality of high-current, parallel slug trains emerges;
a telescoper for receiving said plurality of high-current parallel slug trains and emitting different isotopic species into a single common-rigidity beamline so that said species arrive at a target in a specified sequence;
at least one snugger for receiving said common-rigidity beamline and snugging slugs within said common-rigidity beamline until they drift to points at prescribed distances from at least one target in at least one reaction chamber;
a delay line for rearranging beam slugs to collect small individual spaces between slugs and sort slugs into parallel beamlines to produce a smaller momentum spread at focusing on the target;
a delay line for eliminating at least a portion of a distance between centers of successive slugs;
a controller for controlling arrival of said slugs at targets in specified reaction chambers according to a specified schedule;
at least one slicker for imparting specified velocity differentials into microbunches of said slugs at specified distances upstream from each of said reaction chambers;
a wobbler for swirling a beam spot rapidly around a target to heat an annular region of the target with smooth energy deposition density in said target; and
at least one set of final focusing lenses for focusing said beam on said target.

7. The driver of claim 6, wherein said delay line for eliminating space between successive isotopic slugs comprises helical delay line (HDL), wherein a common HDL is used for all isotopes;
wherein at least a portion of said distance between centers occurs as a result of a snugging process wherein total average current of each of said slugs is increased and length of each of said slugs is decreased;
wherein said HDL comprises a plurality of coils, wherein a length of each coil is approximately equal to the distance between centers of successive slugs;
wherein a first slug in a slug train traverses the full length of the HDL before its exit point;
wherein successive slugs of progressively faster ions exit the HDL sequentially, after traversing progressively fewer turns of the HDL; and
wherein exits for various slugs are approximately at a same azimuthal point on the HDL.

8. The driver of claim 6, wherein said at least one slicker comprises a slicker for each reaction chamber; and
wherein said at least one slicker comprises at least one slicker for a compression pulse and at least one slicker for each fast ignition pulse;
wherein slicking in separate slickers for the fast ignition and compression pulse occurs after bifurcation of a beam pulse into separate beamlines with separate slickers for the fast ignition and the compression pulses;
wherein all isotopic species use one set of beamlines from the isotope-isotope delay line (HDL) to the individual slicker at each of the reaction chambers; and
wherein, said slicker comprises one or more sections of a linear accelerator operating at a RF frequency in which different microbunches are differentially accelerated to cause their centers to approach each other;
wherein, during slicking, individual microbunches stretch along an axis of a phase space ellipse while the area of said phase space ellipse remains approximately constant during transport in beamlines toward a target, wherein individual microbunches become longer, skinnier ellipses as they simultaneously approach said fusion target and the combined action of individual microbunches stretching, while moving closer together and ultimately into one another in physical space and over one another in the longitudinal phase space, produces a net current amplification, to shape the total beam current on the target, by controlling the slick accelerator parameters and timing.

9. The driver of claim 6, wherein said wobbler comprises an RF wobbler;
wherein said wobbler is located upstream from said at least one final focusing lens;
wherein a block of slugs for a compression pulse is subjected to said wobbler and wherein a block of slugs for a fast ignition pulse is not subjected to said wobbler because said block of slugs for fast ignition pulse is directed at a center of a target;
wherein using slower ions for a fast ignition pulse, compared to a speed of compression pulse ions provides a space in time between the two pulses that turns the wobbler on or off;
wherein a block of slugs for a compression pulse is subjected to said wobbler with the wobbler fields programmed to cause the beam wobble on the target; and
wherein various slugs for a fast ignition pulse are subjected to said wobbler with the wobbler fields programmed to cause said slugs of the fast ignition pulse to be directed at the end caps of the target at radial distances from the axis programmed to heat said end caps at a radius that varies with time.

* * * * *